United States Patent
Sasaki et al.

(10) Patent No.: US 8,390,955 B1
(45) Date of Patent: Mar. 5, 2013

(54) THIN-FILM MAGNETIC HEAD, METHOD OF MANUFACTURING THE SAME, HEAD GIMBAL ASSEMBLY, AND HARD DISK DRIVE

(75) Inventors: Yoshitaka Sasaki, Milpitas, CA (US);
Hiroyuki Ito, Milpitas, CA (US);
Shigeki Tanemura, Milpitas, CA (US);
Kazuki Sato, Milpitas, CA (US);
Atsushi Iijima, Hong Kong (CN)

(73) Assignees: Headway Technologies, Inc., Milpitas, CA (US); SAE Magnetics (H.K.) Ltd., Hong Kong (CN)

( * ) Notice: Subject to any disclaimer, the term of this patent is extended or adjusted under 35 U.S.C. 154(b) by 46 days.

(21) Appl. No.: 13/224,954

(22) Filed: Sep. 2, 2011

(51) Int. Cl.
*G11B 5/127* (2006.01)
(52) U.S. Cl. .................................................. 360/125.3
(58) Field of Classification Search ............... 360/125.3, 360/125.02; 29/603.14
See application file for complete search history.

(56) References Cited

U.S. PATENT DOCUMENTS

| | | | | |
|---|---|---|---|---|
| 7,933,095 B2 * | 4/2011 | Sasaki et al. | ............. | 360/125.12 |
| 7,978,431 B2 * | 7/2011 | Han et al. | .................. | 360/125.3 |
| 8,164,853 B2 * | 4/2012 | Hirata et al. | ............... | 360/125.3 |
| 8,173,028 B2 * | 5/2012 | Ishizaki et al. | .................. | 216/22 |
| 8,189,295 B2 * | 5/2012 | Han et al. | .................... | 360/125.3 |
| 8,233,237 B2 * | 7/2012 | Anagawa et al. | ........... | 360/125.3 |
| 8,300,359 B2 * | 10/2012 | Hirata et al. | ............... | 360/125.3 |
| 8,310,787 B1 * | 11/2012 | Sasaki et al. | ............... | 360/125.3 |

FOREIGN PATENT DOCUMENTS

| | | |
|---|---|---|
| JP | A-2007-272958 | 10/2007 |
| JP | A-2009-295262 | 12/2009 |
| JP | A-2010-157303 | 7/2010 |
| JP | A-2010-176732 | 8/2010 |

* cited by examiner

*Primary Examiner* — Angel A. Castro
(74) *Attorney, Agent, or Firm* — Oliff & Berridge, PLC

(57) ABSTRACT

A thin-film magnetic head is constructed such that a main magnetic pole layer, a write shield layer, a gap layer, and a thin-film coil are laminated on a substrate. The thin-film magnetic head has a leading shield part opposing the main magnetic pole layer on the substrate side of the main magnetic pole layer. The thin-film magnetic head has a substrate side coil layer disposed between the main magnetic pole layer and the substrate. In the thin-film magnetic head, a space between a lower end face of the leading shield part and the substrate and a space between an upper end face in the substrate side coil layer and the substrate are formed equal to each other.

21 Claims, 43 Drawing Sheets

Fig.8
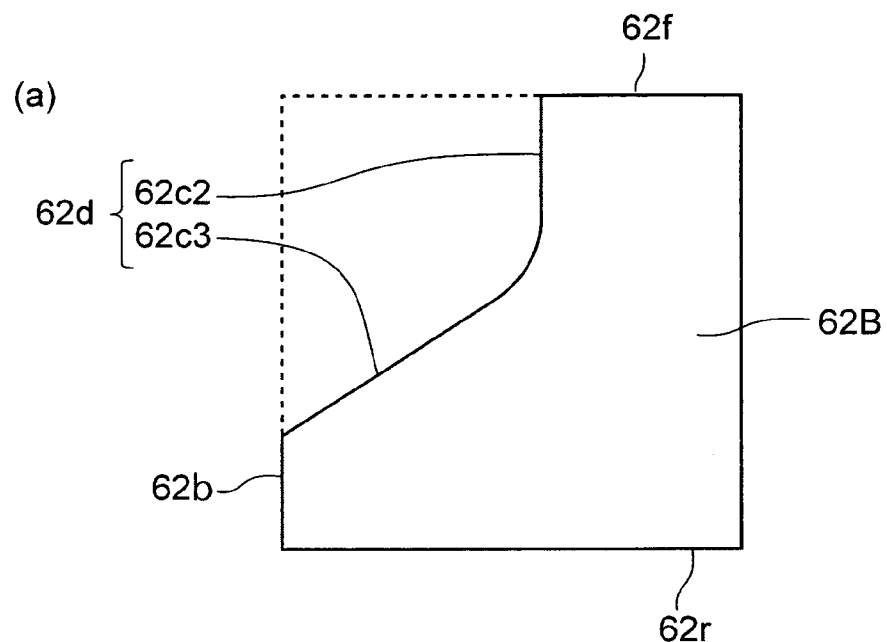
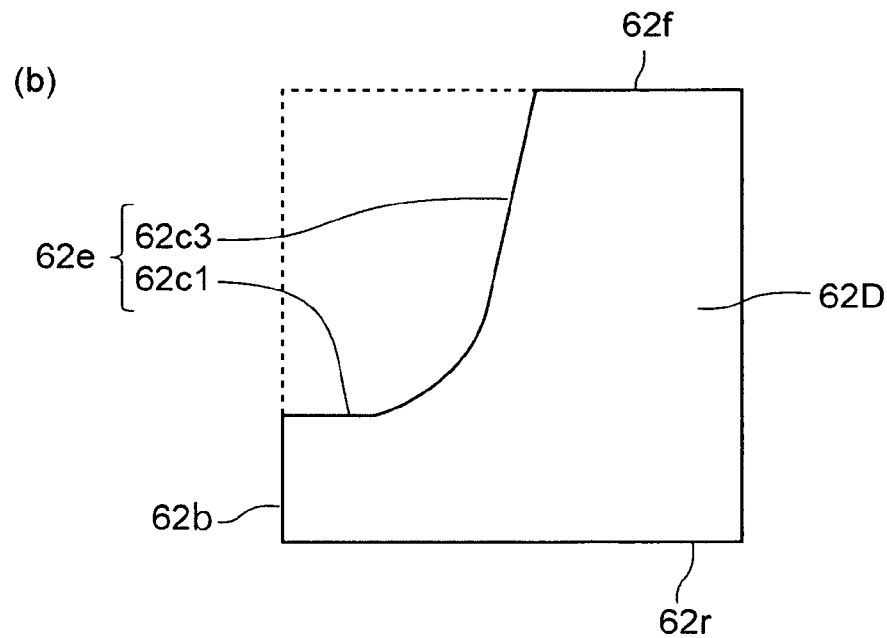

THIN-FILM MAGNETIC HEAD, METHOD OF MANUFACTURING THE SAME, HEAD GIMBAL ASSEMBLY, AND HARD DISK DRIVE

BACKGROUND

1. Field of the Invention

The present invention relates to a thin-film magnetic head which performs a magnetic recording action by a perpendicular magnetic recording scheme, a method of manufacturing the same, a head gimbal assembly, and a hard disk drive.

2. Related Background Art

A hard disk drive has a large recording capacity and is used as the heart of a storage device. The hard disk drive records and reproduces data to/from a hard disk (recording medium) by a thin-film magnetic head.

The thin-film magnetic heads can roughly be classified according to their recording schemes into those of longitudinal magnetic recording type and those of perpendicular magnetic recording type. The longitudinal magnetic recording scheme records data in a (longitudinal) direction within a recording surface of a hard disk (recording medium), while the perpendicular magnetic recording scheme records data such that the direction of recording magnetization formed in the hard disk is made perpendicular to the recording surface. The thin-film magnetic heads of perpendicular magnetic recording type have been considered more promising than those of longitudinal magnetic recording type, since they can realize a much higher recording density than that in the longitudinal magnetic recording scheme, while their recorded hard disks are less susceptible to heat fluctuation.

Meanwhile, a conventional magnetic head of perpendicular magnetic recording type (perpendicular magnetic recording head which will also be referred to as "PMR" in the following) has a magnetic pole layer and a thin-film coil. The PMR has a structure of electromagnet which the thin-film coil are wound around the magnetic pole layer.

As the conventional PMR, PMRs each including a shield layer on a trailing side of a main magnetic pole layer are disclosed, for example, in JP 2007-272958 (referred to also as Patent Document 1), JP 2010-176732 (referred to also as Patent Document 2), JP 2010-157303 (referred to also as Patent Document 3), JP 2009-295262 (referred to also as Patent Document 4) and so on. A PMR 600 illustrated in FIG. 42 is one example of such PMRs.

The PMR 600 has a main magnetic pole layer 601 through which a recording magnetic field along the direction perpendicular to the recording medium passes, a thin-film coil 602 wound around the main magnetic pole layer 601, a recording gap layer 603, and a shield layer 604 opposite to the main magnetic pole layer 601 with the recording gap layer 603 intervening therebetween. In this PMR 600, a lower thin-film coil 612 is disposed between the main magnetic pole layer 601 and a reproducing head 619.

SUMMARY OF THE INVENTION

The conventional PMR causes a current to flow through the thin-film coil, so as to generate a magnetic field, thereby recording data onto the recording medium. In the case of the PMR 600, for example, a current is caused to flow through the thin-film coil 602 so as to record data onto the recording medium.

However, the thin-film coil 602 generates heat when electric current is passed therethrough, and the heat conducts to the coil-insulating layer 605 around the thin-film coil 602. The coil-insulating layer 605 is formed of an organic material such as photoresist or the like and is thus larger in expansion coefficient than the thin-film coil 602. For this reason, when heat is applied, the coil-insulating layer 605 is likely to expand. When the coil-insulating layer 605 expands, the end part on the ABS 606 side of the shield layer 604 is pushed to the side outer than the ABS 606 and protrudes.

The PMR is formed using the thin-film forming process on an electronic part called slider. When data is recorded on a recording medium using the PMR, the slider is flying from the recording medium. The height of the slider frying from the recording medium (the distance between the recording medium and the slider) is called a frying height and known to be a very small distance of about 7 to 10 nm. In order to achieve a high recording density of about 650 to 850 GB/in$^2$ (650 to 850 gigabytes per square inch), the frying height needs to be set to 5 to 8 nm or less.

However, when the medium-opposing surface projects as in the above-described PMR 600, the PMR collides with the recording medium and becomes more likely to break. In order to avoid such breakage of the PMR, it is unavoidable to increase the frying height so as to prevent the PMR from colliding with the recording medium. For this reason, it is difficult to make the frying height smaller in the conventional PMR. As a result, it is very difficult to increase the recording density in the conventional PMR.

Such protrusion of the magnetic pole layer is mainly caused by heat generation of the thin-film coil. Therefore, to suppress the protrusion of the magnetic pole layer, it is sufficient to suppress the heat generation of the thin-film coil. Generally, the heat generated from the conductor through which the electric current flows is called Joule heat and is known to be proportional to the square of the magnitude of electric current and the electric resistance of the conductor (Joule's law). Accordingly, to suppress the heat generation of the thin-film coil, it is sufficient to reduce the electric resistance of the thin-film coil.

The electric resistance of the thin-film coil is inversely proportional to the sectional area of the thin-film coil (the area of the section in the direction intersecting the direction in which the electric current flows). Therefore, to reduce the electric resistance of the thin-film coil, it is sufficient to increase the sectional area of the thin-film coil. By reducing the number of windings (also called the number of turns) wound around the magnetic pole layer of the thin-film coil, the thin-film coil is able to be made thick and the sectional area is able to be made large. However, this reduces the intensity of the magnetic field generated by the thin-film coil, causing a problem of decreasing the writing characteristics of the PMR (for example, the overwrite characteristics).

Further, the sectional area of the thin-film coil is able to be increased also by widening the width of the thin-film coil or by increasing the thickness of the thin-film coil without changing the number of turns of the thin-film coil. For example, in the case of the PMR 600, the sectional area of the thin-film coil is able to be increased even by widening the width w602 of the thin-film coil 602 or increasing the thickness h602.

However, widening the width w602 makes it difficult to shorten the magnetic path length. The magnetic path length is the length of the magnetic pole layer which the thin-film coil is wound around, and the size of the magnetic path length is affected mainly by a width LX illustrated in FIG. 42.

Incidentally, alternating current is passed through the thin-film coil, and the impedance during this time is proportional to the frequency and the inductance. Therefore, when alternating current having a high frequency is passed through the thin-film coil in order to increase the recording density on the magnetic recording medium, the impedance increases and thereby causes the electric current to hardly flow. To avoid this situation, it is effective to reduce the inductance and shorten the magnetic path length. However, when the width of the thin-film coil is widened, the magnetic path length needs to be increased, resulting in increased inductance of the PMR. This makes it impossible to increase the frequency of the recording signals, failing to increase the recording density on the magnetic recording medium. Besides, the magnetic path length needs to be increased even by widening the thickness of the thin-film coil.

On the other hand, in the PMR 600, parts of the coil-insulating layer 605 are formed as coil-insulating layers 605*a*, 605*b* at a position closer to the medium-opposing surface 606 than is the thin-film coil 602 and at a position distanced more from the medium-opposing surface 606 than is the thin-film coil 602, respectively. Therefore, the width LX becomes larger by the width of the coil-insulating layer 605*a* and the width of the coil-insulating layer 605*b* (the widths in a direction intersecting the medium-opposing surface 606 of about 1.5 µm each, about 3 µm in total).

As a PMR capable of solving the problems, for example, a PMR 700 illustrated in FIG. 43 has been conventionally known. A similar PMR is described also in Patent Document 4. The PMR 700 has an upper thin-film coil 708 and a main magnetic pole layer 710 similar to that of the PMR 600. The PMR 700 has a lower thin-film coil 718, a lower shield part 720 and insulating layers 731, 732.

In this PMR 700, an upper shield layer has an opposing shield part 701 opposing the main magnetic pole layer 710, a front shield part 703 disposed on a medium-opposing surface 706 side of the upper thin-film coil 708, and a linking shield part 704 straddling the upper thin-film coil 708. Furthermore, a connecting shield part 702 for the front shield part 703 and the opposing shield part 701 is formed. In this PMR 700, a coil-insulating layer 709 is disposed between adjacent parts of the upper thin-film coils 708 but the coil-insulating layer 709 is not disposed outside the upper thin-film coil 708. Therefore, the magnetic path length can be made shorter than that of the above-described PMR 600.

On the other hand, in the PMR, there is restriction that the read/write separation (referred also to as "RWS") that is the spacing in the direction along the ABS between the main magnetic pole layer and the reproducing head is made to keep within a range of 4.5 µm to 5 µm. Thus, for example, when the lower thin-film coil 612 is arranged between the main magnetic pole layer 601 and the reproducing head 619 as in the PMR 600, RWS needs to be increased if the thickness of the lower thin-film coil 612 is increased. Accordingly, given the relation with RWS, it is difficult to increase the thickness of the thin-film coil.

Further, also in the PMR 700, the lower thin-film coil 718 that is a part of the thin-film coil 708 is disposed between the main magnetic pole layer 710 and a reproducing head 719. For this reason, also when the lower thin-film coil 718 is increased in thickness, the RWS has to be made large. Accordingly, it is a very difficult problem to reduce the electric resistance of the thin-film coil within the restriction range of RWS even in the conventional PMR 700 which is more advantageous than the PMR 600 in terms of reduction in magnetic path length.

As described above, it has been difficult in the conventional PMR to reduce the electric resistance of the thin-film coil within the restriction range of RWS without increasing the magnetic path length.

The present invention is made to solve the above problem, and it is an object to reduce the electric resistance of a thin-film coil within the restriction range of the read/write separation without increasing the magnetic path length and suppress protrusion of a part of the ABS in a thin-film magnetic head performing magnetic recording operation in the vertical magnetic recording system and a method of manufacturing the same and a head gimbal assembly and a hard disk drive.

To solve the above problem, the present invention is a thin-film magnetic head constructed such that a main magnetic pole layer having a magnetic pole end face on a side of a medium-opposing surface opposing a recording medium, a write shield layer having a write shield end face disposed in the medium-opposing surface, a gap layer formed between the main magnetic pole layer and write shield layer, and a thin-film coil wound around any of the main magnetic pole layer, the write shield layer or a shield magnetic layer connected the main magnetic pole layer are laminated on a substrate, the thin-film magnetic head including: a leading shield part having a shield end face disposed in the medium-opposing surface, and opposing the main magnetic pole layer through a nonmagnetic thin-film on the substrate side of the main magnetic pole layer, the thin-film coil has a substrate side coil layer disposed between the main magnetic pole layer and the substrate, and a space between a lower end face disposed at a position closest to the substrate in the leading shield part and the substrate and a space between an upper end face disposed at a position most distanced from the substrate in the substrate side coil layer and the substrate are formed equal to each other.

In case of this thin-film magnetic head, since the space between the lower end face of the leading shield part and the substrate and the space between the upper end face of the substrate side coil layer and the substrate are formed equal to each other, there is no gap formed between the lower end face and the upper end face. Therefore, the RWS can be reduced, according to the reduction of the RWS, and the height increasing space for accordingly increasing the height of the thin-film coil can be secured.

In case of the above-described thin-film magnetic head, it is preferable that the thin-film magnetic head further includes a lower front shield part disposed at a position closer to the medium-opposing surface than is the substrate side coil layer, and having an upper end face, disposed at a position most distanced from the substrate, formed without level difference with respect to the upper end face of the substrate side coil layer, the upper end face of the lower front shield part and the lower end face of the leading shield part are directly connected.

In case of this thin-film magnetic head, the height increasing space is secured while securing the connection state between the leading shield part and the lower front shield part.

In case of the thin-film magnetic head, it is preferable that the thin-film magnetic head further includes a base insulating layer in contact with a lower end face disposed at a position closest to the substrate in the main magnetic pole layer, through the nonmagnetic thin-film, the upper end face of the substrate side coil layer is in direct contact with the base insulating layer.

In case of this thin-film magnetic head, the height increasing space is used for increasing the height of the thin-film coil.

Further, in case of the above-described thin-film magnetic head, it is preferable that the thin-film magnetic head further includes an opposing insulating layer having a front end face disposed in the medium-opposing surface, and disposed on the medium-opposing surface side of the lower front shield part, the leading shield part is in direct contact with both the opposing insulating layer and the lower front shield part.

Furthermore, in case of the above-described thin-film magnetic head, it is preferable that an upper end face disposed at a position most distanced from the substrate in the opposing insulating layer is formed without level difference with respect to the upper end face of the substrate side coil layer and the upper end face of the lower front shield part.

Further, in case of the above-described thin-film magnetic head, it is possible that the opposing insulating layer has an opposing depression formed by disposing an upper end face thereof disposed at a position most distanced from the substrate at a position closer to the substrate than is the upper end face of the lower front shield part, and the leading shield part wraps around to an inside of the opposing depression and thereby has an expansion structure in which a height of a part thereof on the medium-opposing surface side in a direction along the medium-opposing surface is expanded.

Further, the present invention provides a thin-film magnetic head constructed such that a main magnetic pole layer having a magnetic pole end face on a side of a medium-opposing surface opposing a recording medium, a write shield layer having a write shield end face disposed in the medium-opposing surface, a gap layer formed between the main magnetic pole layer and write shield layer, and a thin-film coil wound around any of the main magnetic pole layer, the write shield layer or a shield magnetic layer connected the main magnetic pole layer are laminated on a substrate, the thin-film magnetic head including: a leading shield part having a shield end face disposed in the medium-opposing surface, and opposing the main magnetic pole layer through a nonmagnetic thin-film on the substrate side of the main magnetic pole layer, the thin-film coil has a substrate side coil layer disposed between the main magnetic pole layer and the substrate, and an upper end face disposed at a position most distanced from the substrate in the substrate side coil layer is in contact with a lower end face disposed at a position closest to the substrate in the main magnetic pole layer, through the nonmagnetic thin-film.

In case of the above-described thin-film magnetic head, it is preferable that a lower end face disposed at a position closest to the substrate in the leading shield part is disposed at a position closer to the substrate than is a lower end face disposed at a position closest to the substrate in the substrate side coil layer.

Further, in case of the above-described thin-film magnetic head, it is preferable that the leading shield part has a lateral width reaching, from the medium-opposing surface, the substrate side coil layer, and is formed larger in height along the medium-opposing surface than the substrate side coil layer.

Further, in case of the above-described thin-film magnetic head, it is preferable that the write shield layer includes an opposing shield part opposing the main magnetic pole layer in the medium-opposing surface, and an upper front shield part connected to the opposing shield part without straddling the thin-film coil and disposed on the medium-opposing surface side of the thin-film coil, and the upper front shield part includes a shield front end face disposed in the medium-opposing surface, a shield upper end face disposed at a position distanced more from the substrate than is the shield front end face and formed along an intersecting direction intersecting the medium-opposing surface and distanced from the medium-opposing surface, and a shield connecting part directly connecting the shield front end face to the shield upper end face.

Further, it is preferable that the upper front shield part is formed having a part on the medium-opposing surface cut off such that the shield connecting part has a receding tilt structure tilted to be distanced more from the medium-opposing surface than is a flat surface connecting the shield front end face and the shield upper end face at a shortest distance.

Further, the present invention provides a method of manufacturing a thin-film magnetic head constructed such that a main magnetic pole layer having a magnetic pole end face on a side of a medium-opposing surface opposing a recording medium, a write shield layer having a write shield end face disposed in the medium-opposing surface, a gap layer formed between the main magnetic pole layer and write shield layer, and a thin-film coil wound around any of the main magnetic pole layer, the write shield layer or a shield magnetic layer connected the main magnetic pole layer are laminated on a substrate; the method including the following steps (1) to (5):

(1) a conductor layer forming step of forming a conductor layer for forming a substrate side coil layer disposed between the main magnetic pole layer and the substrate among coil layers constituting the thin-film coil;

(2) a common flat surface forming step of performing planarization processing on a surface of the conductor layer to form a common flat surface including an upper end face disposed at a position most distanced from the substrate in the conductor layer;

(3) a magnetic layer forming step of forming, directly on the common flat surface, a leading magnetic layer for forming a leading shield part having a shield end face disposed in the medium-opposing surface, and opposing the main magnetic pole layer through a nonmagnetic thin-film on the substrate side of the main magnetic pole layer;

(4) a leading shield part forming step of forming the leading shield part by etching a surface of the leading magnetic layer formed by the magnetic layer forming step according to a shape of the main magnetic pole layer; and (5) a main magnetic pole layer forming step of forming the main magnetic pole layer after formation of the nonmagnetic thin-film on a surface of the leading shield part.

The above-described method of manufacturing further including the following steps (6), it is preferable that planarization processing is performed on the lower front magnetic layer together with the conductor layer by the planarization processing in the common flat surface forming step such that a surface of the lower front magnetic layer is included in the common flat surface.

(6) a lower front magnetic layer forming step of forming a lower front magnetic layer for forming a lower front shield part disposed on a side of the medium-opposing surface than the substrate side coil layer, Further, it is preferable that the magnetic layer forming step is performed such that the leading magnetic layer is formed on the surface of the lower front magnetic layer.

The above-described method of manufacturing further including the following steps (7), (8), it is preferable that the magnetic layer forming step is performed such that the leading magnetic layer wraps around to an inside of the opposing depression.

(7) an opposing insulating layer forming step of forming an opposing insulating layer having a front end face disposed in the medium-opposing surface, and disposed on the medium-opposing surface side of the lower front shield part;

(8) an opposing depression forming step of performing etching process on an upper end face disposed at a position most distanced from the substrate in the opposing insulating layer to form an opposing depression in the upper end face.

Further, the present invention provides a method of manufacturing a thin-film magnetic head constructed such that a main magnetic pole layer having a magnetic pole end face on a side of a medium-opposing surface opposing a recording medium, a write shield layer having a write shield end face disposed in the medium-opposing surface, a gap layer formed between the main magnetic pole layer and write shield layer, and a thin-film coil wound around any of the main magnetic pole layer, the write shield layer or a shield magnetic layer connected the main magnetic pole layer are laminated on a substrate; the method including the following steps (9) to (13):

(9) a magnetic layer forming step of forming a leading magnetic layer for forming a leading shield part having a shield end face disposed in the medium-opposing surface, and opposing the main magnetic pole layer through a nonmagnetic thin-film on the substrate side of the main magnetic pole layer;

(10) a conductor layer forming step of forming a conductor layer for forming a substrate side coil layer disposed between the main magnetic pole layer and the substrate among coil layers constituting the thin-film coil;

(11) a planarization step of performing planarization processing on surfaces of the conductor layer and the leading magnetic layer;

(12) a leading shield part forming step of forming the leading shield part by etching surfaces of the leading magnetic layer formed by the magnetic layer forming step and the conductor layer formed by the conductor layer forming step, according to a shape of the main magnetic pole layer; and

(13) a main magnetic pole layer forming step of forming the main magnetic pole layer after formation of the nonmagnetic thin-film on surfaces of the leading shield part and the conductor layer.

It is preferable that the above-described method of manufacturing further including the following steps (14) to (17):

(14) an opposing shield part forming step of forming, after the main magnetic pole layer is formed, an opposing shield part constructing the write shield layer such that the opposing shield part opposes the main magnetic pole layer in the medium-opposing surface;

(15) a first shield part forming step of forming, on the medium-opposing surface side of the conductor layer, a first shield part for forming the write shield layer such that the first shield part is connected to the opposing shield part formed by the opposing shield part forming step and disposed in the medium-opposing surface;

(16) a linking shield part forming step of forming a linking shield part constructing the write shield layer such that the linking shield part is connected to the first shield part formed by the first shield part forming step, straddles the thin-film coil, and is receded from the medium-opposing surface to be distanced from the medium-opposing surface;

(17) a trimming step of cutting off a part on the medium-opposing surface side which is not covered with the linking shield part of the first shield part.

Further, it is preferable that in the trimming step, the part on the medium-opposing surface side which is not covered with the linking shield part of the first shield part is cut off using the linking shield part formed by the linking shield part forming step as a mask.

Furthermore, it is preferable that the trimming step is performed in a manner to leave a part of a front end face of the first shield part disposed in the medium-opposing surface as a shield front end face.

Further, the present invention provides a head gimbal assembly including a thin-film magnetic head formed on a support and a gimbal for securing the support; the thin-film magnetic head is constructed such that a main magnetic pole layer having a magnetic pole end face on a side of a medium-opposing surface opposing a recording medium, a write shield layer having a write shield end face disposed in the medium-opposing surface, a gap layer formed between the main magnetic pole layer and write shield layer, and a thin-film coil wound around any of the main magnetic pole layer, the write shield layer or a shield magnetic layer connected the main magnetic pole layer are laminated on a substrate, the thin-film magnetic head including: a leading shield part having a shield end face disposed in the medium-opposing surface, and opposing the main magnetic pole layer through a nonmagnetic thin-film on the substrate side of the main magnetic pole layer, the thin-film coil has a substrate side coil layer disposed between the main magnetic pole layer and the substrate, and a space between a lower end face disposed at a position closest to the substrate in the leading shield part and the substrate and a space between an upper end face disposed at a position most distanced from the substrate in the substrate side coil layer and the substrate are formed equal to each other.

Further, the present invention provides a hard disk drive including a head gimbal assembly having a thin-film magnetic head and a recording medium opposing the thin-film magnetic head; the thin-film magnetic head is constructed such that a main magnetic pole layer having a magnetic pole end face on a side of a medium-opposing surface opposing a recording medium, a write shield layer having a write shield end face disposed in the medium-opposing surface, a gap layer formed between the main magnetic pole layer and write shield layer, and a thin-film coil wound around any of the main magnetic pole layer, the write shield layer or a shield magnetic layer connected the main magnetic pole layer are laminated on a substrate, the thin-film magnetic head including: a leading shield part having a shield end face disposed in the medium-opposing surface, and opposing the main magnetic pole layer through a nonmagnetic thin-film on the substrate side of the main magnetic pole layer, the thin-film coil has a substrate side coil layer disposed between the main magnetic pole layer and the substrate, and a space between a lower end face disposed at a position closest to the substrate in the leading shield part and the substrate and a space between an upper end face disposed at a position most distanced from the substrate in the substrate side coil layer and the substrate are formed equal to each other.

The present invention will be more fully understood from the detailed description given hereinbelow and the accompanying drawings which are given by way of illustration only, and thus are not to be considered as limiting the present invention.

BRIEF DESCRIPTION OF THE DRAWINGS

FIG. 8 illustrates a modified example, in which (a) is a side elevation view of the upper front shield part not having a lateral flat part, in which (b) is a side elevation view of the upper front shield part not having a longitudinal flat part;

DETAILED DESCRIPTION OF THE EMBODIMENTS

In the following, embodiments of the present invention will be described with reference to the drawings. Note that the same components will be referred to with the same numerals or letters, while omitting their overlapping descriptions.

First Embodiment

Structures of Thin-Film Magnetic Head

Figure 1:
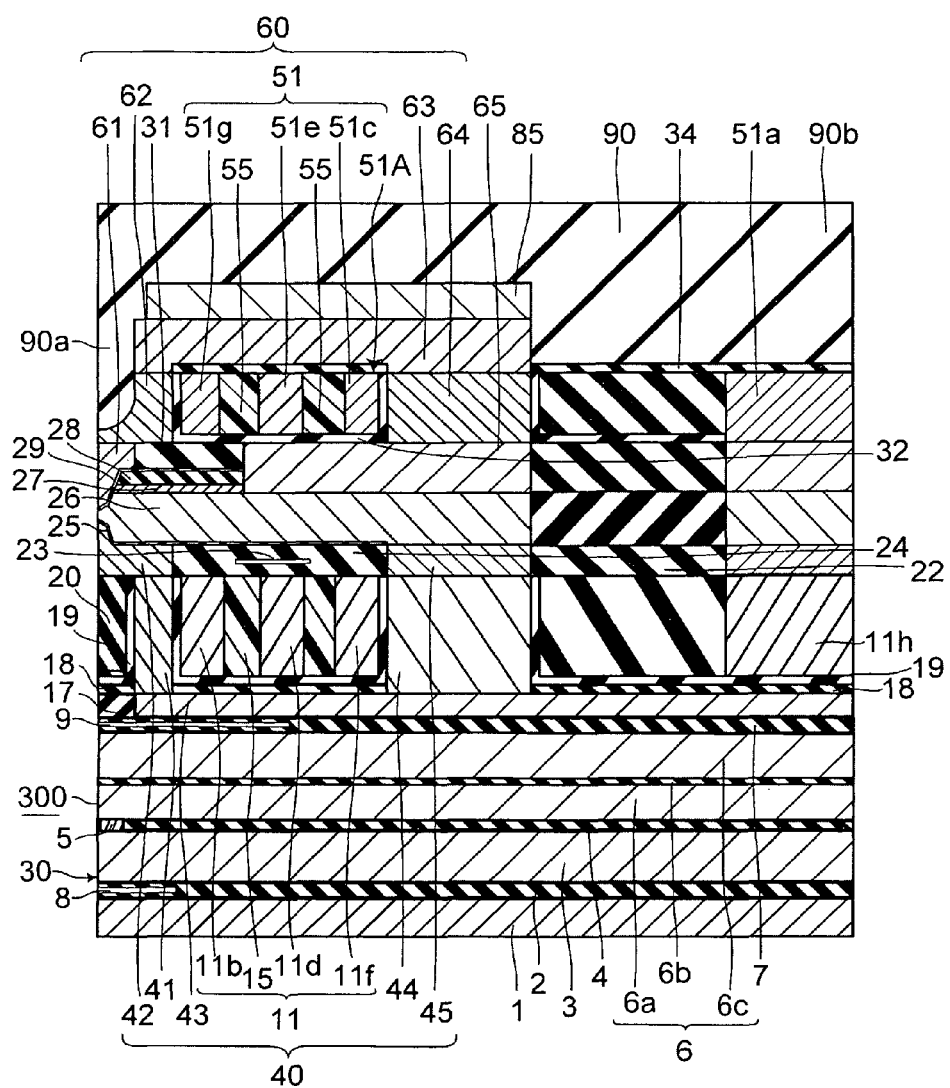
FIG. 1 is a sectional view of the thin-film magnetic head according to a first embodiment of the present invention taken along the line 1-1 of FIG. 2, along by a direction intersecting its air bearing surface.
Figure 2:
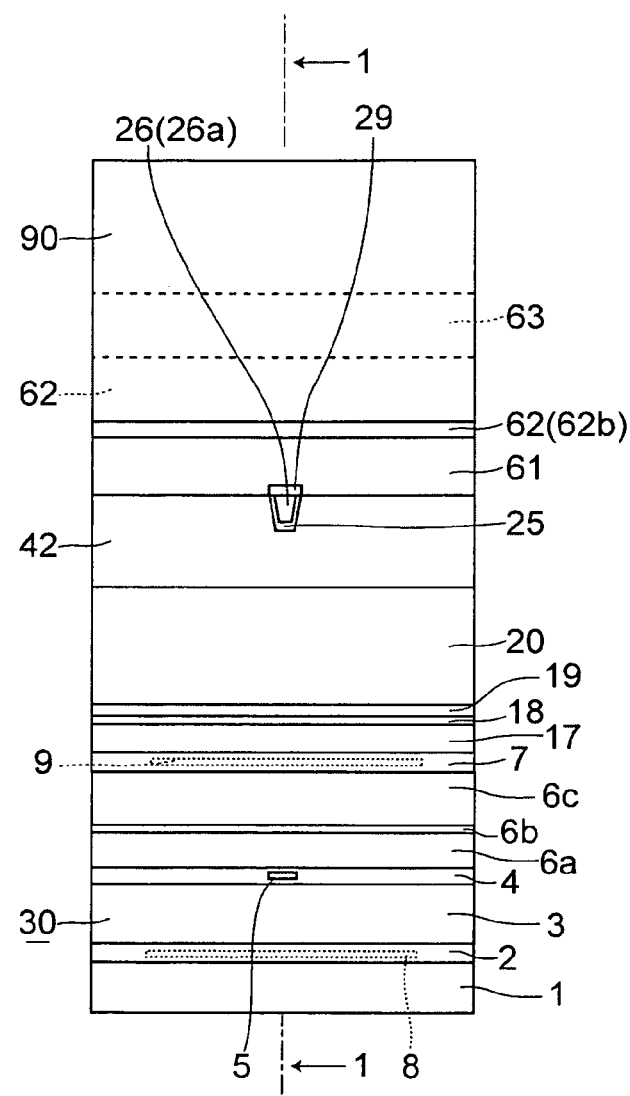
FIG. 2 is a front view illustrating an ABS of the thin-film magnetic head.
Figure 3:
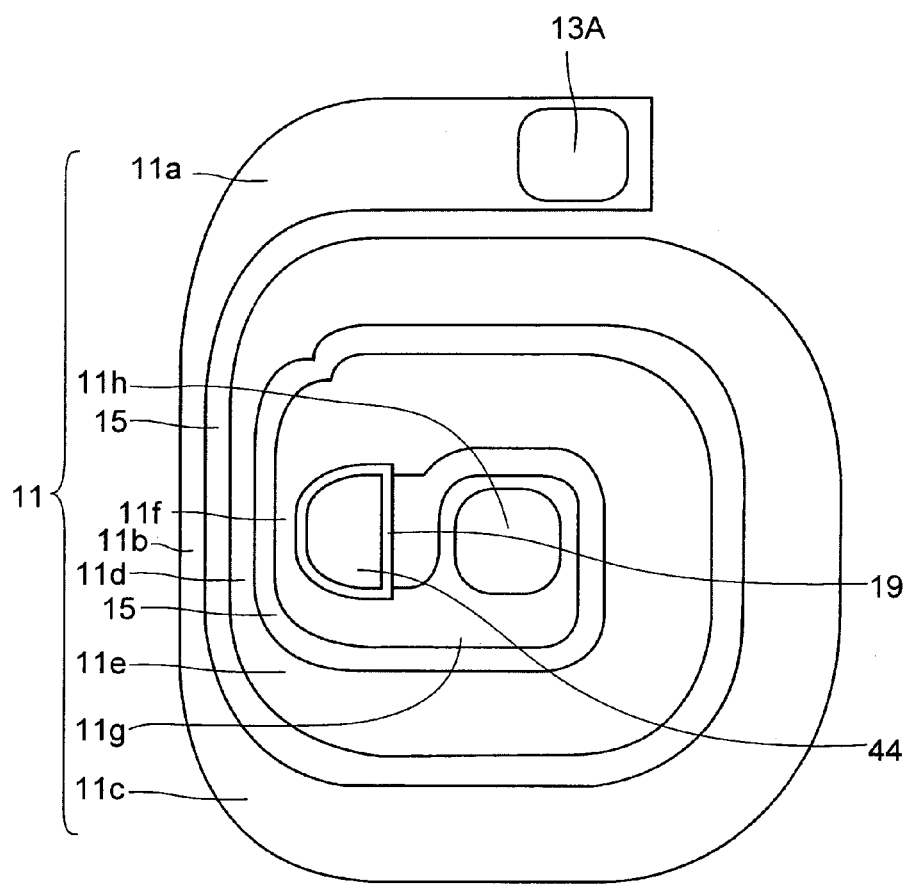
FIG. 3 is a plan view illustrating a lower thin-film coil.
Figure 4:
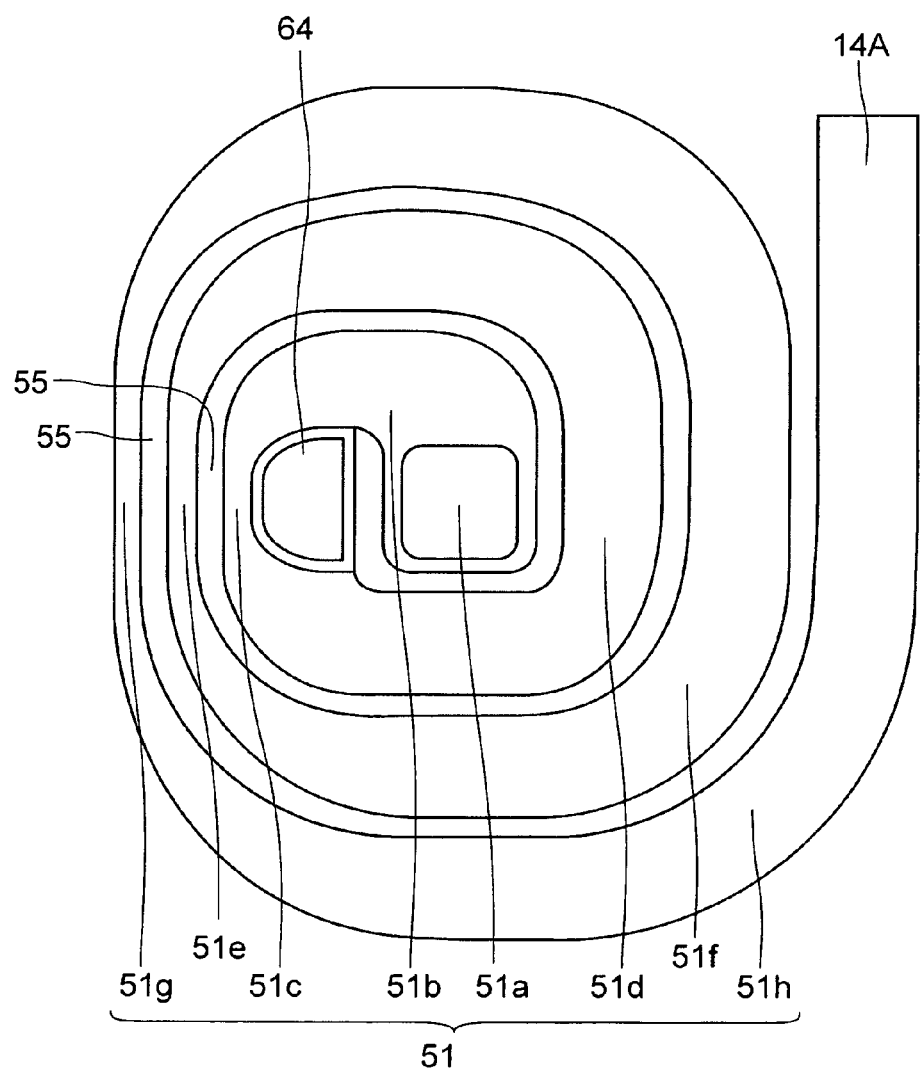
FIG. 4 is a plan view illustrating an upper thin-film coil.
Figure 5:
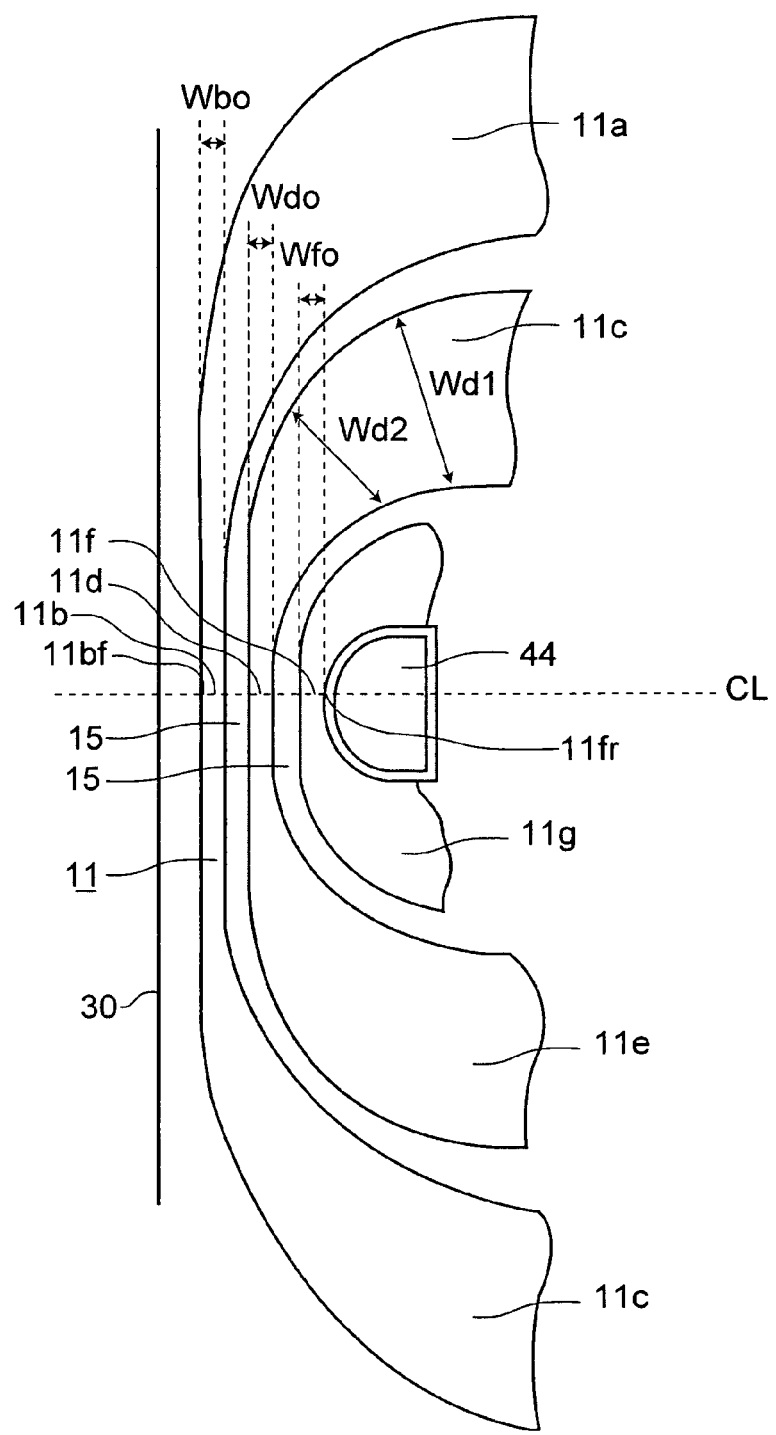
FIG. 5 is a plan view illustrating a principal part of the lower thin-film coil.
Figure 6:
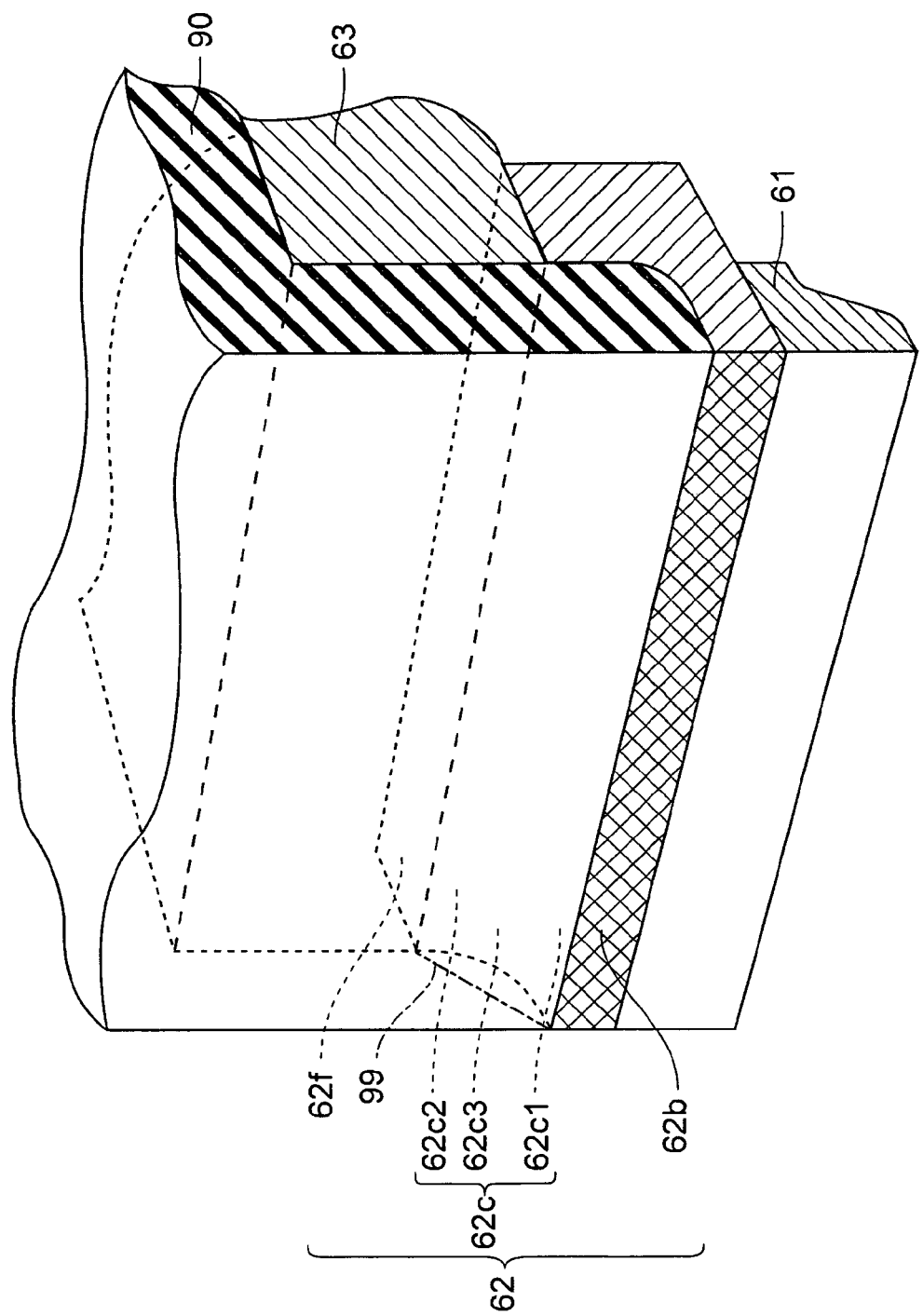
FIG. 6 is a perspective view illustrating principal parts of an opposing shield part, an upper front shield part and a linking shield part.
Figure 7:
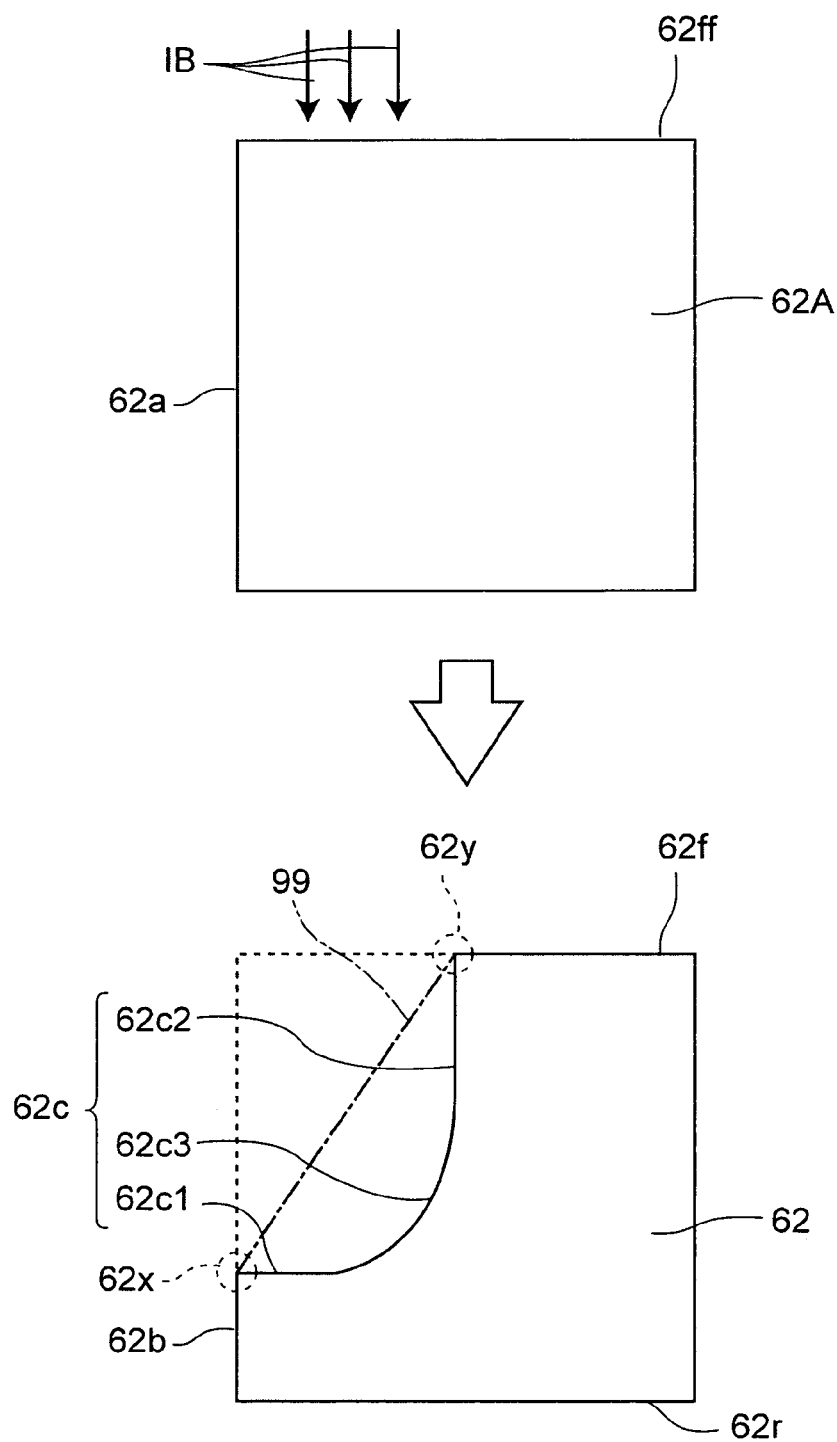
FIG. 7 is a side elevation view illustrating a pre-trim shield part and the upper front shield part.
Figure 9:
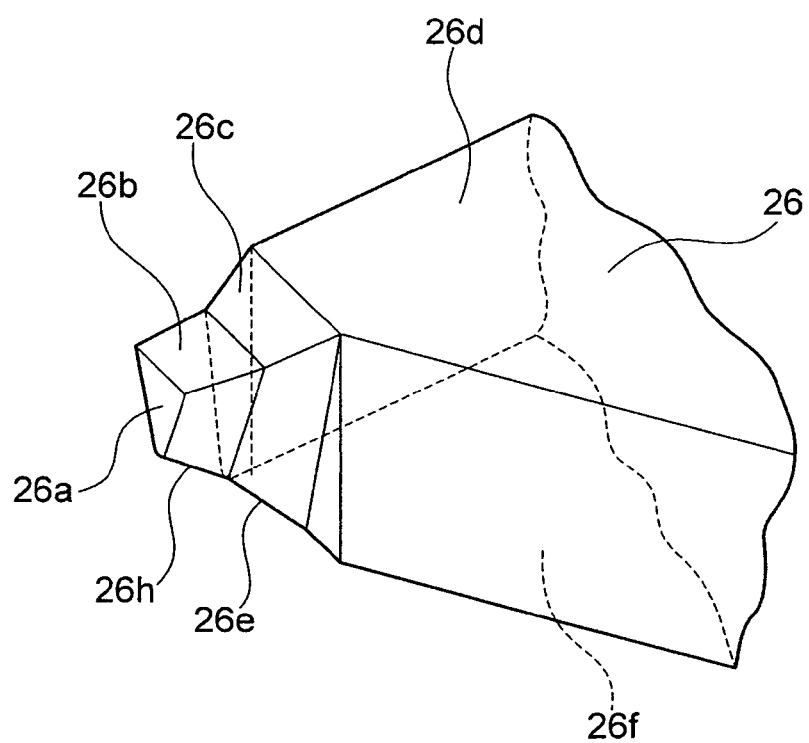
FIG. 9 is a perspective view illustrating a neighborhood of the ABS in the main magnetic pole layer 26 with a part thereof omitted.
Figure 10:
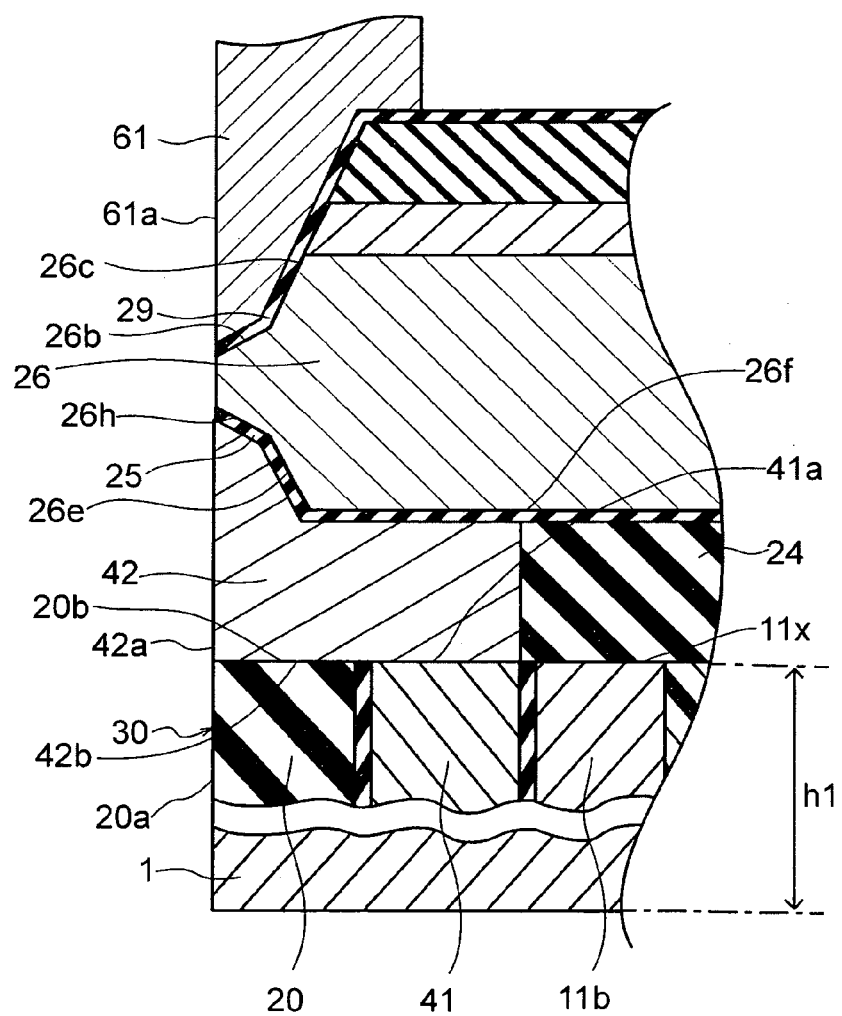
FIG. 10 is a sectional view illustrating a principal part of FIG. 1.
Figure 11:
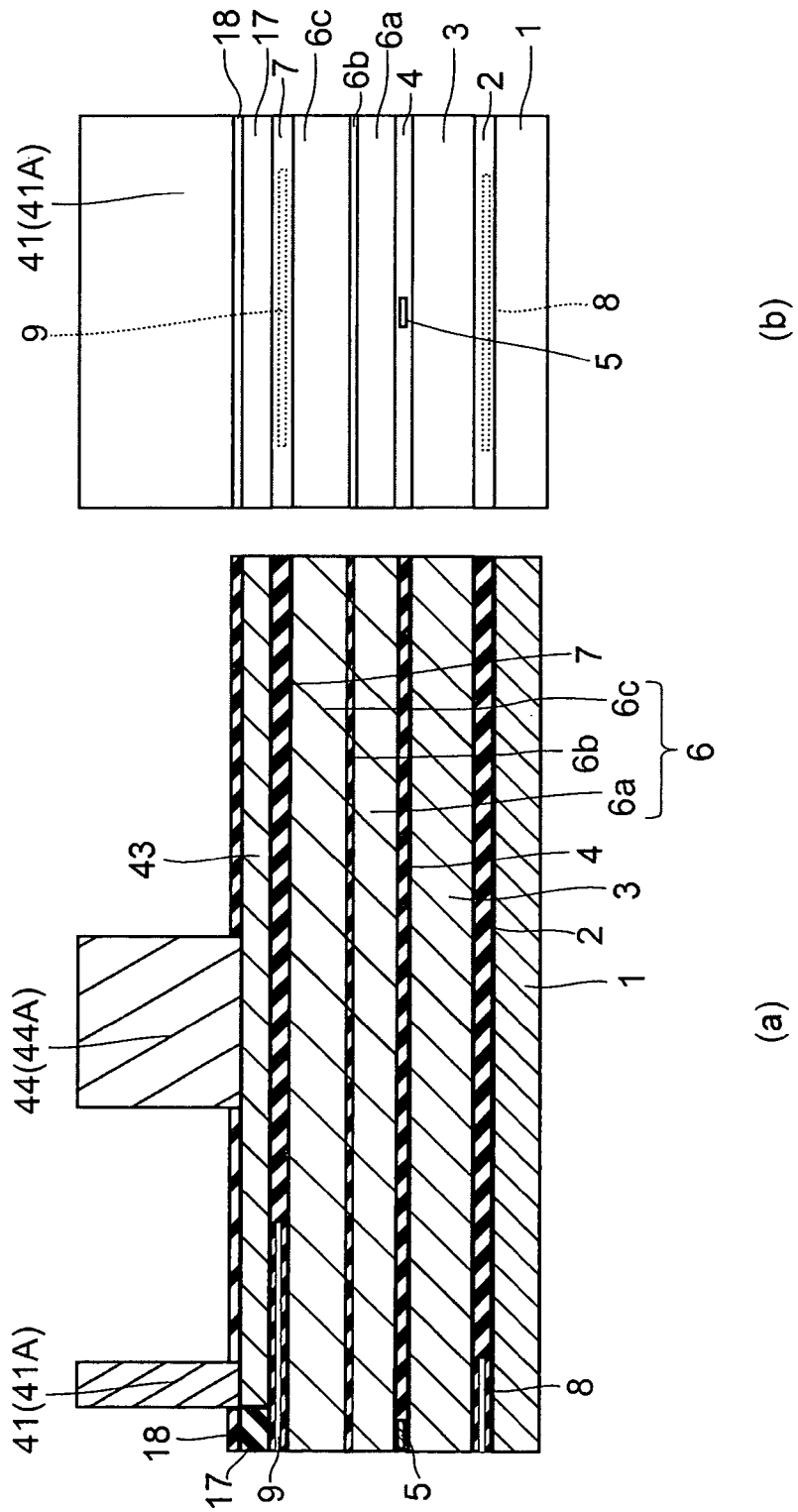
FIG. 11 illustrates a step of manufacturing the thin-film magnetic head illustrated in FIG. 1, in which (a) is a sectional view corresponding to FIG. 1, in which (b) is a front view corresponding to FIG. 2.
Figure 12:
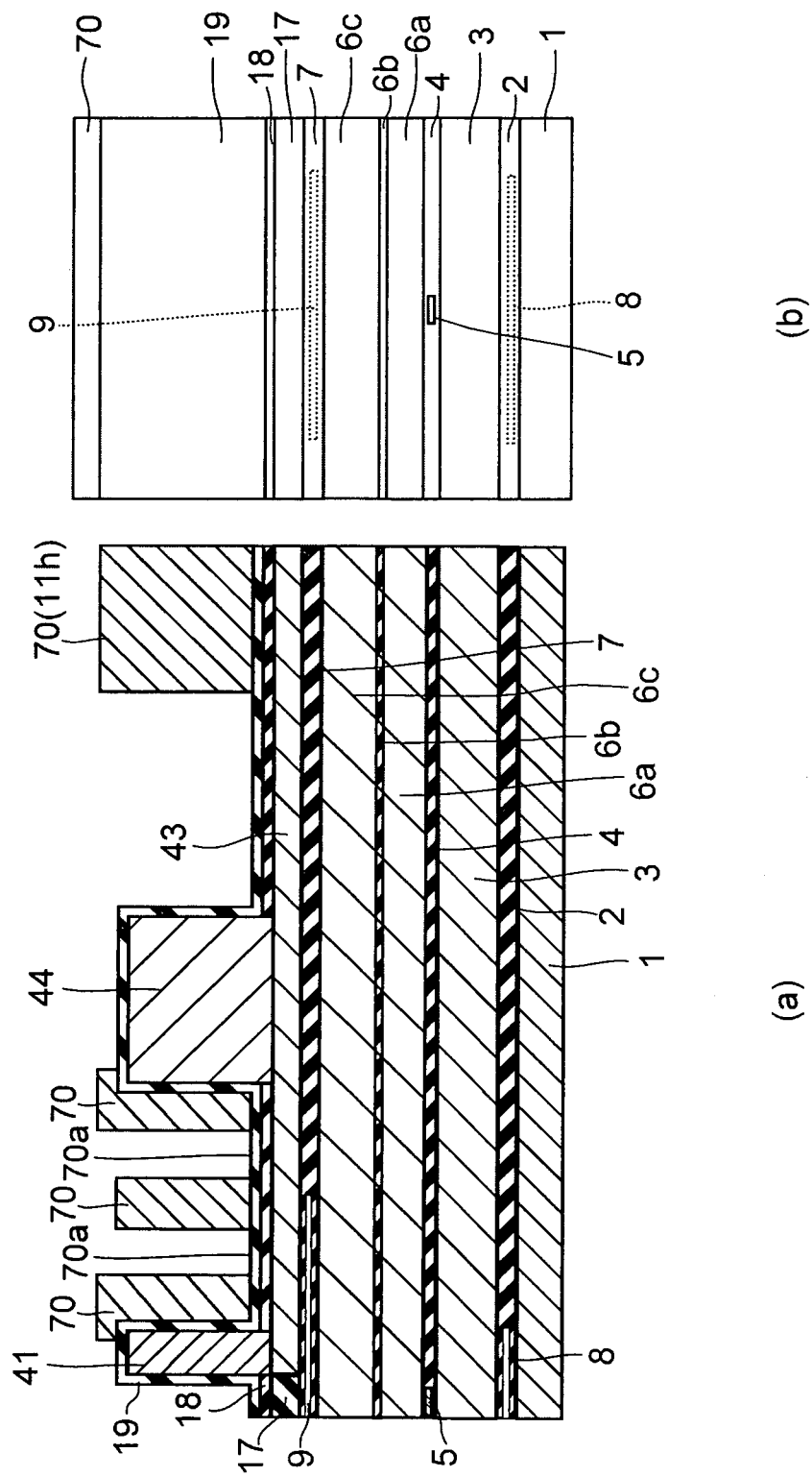
FIG. 12 illustrates a step subsequent to that of FIG. 11, in which (a) is a sectional view corresponding to FIG. 1, in which (b) is a front view corresponding to FIG. 2.
Figure 13:
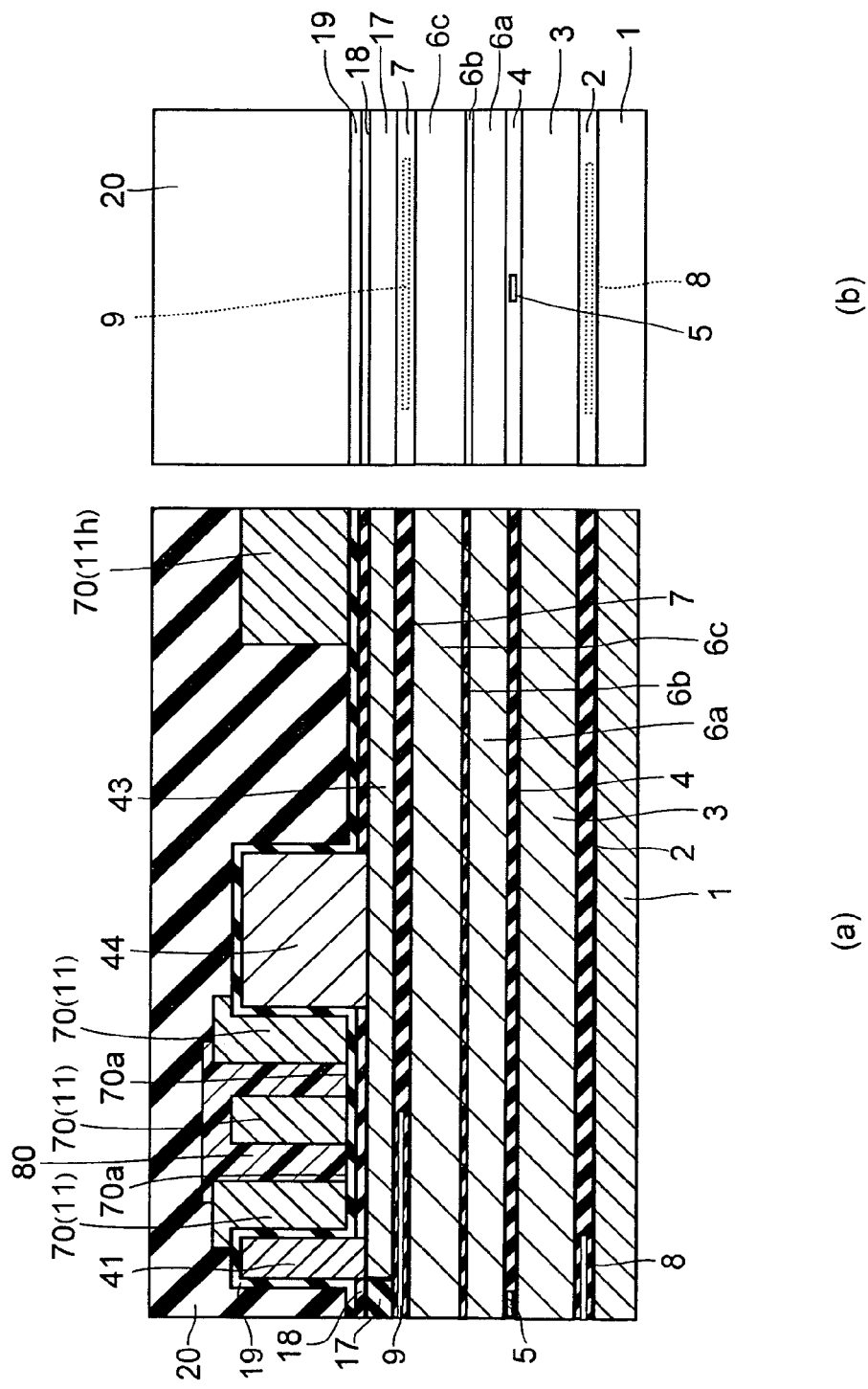
FIG. 13 illustrates a step subsequent to that of FIG. 12, in which (a) is a sectional view corresponding to FIG. 1, in which (b) is a front view corresponding to FIG. 2.
Figure 14:
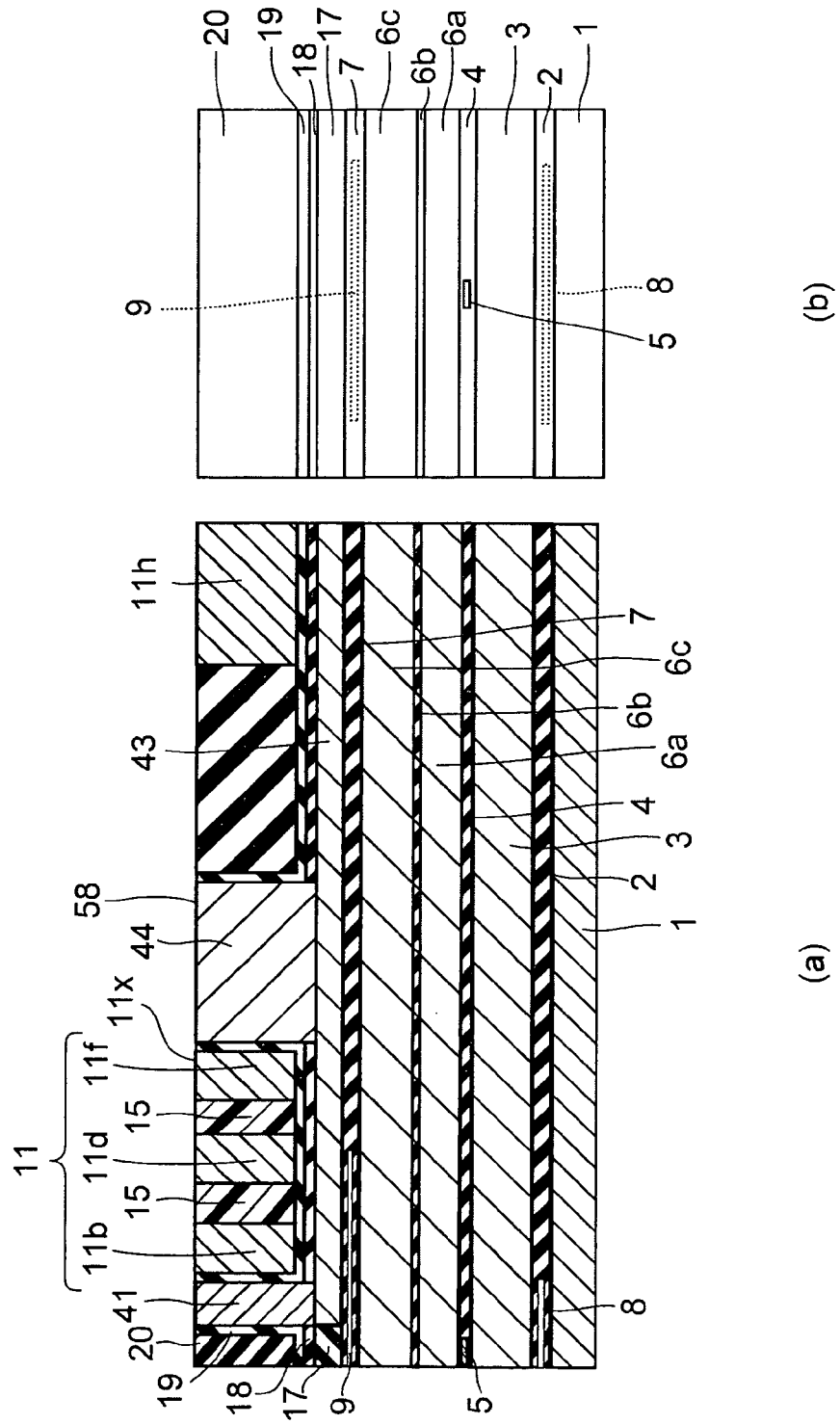
FIG. 14 illustrates a step subsequent to that of FIG. 13, in which (a) is a sectional view corresponding to FIG. 1, in which (b) is a front view corresponding to FIG. 2.
Figure 15:
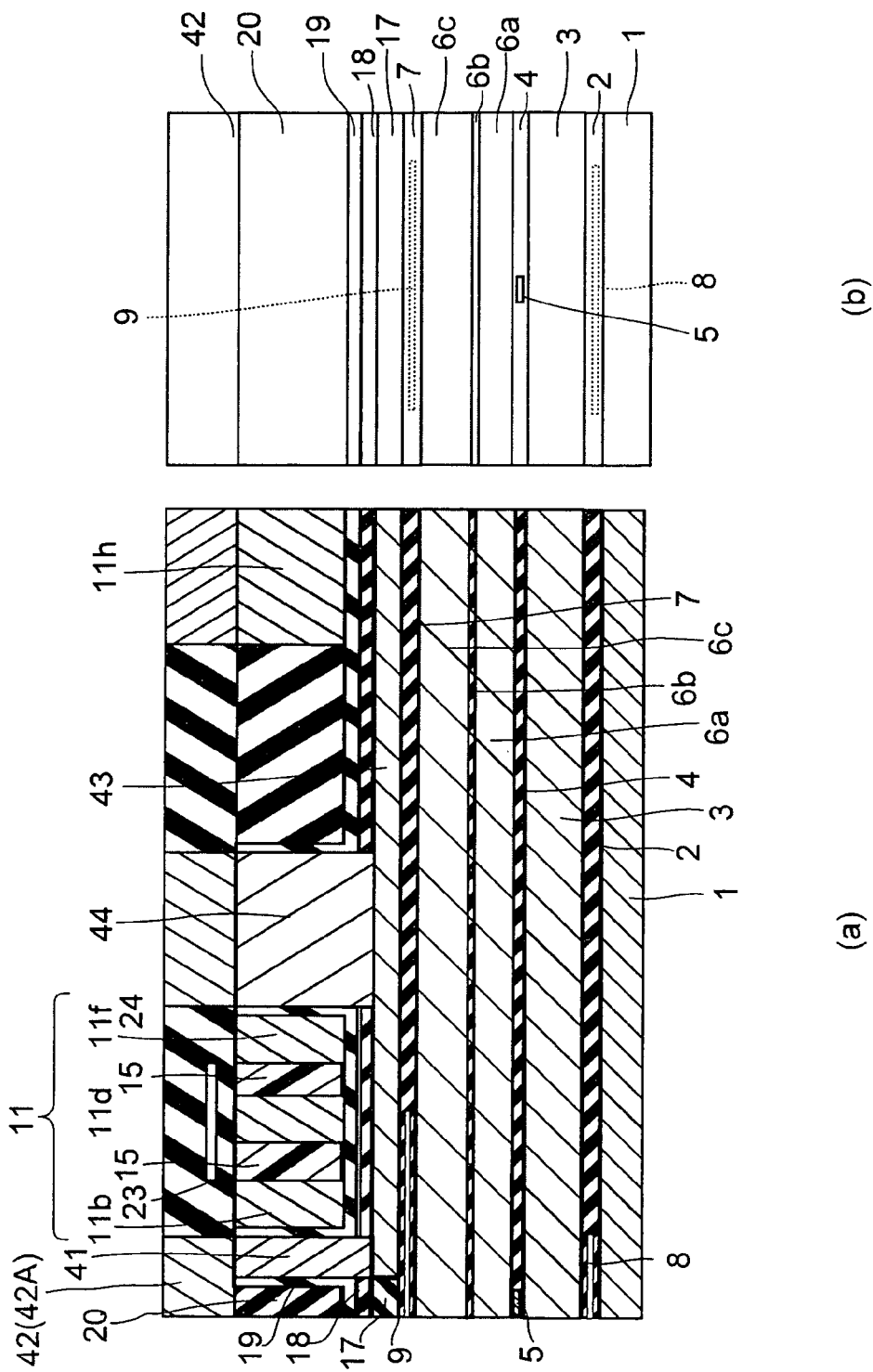
FIG. 15 illustrates a step subsequent to that of FIG. 14, in which (a) is a sectional view corresponding to FIG. 1, in which (b) is a front view corresponding to FIG. 2.
Figure 16:
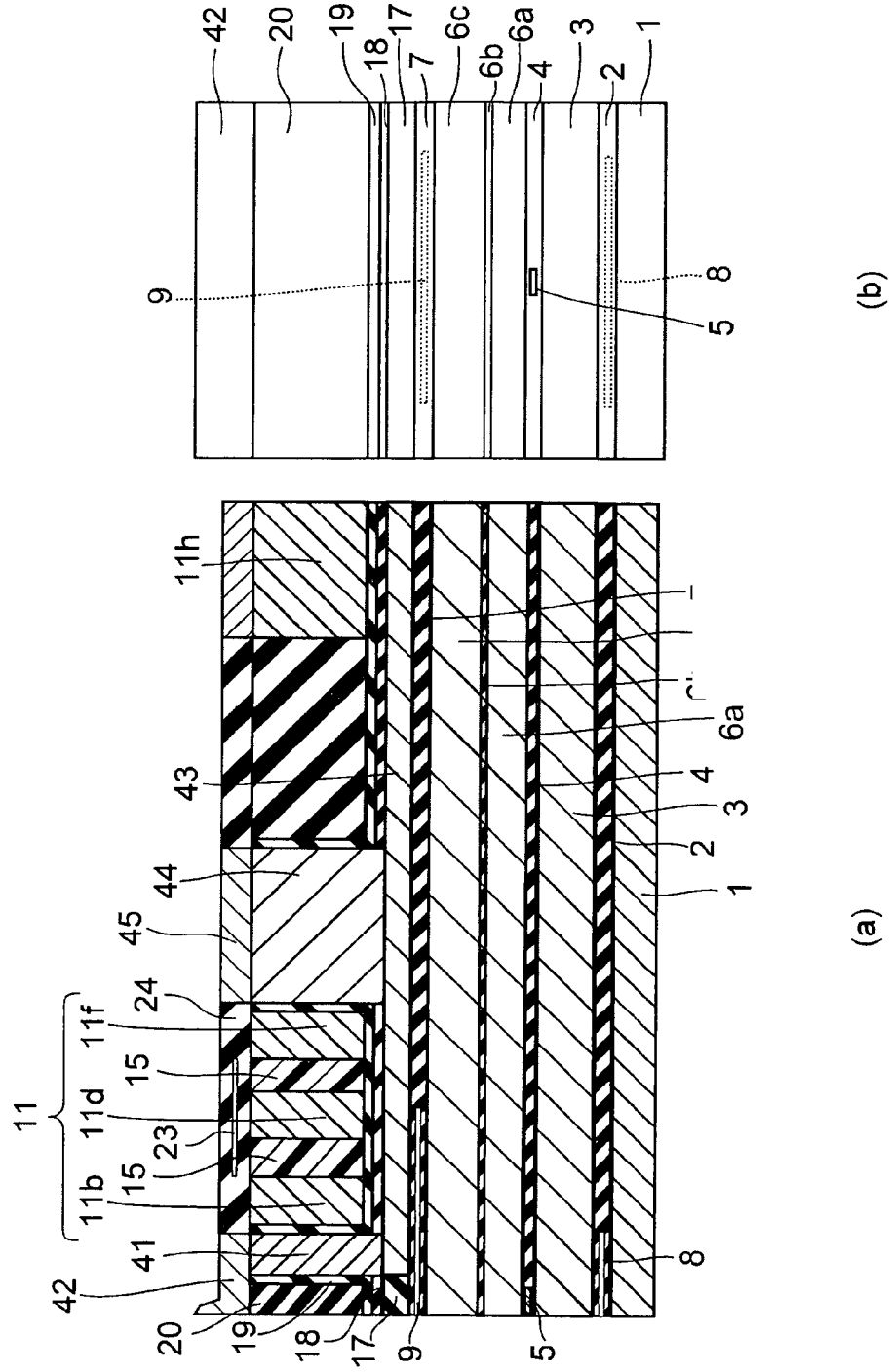
FIG. 16 illustrates a step subsequent to that of FIG. 15, in which (a) is a sectional view corresponding to FIG. 1, in which (b) is a front view corresponding to FIG. 2.
Figure 17:
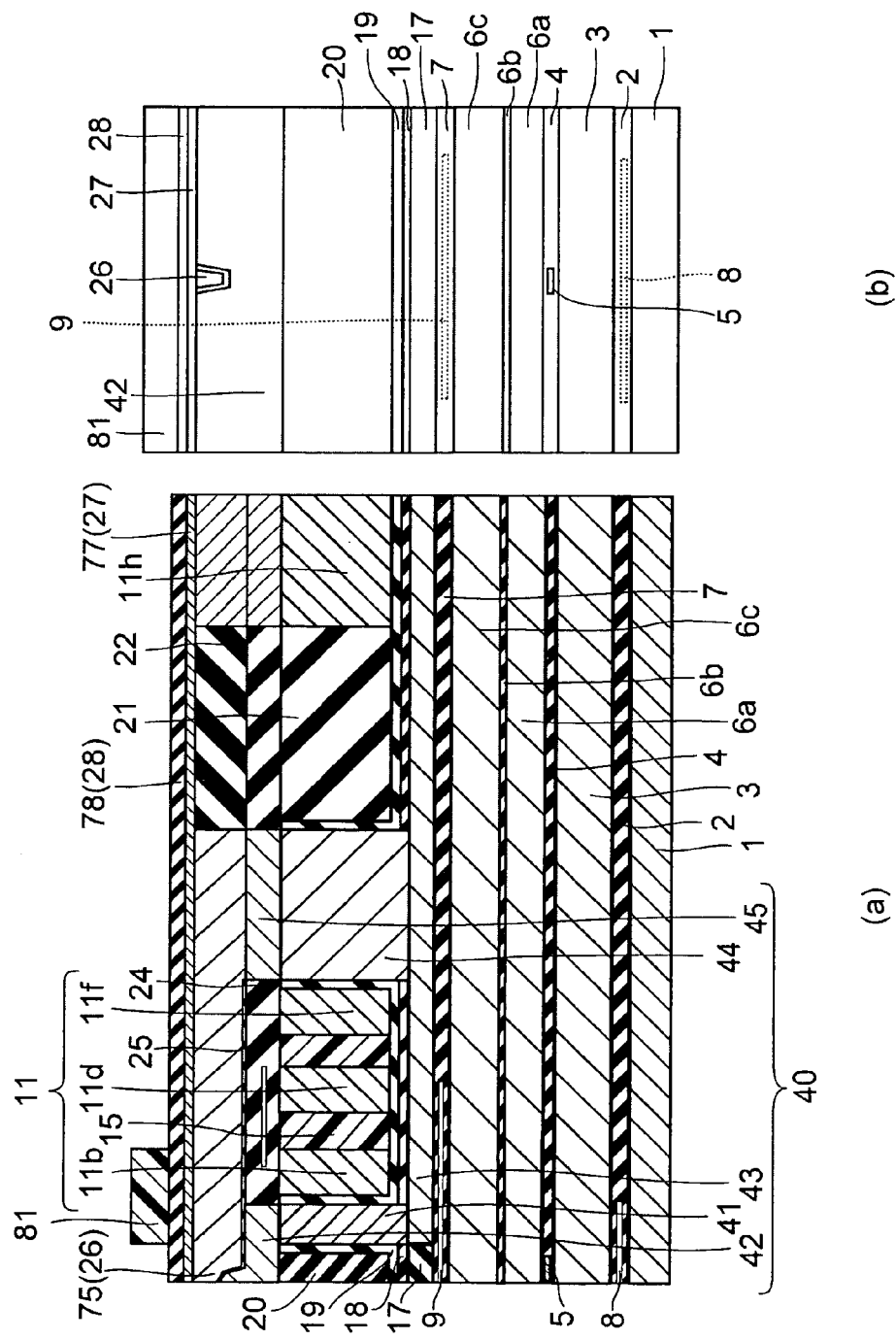
FIG. 17 illustrates a step subsequent to that of FIG. 16, in which (a) is a sectional view corresponding to FIG. 1, in which (b) is a front view corresponding to FIG. 2.

To begin with, the structure of a thin-film magnetic head of perpendicular magnetic recording type according to the first embodiment of the present invention will be explained with reference to FIG. 1 to FIG. 10. Here, FIG. 1 is a sectional view of the thin-film magnetic head 300 according to a first embodiment of the present invention taken along the line 1-1 of FIG. 2, along by a direction intersecting its air bearing surface (which will hereinafter be referred to as "ABS"), FIG. 2 is a front view illustrating the ABS 30 of the thin-film magnetic head 300. FIG. 3 is a plan view illustrating a lower thin-film coil 11. FIG. 4 is a plan view illustrating an upper thin-film coil 51. FIG. 5 is a plan view illustrating a principal part of the lower thin-film coil 11. FIG. 6 is a perspective view illustrating principal parts of an opposing shield part 61, an upper front shield part 62 and a linking shield part 63. FIG. 7 is a side elevation view illustrating a pre-trim shield part and the front shield part. FIG. 8 illustrates a modified example, in which (a) is a side elevation view of the upper front shield part 62 not having a lateral flat part, in which (b) is a side elevation view of the upper front shield part 62 not having a longitudinal flat part. FIG. 9 is a perspective view illustrating a neighborhood of the ABS in the main magnetic pole layer with a part thereof omitted. FIG. 10 is a sectional view illustrating a principal part of FIG. 1.

The thin-film magnetic head 300 comprises a substrate 1 and reproducing and recording heads laminated on the substrate 1, while having the ABS 30 as a medium-opposing surface opposing a recording medium. The following will explain structures of main parts of the thin-film magnetic head 300, while structures of parts other than the main parts will later be explained in manufacturing steps.

The reproducing head has an MR device 5, arranged near the ABS 30, for detecting a magnetic signal. The reproducing head has an insulating layer 2 formed on the substrate 1, a lower shield layer 3 made of a magnetic material, and a shield gap film 4 shielding the MR device 5. The reproducing head further has an upper shield layer 6 made of a magnetic material formed on the shield gap film 4, and an insulating layer 7 formed on the upper shield layer 6. The reproducing head is arranged in a position closer to the substrate 1 than the recording head.

The MR device 5 is constituted by a magnetosensitive film exhibiting a magnetoresistive effect, such as AMR (anisotropic magnetoresistive), GMR (giant magnetoresistive), and TMR (tunneling magnetoresistive) devices.

The upper shield layer 6 has an insulating part 6b in the middle thereof. Further, a first shield part 6a is formed on the lower side of the insulating part 6b and a second shield part 6c is formed on the upper side of the insulating part 6b.

In the thin-film magnetic head 300, a heating part 8 is formed in the insulating layer 2. The heating part 8 is also called a DFH (Disk flying heater) and has a function of generating heat by electric current flowing therethrough and conducting the heat to the upper shield layer 6 and the like. Further, a heat sensing part 9 is formed in the insulating layer 7. The heat sensing part 9 is also called an HDI (Head Disk Interlayer) sensor. The heat sensing part 9 is formed using an element which senses heat (temperature) near the upper shield layer 6 and changes in resistance value according to the sensed heat.

Further, in the thin-film magnetic head 300, the heating part 8 heats the upper shield layer 6 and the lower shield layer 3. The upper shield layer 6 and the lower shield layer 3 expand in volume by the heat received from the heating part 8. As a result, assuming that the upper shield layer 6 and the lower shield layer 3 come into contact with a recording medium not illustrated in FIG. 1, parts of the upper shield layer 6 and the lower shield layer 3 near the ABS 30 become heated due to friction. In the thin-film magnetic head 300, a judgment whether or not the upper shield layer 6 and the lower shield layer 3 have come into contact with the recording medium is made by detecting the change in resistance value of the heat sensing part 9 caused by the friction heat. Further, the frying height is controlled while controlling the current value flowing through the heating part 8 according to the judgment result.

The recording head has a lower thin-film coil 11, a base insulating layer 24, a main magnetic pole layer 26, a gap layer 29, a shield magnetic layer 40, an upper thin-film coil 51, an write shield layer 60, an upper yoke layer 65, a displacement suppression layer 85 and protective insulating layer 90, which are laminated on the substrate 1.

In the thin-film magnetic head 300, the lower thin-film coil 11 and the upper thin-film coil 51 form a continuous thin-film coil. The lower thin-film coil 11 corresponds to a part of the continuous thin-film coil, disposed between the main magnetic pole layer 26 and the substrate 1. Therefore, the lower thin-film coil 11 corresponds to a substrate side coil layer according to the embodiment of the present invention. Further, a part disposed at a position most distanced from the substrate 1 in the lower thin-film coil 11 is an upper end face 11x as illustrated in FIG. 10.

As illustrated in FIG. 3, the lower thin-film coil 11 has three turn parts 11b, 11d, 11f. The turn parts 11b, 11d, 11f are arranged between a later-described lower front shield part 41 and a first rear shield part 44. The lower thin-film coil 11 has a structure which the turn parts 11b, 11d, 11f align with each other while interposing a photoresist layer 15 therebetween. Since the turn part 11b is arranged at a closest position to the ABS 30 of the turn parts 11b, 11d, 11f, the turn part 11b corresponds to a front turn part. The turn part 11f corresponds to a rear turn part.

The lower thin-film coil 11 has a loop part 11a extending from a lead part 13A to the turn part 11b, a one-loop part 11c extending from the turn part 11b to the turn part 11d, and a one-loop part 11e extending from the turn part 11d to a turn part 11f, and a half-loop part 11g extending from the turn part 11f to a connecting part 11h.

The lower thin-film coil 11 is constructed as a continuous line from the lead part 13A to the connecting part 11, so as to be wound as a flat spiral about the shield magnetic layer 40, thus forming a three-turn loop as a whole. For convenience of illustration, FIG. 1 illustrates only the turn parts 11b, 11d, 11f and connecting part 11h in the lower thin-film coil 11. Each of the turn parts 11b, 11d, 11f has a longitudinally long structure in which the thickness (height in a direction (upper and lower direction) along with the ABS 30) greater than the lateral width. Note that the lateral width means width in a direction (intersecting direction) intersecting the ABS 30, in this embodiment.

In the lower thin-film coil 11, as illustrated in FIG. 5, the one-loop part 11c has a variable width structure in which the width gradually decreases toward the ABS 30 and becomes the smallest at the position closest to the ABS 30. Namely, when widths Wd1, Wd2, Wd0 are defined in the one-loop part 11c as illustrated in FIG. 5, Wd1>Wd2>Wd0. The narrowest part in the one-loop part 11c is the turn part 11d. The loop part 11a and the one-loop part 11e have a variable width structure similar to that of the one-loop part 11c, while the narrowest part is the turn part 11b, 11f. Here, the respective widths of the turn parts 11b, 11d, 11f are Wb0 (about 0.9 μm), Wd0 (about 0.9 μm) and Wf0 (about 0.9 μm).

The lower thin-film coil 11 forms a following continuous 3-turn loop. Namely, the lead part 13A is connected to the connecting part 11h through the loop part 11a, the one-loop part 11c, one-loop part 11e and the half-loop part 11g, whereby the 3-turn loop is formed.

Note that the distance from a front side face 11bf of the turn part 11b to the ABS 30 means a front distance of the lower thin-film coil 11. Besides, the distance from a rear side face 11fr of the turn part 11f to the ABS 30 means a rear distance of the lower thin-film coil 11.

Next, the upper thin-film coil 51 will be explained. As illustrated in FIG. 4, the upper thin-film coil 51 has three turn parts 51g, 51e, 51c. The turn parts 51g, 51e, 51c are arranged between a later-described upper front shield part 62 and an upper rear shield part 64. The upper thin-film coil 51 has a structure which the turn parts 51g, 51e, 51c align with each other while interposing a photoresist layer 55 therebetween. Since the turn part 51g is arranged at a closest position to the ABS 30 of the turn parts 51g, 51e, 51c, the turn part 51g corresponds to a front turn part. The turn part 51c corresponds to a rear turn part.

The upper thin-film coil 51 has a loop part 51b extending from a connecting part 51a to the turn part 51c, a one-loop part 51*d* extending from the turn part 51*c* to the turn part 51*e*, and a one-loop part 51*f* extending from the turn part 51*e* to a turn part 51*g*, and a half-loop part 51*h* extending from the turn part 51*g* to a lead part 14A.

The upper thin-film coil 51 is constructed as a continuous line from the connecting part 51*a* to the lead part 14A, so as to be wound as a flat spiral about the write shield layer 60, thus forming a three-turn loop as a whole. For convenience of illustration, FIG. 1 illustrates only the turn parts 51*g*, 51*e*, 51*c* and the connecting part 51*a* in the upper thin-film coil 51. Each of the turn parts 51*g*, 51*e*, 51*c* has the longitudinally long structure and the variable width structure similarly to the turn parts 11*b*, 11*d*, 11*f*. The narrowest part in the one-loop part 51*f*, one-loop part 51*d* and the loop part 51*b* are the turn part 51*g*, 51*e*, 51*c* respectively.

The upper thin-film coil 51 forms a following continuous 3-turn loop. Namely, the connecting part 51*a* is connected to the lead part 14A through the loop part 51*b*, the one-loop part 51*d*, one-loop part 51*f* and the half-loop part 51*h*, whereby the 3-turn loop is formed.

Further, as illustrated in FIG. 1, the upper thin-film coil 51 has an upper end face 51A. The upper end face 51A is disposed at a position most distanced from the substrate 1. The upper end face 51A is formed without level difference to a later-described shield upper end face 62*f* to form a common flat surface 59 (see FIG. 21) together with the shield upper end face 62*f*. Further, the upper thin-film coil 51 is connected to an upper face of a later-described upper yoke layer 65 via only the interlayer insulating layer 32. The upper thin-film coil 51 is connected to the upper yoke layer 65 without a magnetic layer made of a magnetic material intervening therebetween.

In the thin-film magnetic head 300, the connecting part 11*h* of the lower thin-film coil 11 is connected to the connecting part 51*a* of the upper thin-film coil 51. By this, the lower thin-film coil 11 and the upper thin-film coil 51 form a series of coils. A current corresponding to data to be recorded on a recording medium is flowed through the lower thin-film coil 11 and the upper thin-film coil 51, a recording magnetic field is generated by the current.

Next, the main magnetic pole layer 26 will be explained. The main magnetic pole layer 26 is formed using a magnetic material made of a ferromagnetic body such as NiFe, CoNiFe, CoFe or the like. The ferromagnetic body such as NiFe, CoNiFe, CoFe or the like has a high magnetic permeability. Therefore, a magnetic flux is likely to transmit through the main magnetic pole layer 26, much more magnetic flux transmit through the main magnetic pole layer 26. For this reason, more strong magnetic flux corresponding to the recording magnetic field is emitted from the main magnetic pole layer 26 to the ABS 30.

The main magnetic pole layer 26 has a magnetic pole end face 26*a* on the ABS 30 side, as illustrated in FIG. 2, FIG. 9, FIG. 10. The magnetic pole end face 26*a* has a bevel form which is wider on the upper thin-film coil 51 side than on the lower thin-film coil 11 side and gradually decreases its width toward the lower thin-film coil 11. The width of the magnetic pole end face 26*a* on the upper thin-film coil 51 side defines the track width. The track width is about 0.06 to 0.12 μm, for example. The magnetic pole end face 26*a* is positioned on the ABS 30.

The main magnetic pole layer 26 includes a track width determining part having the magnetic pole end face 26*a*, a wider part and a width extending part. The track width determining part has a fixed width regardless of the distance from the ABS 30. The wider part is arranged at a position distanced more from the ABS 30 than is the track width determining part and has a width greater than that of the track width determining part. The wider part has the same width as that of the track width determining part at the boundary with the track width determining part, gradually increases the width as it is distanced more from the ABS 30. The width extending part has a fixed width greater than the wider part. In this embodiment, a part from the magnetic pole end part 26*a* until the width begins to increase is defined as the track width determining part.

Further, as illustrated in FIG. 9, in the main magnetic pole layer 26, a first upper tilted surface 26*b* and a second upper tilted surface 26*c* and a first lower tilted surface 26*h* and a second lower tilted surface 26*e* are formed in the track width determining part.

Each of the first upper tilted surface 26*b* and the second upper tilted surface 26*c* is formed in an ascending slope like shape distanced more from the substrate 1 as it is distanced more from the ABS 30. However, the tilt angle of the second upper tilted surface 26*c* is larger than the tilt angle of the first upper tilted surface 26*b* as seen from the direction intersecting the ABS 30. Therefore, the upper face of the track width determining part is formed in a two-stage tilt structure. The first upper tilted surface 26*b* is connected to the magnetic pole end face 26*a* and the second upper tilted surface 26*c*. The second upper tilted surface 26*c* is connected to the first upper tilted surface 26*b* and an upper end face 26*d* of the wider part.

Each of the first lower tilted surface 26*h* and the second lower tilted surface 26*e* is formed in a descending slope like shape closer to the substrate 1 as it is distanced more from the ABS 30. However, the tilt angle of the second lower tilted surface 26*e* is larger than the tilt angle of the first lower tilted surface 26*h* as seen from the direction intersecting the ABS 30. Therefore, the lower end face of the track width determining part is also formed in a two-stage tilt structure. The first lower tilted surface 26*h* is connected to the magnetic pole end face 26*a* and the second lower tilted surface 26*e*. The second lower tilted surface 26*e* is connected to the first lower tilted surface 26*h* and a lower end face 26*f* of the wider part. The lower end face 26*f* is disposed on the nearest position to the substrate 1 in the main magnetic pole layer 26.

In the main magnetic pole layer 26, nonmagnetic layers 27, 28 are laminated on a part of the upper end face 26*d* between an opposing shield part 61 and the upper yoke layer 65 which will be explained later.

The length of the track width determining part from the ABS 30 is referred to as neck height. The neck height is about 0.05 to 0.3 μm, for example.

An opposing insulating layer 20 has a front end face 20*a* as illustrated in FIG. 10. The entire front end face 20*a* is disposed in the ABS 30. The opposing insulating layer 20 is disposed on the ABS 30 side of the lower front shield part 41. Further, an upper end face 20*b* of the opposing insulating layer 20 is formed in a flat shape continuous from a later-described upper end face 41*a* and the upper end face 11*x* without level difference therebetween.

A base insulating layer 24 is disposed at a position distanced more from the ABS 30 than is a leading shield part 42. The base insulating layer 24 is in contact with the lower end face 26*f* of the main magnetic pole layer 26 through a nonmagnetic thin-film 25. Further, a heating part 23 is formed inside the base insulating layer 24 as illustrated in FIG. 1. The upper end face 11*x* is in direct contact with the base insulating layer 24.

The gap layer 29 is formed along the first upper tilted surface 26*b*, the second upper tilted surface 26*c* and the upper end face 26*d* of the main magnetic pole layer 26 between the opposing shield part 61, the insulating layer 31 and the main magnetic pole layer 26, the nonmagnetic layers 27, 28. The gap layer 29 is formed so as to cover the first upper tilted surface 26b, the second upper tilted surface 26c and the upper end face 26d. The gap layer 29 is made of an insulating material such as alumina ($Al_2O_3$), nonmagnetic conductive material such as Ru, NiCu, Ta.

Subsequently, the shield magnetic layer 40 will be explained. The shield magnetic layer 40 has a lower front shield part 41, a leading shield part 42, a linking shield part 43, a first rear shield part 44 and a second rear shield part 45. The shield magnetic layer 40 is formed using a magnetic material made of a ferromagnetic body such as NiFe, CoNiFe, CoFe or the like.

The lower front shield part 41 and the leading shield part 42 are arranged closer to the ABS 30 than are the lower thin-film coil 11.

The leading shield part 42 has a shield end face 42a as illustrated in detail in FIG. 10. The entire shield end face 42a is disposed in the ABS 30. Further, the leading shield part 42 opposes the main magnetic pole layer 26 through the nonmagnetic thin-film 25, at the first lower tilted surface 26h disposed on the substrate 1 side of the main magnetic pole layer 26.

The leading shield part 42 is in contact with the main magnetic pole layer 26 through the nonmagnetic thin-film 25, at the second lower tilted surface 26e and the lower end face 26f. Further, the leading shield part 42 is formed such that the space between a lower end face 42b and the substrate 1 is a height h1. The height h1 is equal to the space between the above-described upper end face 11x and the substrate 1. The lower end face 42b is disposed at a position closest to the substrate 1 in the leading shield part 42. The lower end face 42b is in direct contact with both the upper end face 20b of the opposing insulating layer 20 and the upper end face 41a of the lower front shield part 41. Therefore, no gap is formed between the lower end face 42b, and the upper end face 20b and the upper end face 41a.

Further, in the leading shield part 42, a v-groove part is formed at a middle part in the width direction. The v-groove part is formed in an almost v-shape in cross section. The bottom part of the v-groove part has a two-stage tilt structure according to the lower face of the track width determining part of the main magnetic pole layer 26. As illustrated in FIG. 2, the later-described nonmagnetic thin-film 25 and the track width determining part of the main magnetic pole layer 26 are housed inside the v-groove part. The nonmagnetic thin-film 25 is formed on an inner face inside the v-groove part. A gap layer 29 is formed on the upper side of the v-groove part in a manner to cover the v-groove part.

Further, the leading shield part 42 has a cutout part. The cutout part is formed on the rear side of the v-groove part. Inside the cutout part, a part of the wider part of the main magnetic pole layer 26 is housed.

Further, at the lower front shield part 41, its upper end face 41a is formed in a flat shape continuous from the upper end face 11x without level difference therebetween.

As illustrated in FIG. 1, the linking shield part 43 is formed such as to straddle the turn parts 11b, 11d, 11f of the lower thin-film coil 11, and connects the lower front shield part 41 and the first rear shield part 44 to each other. The linking shield part 43 has a function as a return pole which backs the magnetic flux emitted from the main magnetic pole layer 26.

The first and second rear shield parts 44,45 are arranged farther from the ABS 30 than are the turn parts 11b, 11d, 11f of the lower thin-film coil 11. Further, the second rear shield part 45 overlies the first rear shield part 44. The first and second rear shield parts 44, 45 form a two-stage structure in which their respective front side faces closer to the ABS 30 are equidistant from the ABS 30. The first and second shield parts 44, 45 have a function as a linking part which link the linking part 43 to the main magnetic pole layer 26.

Next, the write shield layer 60 will be explained. The write shield layer 60 has an opposing shield part 61, an upper front shield part 62, a linking shield part 63 and an upper rear shield part 64.

The opposing shield part 61 has front end face exposed at the ABS 30. The opposing shield part 61 opposes the leading shield part 42 within the ABS 30. Besides, a very small space which the gap layer 29 is arranged is formed in the front end face of the opposing shield part 61 exposed at the ABS 30. A part of ABS 30 side of the gap layer 29 is formed in the very small space. The opposing shield part 61 is formed such as to oppose the main magnetic pole layer 26, nonmagnetic layer 27, and nonmagnetic layer 28 sequentially from the ABS 30 side through the gap layer 29. The opposing shield part 61 has a flat upper end face, to which the upper front shield part 62 is connected.

The upper front shield part 62 is arranged closer to the ABS 30 than are the upper thin-film coil 51. This upper front shield part 62 will be explained with reference to FIG. 6, FIG. 7.

The upper front shield part 62 has a shield front end face 62b, a shield upper end face 62f, a shield connecting part 62c, and a shield lower end face 62r. The shield front end face 62b is disposed in the ABS 30. The shield front end face 62b is exposed in the ABS 30. In FIG. 6, a part with cross-hatching represents the shield front end face 62b. The shield upper end face 62f is disposed at a position distanced more from the substrate 1 than is the shield front end face 62b. The side distanced more from the substrate 1 is also called an upper side and the side closer to the substrate 1 is also called a lower side. The shield upper end face 62f is connected to the linking shield part 63. The shield upper end face 62f is formed along the direction intersecting the ABS 30. In addition, the shield upper end face 62f is formed separated from the ABS 30. The shield upper end face 62f has a size smaller than that of the shield lower end face 62r.

The shield connecting part 62c is a part connecting the shield front end face 62b to the shield upper end face 62f. The whole part of the shield connecting part 62c excepting a connecting part 62x with the shield front end face 62b is disposed at a position distanced from the ABS 30.

The shield connecting part 62c has a tilt structure tilted to be gradually distanced more from the ABS 30 as it gets closer, starting from the connecting part 62x, to a connecting part 62y connected to the shield upper end face 62f. The connecting part 62x is disposed in the ABS 30, but the connecting part 62y is disposed at a position distanced from the ABS 30 and thus receded from the ABS 30.

Further, as illustrated in FIG. 7, considering an imaginary flat surface 99 linking the connecting part 62x and the connecting part 62y, the flat surface 99 is a flat surface linking the shield front end face 62b and the shield upper end face 62f at a shortest distance. The shield connecting part 62c has a receding tilt structure tilted to be distanced more from the ABS 30 than is the flat surface 99. Further, the shield connecting part 62c has a lateral flat part 62c1, a longitudinal flat part 62c2, and a curved part 62c3 and has a structure that they are smoothly linked together into one body. The lateral flat part 62c1 is generally formed along the direction intersecting the ABS 30. The longitudinal flat part 62c2 is generally formed along the ABS 30.

The shield lower end face 62r is formed along the direction intersecting the ABS 30. The shield lower end face 62r has a size reaching the ABS 30. The shield lower end face 62r has a size larger than that of the shield upper end face 62f. The shield lower end face 62r is connected with the opposing shield part 61 on the ABS 30 side, and connected with the insulating layer 31 on the rear side of the shield lower end face 62r distanced more from the ABS 30.

The upper front shield part 62 has the above-described structure and therefore has an end face disposed in the ABS 30 that is smaller in size and in volume than that of the pre-trim front shield part 62A (the upper side in FIG. 7). The pre-trim front shield part 62A is an upper front shield part immediately before it is formed by performing a later-described trimming step. The pre-trim front shield part 62A has the shield upper end face 62f reaching the ABS 30 and has a pre-trim front end face 62a. Comparing the sizes of the pre-trim front end face 62a and the shield front end face 62b, the shield front end face 62b<the pre-trim front end face 62a.

Next, the linking shield part 63 is formed such as to straddle the turn part 51g, 51e, 51c of the upper thin-film coil 51. The linking shield part 63 is formed separated from the ABS 30. The linking shield part 63 is connected to the upper front shield part 62 and the upper rear shield part 64.

The upper rear shield part 64 is arranged at a position distanced more from the ABS 30 than is the turn part 51g, 51e, 51c of the upper thin-film coil 51. The upper rear shield part 64 is connected to the linking shield part 63 and the upper yoke layer 65. A height of the upper rear shield part 64 is equal to a height of the upper front shield part 62. Therefore, the upper rear shield part 64 forms a common flat surface 59 together with the upper thin-film coil 51 and shield upper end face 62f.

Figure 18:
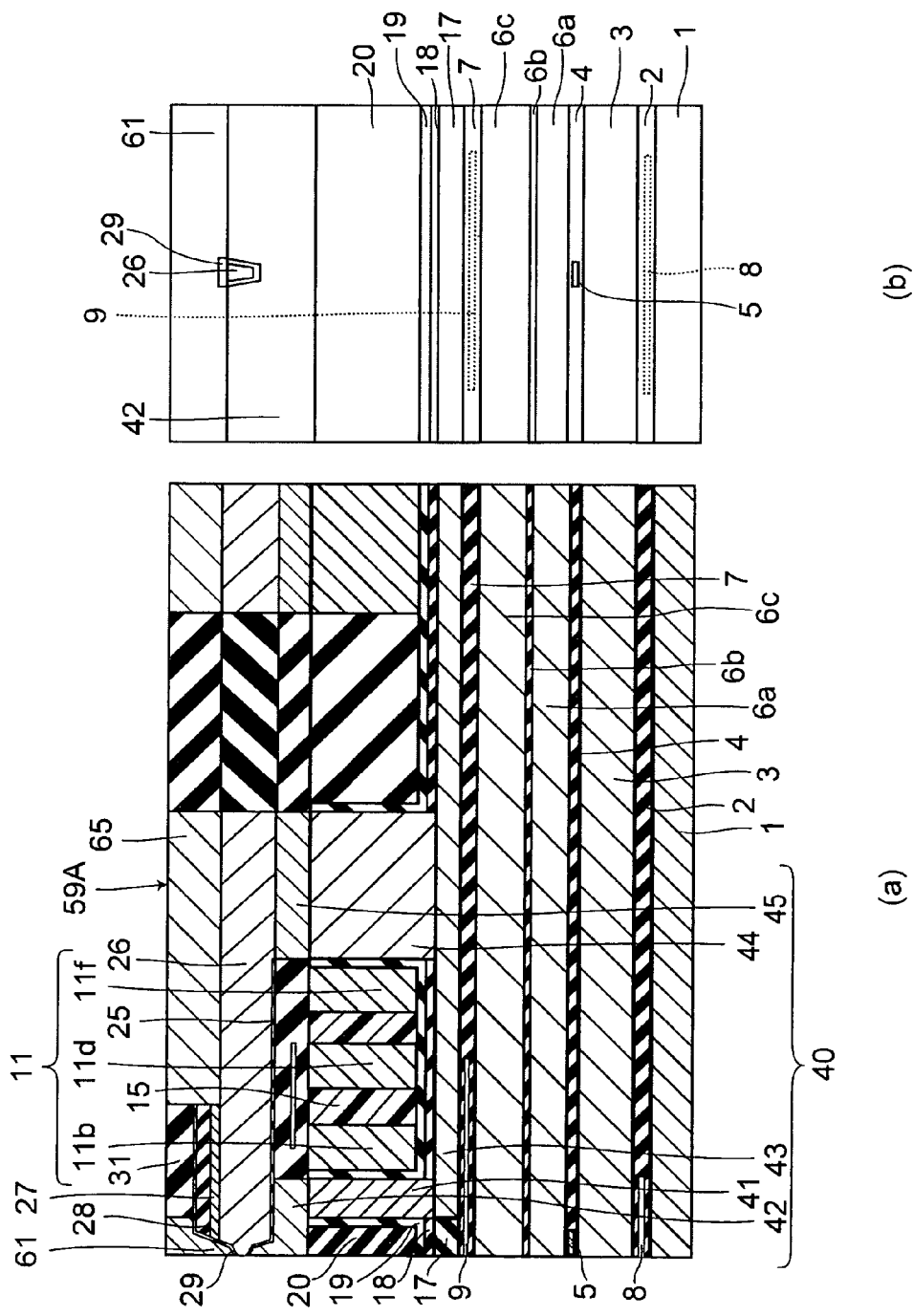
FIG. 18 illustrates a step subsequent to that of FIG. 17, in which (a) is a sectional view corresponding to FIG. 1, in which (b) is a front view corresponding to FIG. 2.

The upper yoke layer 65 is connected to a rear side of the upper end face 26d in the main magnetic pole layer 26, distanced more from the ABS 30 than is the nonmagnetic layers 27, 28. An upper end face of the upper yoke layer 65 is formed without level difference to an upper end face of the opposing shield part 61. The end face of the upper yoke layer 65 forms a common flat surface 59A (see FIG. 18) together with the upper end face of the opposing shield part 61.

Moreover, the thin-film magnetic head 300 has a displacement suppression layer 85. The displacement suppression layer 85 is connected an upper end face of the linking shield part 63. The displacement suppression layer 85 is formed from a nonmagnetic material having a low coefficient of linear thermal expansion. For example, the displacement suppression layer 85 is preferably made of an inorganic or metal material, examples of which include SiC, AlN, $Si_3N_4$, and W (tungsten). It will be preferred in particular to use a nonmagnetic material having a high hardness for the displacement suppression layer 85. For example, the displacement suppression layer 85 is preferably made of SiC, which has a Vickers hardness higher than that of alumina.

Further, the thin-film magnetic head 300 has a protective insulating layer 90. The protective insulating layer 90 is formed using an insulating material such as alumina ($Al_2O_3$). The protective insulating layer 90 has an embedded part 90a and a cover part 90b. The embedded part 90a and the cover part 90b are formed in one body. The embedded part 90a comes in contact with an all of the shield connecting part 62c, and is embedded with no space between the shield connecting part 62c and the ABS 30. The cover part 90b is formed so as to cover the linking shield part 63 and the displacement suppression layer 85.

(Method of Manufacturing Thin-Film Magnetic Head)

A method of manufacturing the thin-film magnetic head 300 having the structure mentioned above will now be explained with reference to FIG. 11(a), FIG. 11(b) to FIG. 23(a), FIG. 23(b) together with FIG. 1, FIG. 2, FIG. 7, FIG. 10 mentioned above.

FIG. 11(a) to FIG. 23(a) is sectional view corresponding to FIG. 1 in respective step of manufacturing the thin-film magnetic head 300, while FIG. 11(b) to FIG. 23(b) is front view similarly corresponding to FIG. 2.

First, the substrate 1 made of a ceramic material such as aluminum oxide-titanium carbide ($Al_2O_3$.TiC) is prepared. Subsequently, as illustrated in FIG. 11(a), FIG. 11(b), the insulating layer 2 made of an insulating material such as alumina ($Al_2O_3$) and the lower shield layer 3 made of a magnetic material are successively formed on the substrate 1. The heating part 8 is formed when the insulating layer 2 is formed.

Then, the shield gap film 4 is formed by an insulating material such as to shield the MR device 5. Here, an undepicted lead connected to the MR device 5 is formed, and the MR device 5 and the lead are covered with the shield gap film 4. Thereafter, using a magnetic material and an insulating material, the upper shield layer 6 (the first shield part 6a, the insulating part 6b, the second shield part 6c) is formed on the shield gap film 4.

Next, the insulating layer 7 for separating the upper shield layer 6 and a recording head to be formed later from each other is formed by an insulating material such as alumina ($Al_2O_3$). The heat sensing part 9 is formed when the insulating layer 7 is formed. The foregoing steps yield a multilayer body for forming the recording head. Thereafter, a magnetic layer (having a thickness of about 0.6 μm) for forming the linking shield part 43 is formed by using a magnetic material such as NiFe or CoNiFe or the like, so as to form an insulating layer on the surface of the multilayer body, and the surface of the multilayer body is flattened by chemical mechanical polishing (hereinafter, referred to as "CMP"). This forms an opposing insulating layer 17 and the linking shield part 43. Here, the linking shield part 43 is formed such as to be separated from the ABS 30 by 0.3 to 1 μm (about 0.5 μm in this embodiment).

Subsequently, an insulating layer 18 (having a thickness of about 0.1 to 0.3 μm) made of alumina ($Al_2O_3$) is formed on the whole surface of the multilayer body. Then, after applying a photoresist to the whole surface of the multilayer body, patterning is performed with a predetermined photomask, so as to form a resist pattern (not depicted). Using this resist pattern as a mask, etching such as RIE is performed, so as to selectively perforate the insulating layer 18.

Then, a lower front magnetic layer forming step is performed. In this step, as illustrated in FIG. 11(a), FIG. 11(b), a lower front magnetic layer 41A is formed. The lower front magnetic layer 41A is a magnetic layer to form the lower front shield part 41. By frame plating method, using a magnetic material made of a ferromagnetic body such as NiFe or CoNiFe or the like, the lower front magnetic layer 41A is formed by a thickness of about 1.4-2.0 μm. At this time, a magnetic layer 44A to form the first rear shield part 44 is formed too.

Next, as illustrated in FIG. 12(a), FIG. 12(b), an insulating layer 19 (having a thickness of about 0.02 μm to 0.3 μm, preferably about 0.1 μm to 0.2 μm) made of alumina ($Al_2O_3$) is formed on the whole surface of the multilayer body by CVD (Chemical Vapor Deposition) according to an atomic layer method. The insulating layer 19 is formed so as to cover the lower front magnetic layer 41A and the magnetic layer 44A.

Then, a conductor layer 70 is formed by performing a conductor layer forming step. The conductor layer 70 is formed to form the lower thin-film coil 11. In this step, first, a conductor layer 70 is formed between the lower front magnetic layer 41A and the magnetic layer 44A by frame plating method. The conductor layer 70 is formed such as to have two interstices 70a between the lower front magnetic layer 41A and the magnetic layer 44A and come into contact with the lower front magnetic layer 41A and the magnetic layer 44A through the insulating layer 19 without gaps. The conductor layer 70 is an intermittent conductor layer, since it is provided with interstices 70a.

Next, as illustrated in FIG. 13(a), FIG. 13(b), a photoresist layer 80 (having a thickness of about 1.5 μm to 2.5 μm) is formed so as to be embedded the two interstices 70a in the conductor layer 70. Next, an insulating film 20 adapted to cover the surface of the multilayer body is formed using alumina ($Al_2O_3$) by a thickness of about 3 μm to 4 μm. Subsequently, common flat surface forming step is performed. In this step, planarization the surface of the multilayer body is performed to form the above-described common flat surface 58. In this case, the surface of the multilayer body is polished by CMP until the lower front magnetic layer 41A and the magnetic layer 44A emerge, so as to become flat.

Then, as illustrated in FIG. 14(a), FIG. 14(b), planarization processing is performed on the lower front magnetic layer 41A and the magnetic layer 44A together with the conductor layer 70 to form a common flat surface 58 on the surface of the multilayer body. The common flat surface 58 includes the above-described upper end face 11x and includes the surface of the lower front magnetic layer 41A and the surface of the magnetic layer 44A. Further, the planarization processing also forms the lower thin-film coil 11. In this event, the opposing insulating layer 20 is formed on the ABS 30 side of the lower front shield part 41, and therefore the planarization processing includes an opposing insulating layer forming step.

Then, as illustrated in FIG. 15(a), FIG. 15(b), the base insulating layer 24 is formed on the common flat surface 58 using an insulating material such as alumina ($Al_2O_3$) or the like. The heating part 23 is formed when the base insulating layer 24 is formed. After that, the base insulating layer 24 is selectively perforated.

Subsequently, magnetic layer forming step is performed. In this step, the leading magnetic layer 42A is directly formed on the surface of the opposing insulating layer 20 and the surface of the lower front magnetic layer 41A in the common flat surface 58. The leading magnetic layer 42A is a magnetic layer to form the leading shield part 42. Further, in this magnetic layer forming step, a magnetic layer to become the second rear shield part 45 and the leading magnetic layer 42A are formed together respectively in a thickness of 0.5 μm to 1.0 μm. These magnetic layers are formed in the opened part of the base insulating layer 24 by the frame plating method using a magnetic material made of a ferromagnetic body such as NiFe or CoNiFe.

Next, a leading shield part forming step is performed. In this step, the surface of the leading magnetic layer 42A, the surface of the base insulating layer 24 and the surface of the magnetic layer which will be the second rear shield part 45 are etched as follows according to the shape on the lower end face side of the main magnetic pole layer 26. Thus, the leading magnetic layer 42A forms the leading shield part 42 as illustrated in FIG. 16(a), FIG. 16(b). Further, the base insulating layer 24 is reduced in thickness and the second rear shield part 45 is also formed.

In this case, photoresist is applied on the surface of the multilayer body and then patterned using a predetermined photomask to form a resist pattern. This resist pattern is formed in a shape exposing the surface of the leading magnetic layer 42A, the surface of the base insulating layer 24 and the surface of the magnetic layer to become the second rear shield part 45 into a shape according to a shape of the main magnetic pole layer 26 in a lower end face side. Using the resist pattern as a mask, reactive ion etching (hereinafter, referred to as "RIE") is performed to remove a part of the surface of the multilayer body which is not covered with the resist pattern.

Thus, the v-groove part and the cutout part are formed in the leading magnetic layer 42A, whereby the leading shield part 42 is formed. Besides, the base insulating layer 24 and the second rear shield part 45 are also formed.

Then, a main magnetic pole layer forming step is performed. In this case, as shown in illustrated in FIG. 17(a), FIG. 17(b), a nonmagnetic thin-film 25 is formed on the surface of the leading shield part 42 and base insulating layer 24. The nonmagnetic thin-film 25 is formed by sputtering with a nonmagnetic metal material such as Ru, NiCr, or NiCu, or an insulating material such as alumina. The nonmagnetic thin-film 25 is also formed at v-groove part of the leading shield part 42.

After that, a magnetic layer 75 is formed on the whole surface of the multilayer body. This magnetic layer 75 is formed by sputtering with a magnetic material made of a ferromagnetic body such as CoNiFe, CoFe, NiFe by thickness of about 0.4 to 0.8 μm. The main magnetic pole layer 26 is formed later by this magnetic layer 75. Further, the whole surface of the multilayer body is polished by CMP, so as to become flat.

After that, a nonmagnetic layer 77 (having a thickness of about 0.04 to 0.1 μm) is formed on the whole surface of the multilayer body by sputtering with a metal material such as Ru, NiCr, or NiCu. The nonmagnetic layer 77 will partly be etched away later, so as to become the above-mentioned nonmagnetic layer 27. Further, using an inorganic insulating material such as alumina ($Al_2O_3$) or silicon oxide, a nonmagnetic layer 78 (having a thickness of about 0.1 to 0.3 μm) is formed on the whole surface of the multilayer body. The nonmagnetic layer 78 will partly be etched away later, so as to become the above-mentioned nonmagnetic layer 28.

Subsequently, after applying a photoresist to the whole surface of the multilayer body, patterning with a predetermined photomask is performed, so as to form a resist pattern 81 near the ABS 30.

Next, using the resist pattern 81 as a mask, etching such as RIE, for example, is performed, so as to remove a part of the nonmagnetic layer 78. The etching in this case is performed such as to stop at the time when the bottom part of a groove formed by etching reaches the upper face of the nonmagnetic layer 77. To this aim, a material yielding an etching rate lower than that of the nonmagnetic layer 77 is used for the nonmagnetic layer 78.

After that, the resist pattern 81 is removed. Then, using the remaining nonmagnetic layer 78 as a mask, a part of the nonmagnetic layer 77 is etched away by IBE, for example. Further, using the remaining nonmagnetic layer 77 as a mask, a part of the nonmagnetic layer 75 is etched away by IBE, for example. This step forms the first upper tilted surface 26b or the like on the ABS side of the magnetic layer 75 and the main magnetic pole layer 26 is formed.

Subsequently, as illustrated in FIG. 18(a), 18(b), the gap layer 29 is formed on the whole surface of the multilayer body by sputtering or CVD with an insulating material such as alumina ($Al_2O_3$) or a nonmagnetic conductive material such as Ru, NiCu, or Ta.

Further, an undepicted stopper film is formed by sputtering, for example, and a nonmagnetic film is formed thereon. Subsequently, an undepicted photoresist is applied to the whole surface of the multilayer body. Then, patterning with a predetermined photomask is performed, so as to form an undepicted resist pattern. Using this resist pattern as a mask, the nonmagnetic film is etched by RIE, for example. This etching is performed such as to stop when the bottom part of a groove formed by etching reaches the upper face of the stopper film. Then, after removing the resist pattern that is not depicted, the remaining nonmagnetic film is used as a mask for partly etching the gap layer 29, nonmagnetic layer 77 and nonmagnetic layer 78 away by RIE or the like. Here, the gap layer 29, nonmagnetic layer 77 and nonmagnetic layer 78 are partly removed, so as to secure a space for forming the above-mentioned upper yoke layer 65.

Subsequently, the opposing shield part 61 is formed by performing an opposing shield part forming step. In this step, first, a magnetic layer is formed on the whole surface of the multilayer body. This magnetic layer is formed by plating method using a magnetic material made of a ferromagnetic body such as CoNiFe, CoFe, CoFeN, NiFe or the like by a thickness of about 0.5 to 1.2 μm. This magnetic layer will later form the opposing shield part 61 and the upper yoke layer 65.

Subsequently, an insulating layer (having a thickness of about 1 to 3 μm) is formed on the whole surface of the multilayer body using an insulating material such as alumina ($Al_2O_3$). Further, the whole surface of the multilayer body is polished by CMP until the upper a surface of the magnetic layer emerges, so as to be made flat. This forms the opposing shield part 61, the upper yoke layer 65 and an insulating layer 31. At this time, the surface of the multilayer body is polished such that the opposing shield part 61 has a thickness of about 0.5 to 1.0 μm.

Figure 19:
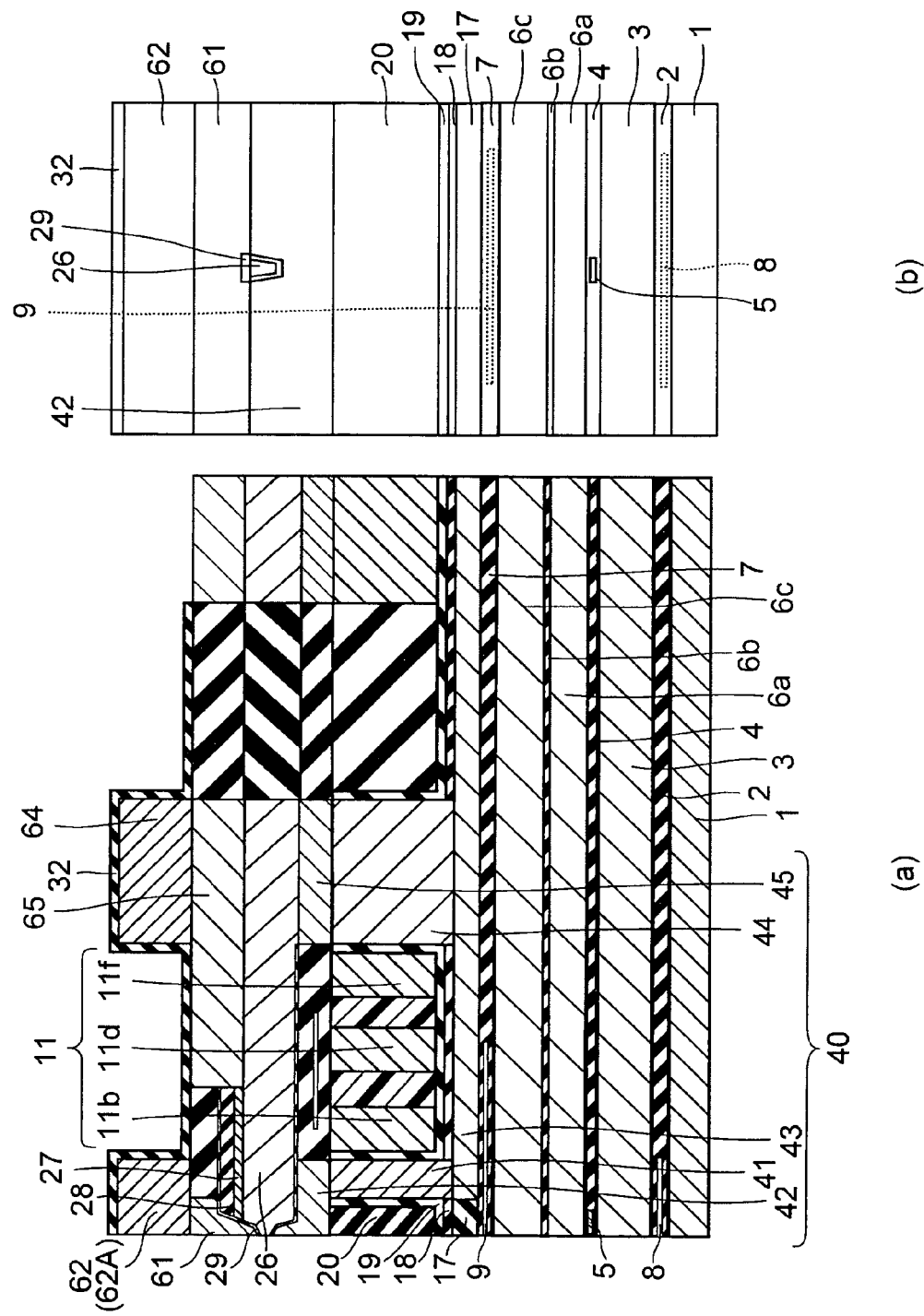
FIG. 19 illustrates a step subsequent to that of FIG. 18, in which (a) is a sectional view corresponding to FIG. 1, in which (b) is a front view corresponding to FIG. 2.

Next, a first shield part forming step is performed. In this step, as illustrated in FIG. 19(*a*), FIG. 19(*b*), at parts of the surface of the multilayer body where the upper front shield part 62 and the upper rear shield part 64 will be formed, the pre-trim front shield part 62A and the upper rear shield part 64 are formed respectively. In this event, the pre-trim front shield part 62A is disposed in the ABS 30 and therefore corresponds to the first shield part according to the embodiment of the present invention. In the first shield part forming step, the pre-trim front shield part 62A and the upper rear shield part 64 are formed by, for example, frame plating method using a magnetic material made of a ferromagnetic body such as NiFe or CoNiFe. In this event, the space between the pre-trim front shield part 62A and the upper rear shield part 64 is made to range from about 3.0 μm to about 3.5 μm.

In addition, the pre-trim front shield part 62A is formed to be connected to the opposing shield part 61 and disposed in the ABS 30. The pre-trim front shield part 62A has a shape illustrated on the upper side in FIG. 7. In this pre-trim front shield part 62A, the whole front end face 62a is disposed in the ABS 30.

Figure 20:
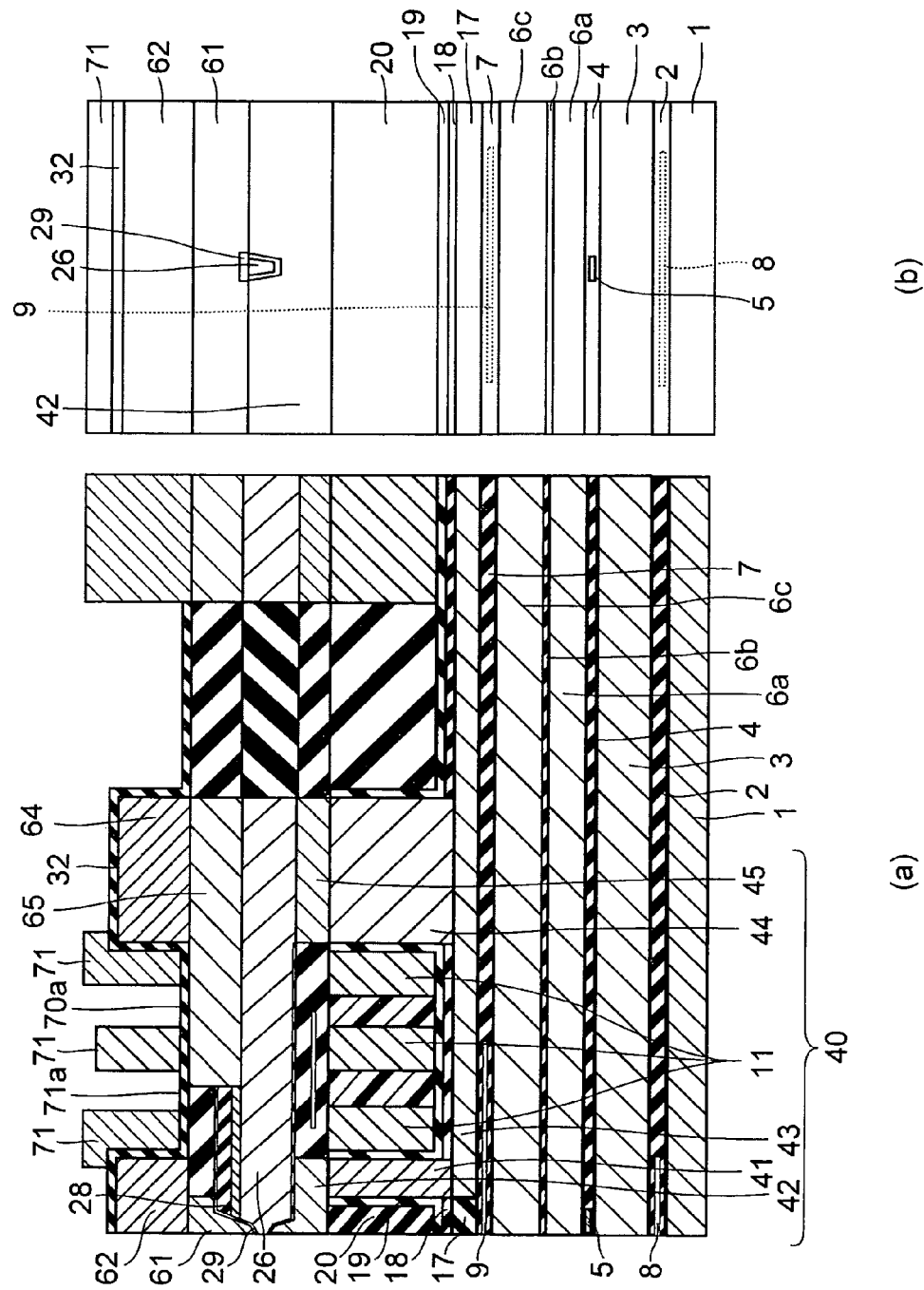
FIG. 20 illustrates a step subsequent to that of FIG. 19, in which (a) is a sectional view corresponding to FIG. 1, in which (b) is a front view corresponding to FIG. 2.

Then, as illustrated in FIG. 20(*a*), FIG. 20(*b*), a conductor layer 71 is formed between the first shield part (pre-trim front shield part 62A) and the upper rear shield part 64. This conductor layer 71 will later form the upper thin-film coil 51. The conductor layer 71 is formed such as to have two interstices 71a and come into contact with the first shield part (pre-trim front shield part 62A) and the upper rear shield part 64 through an interlayer insulating layer 32 without gaps. The conductor layer 71 is an intermittent conductor layer, since it is provided with interstices 71a.

After that, a photoresist layer 55 (having a thickness of about 2 μm to 3 μm) is formed so as to cover the two interstices 71a in the conductor layer 71, a cover insulating film adapted to cover the surface of the multilayer body is formed using alumina ($Al_2O_3$) by a thickness of about 3 μm to 4 μm. Subsequently, the surface of the multilayer body is polished by CMP until the pre-trim front shield part 62A and the upper rear shield part 64 emerge, so as to become flat.

Figure 21:
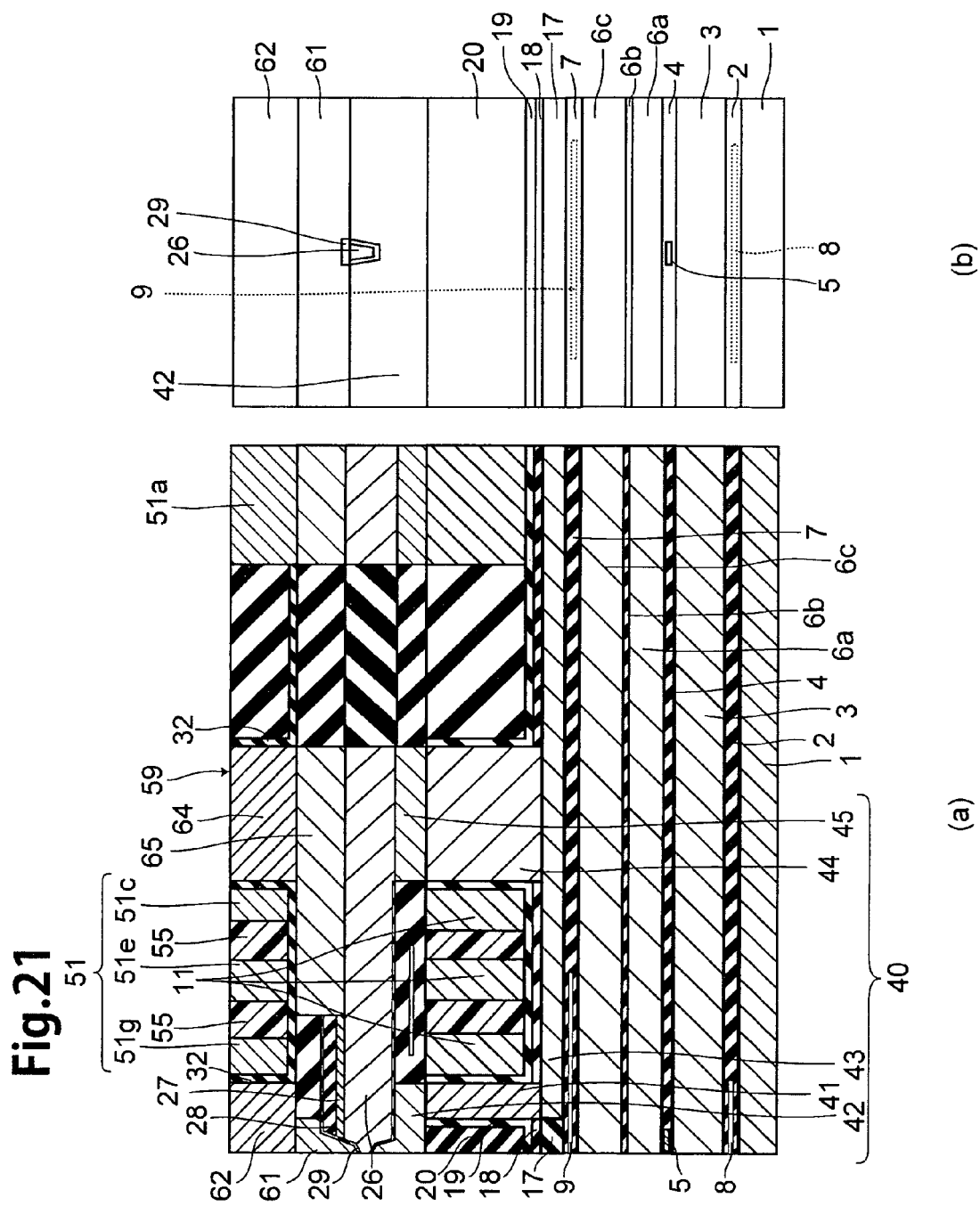
FIG. 21 illustrates a step subsequent to that of FIG. 20, in which (a) is a sectional view corresponding to FIG. 1, in which (b) is a front view corresponding to FIG. 2.

This forms the upper thin-film coil 51 and the photoresist layer 55, as illustrated in FIG. 21(*a*), FIG. 21(*b*). In this event, flattening of the surface of the multilayer body is performed so that the thickness of the upper thin-film coil 51 is about 1.0 μm to 1.8 μm. Besides, the above-described common flat surface 59 is formed by the flattening of the surface of the multilayer body.

Figure 22:
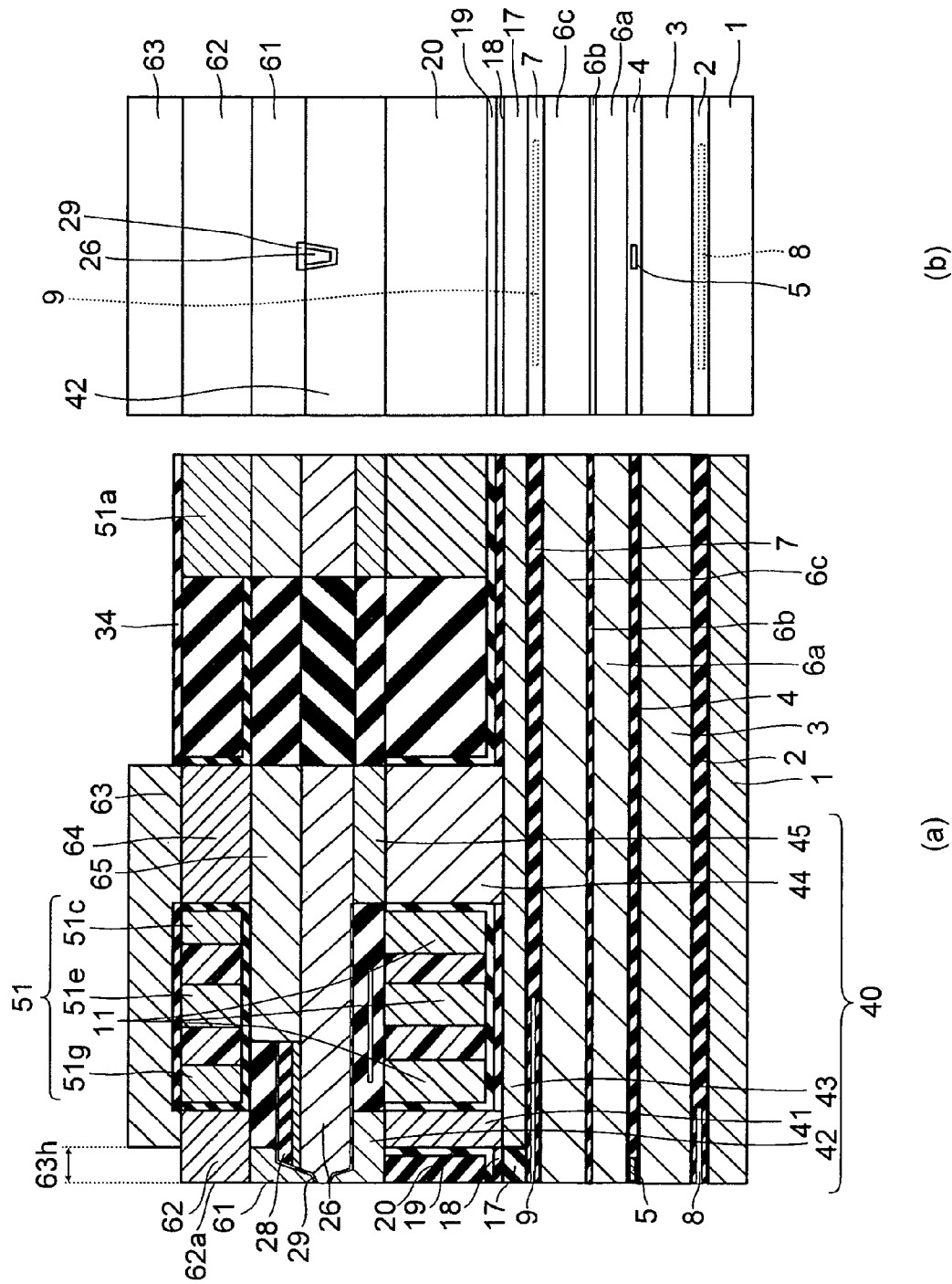
FIG. 22 illustrates a step subsequent to that of FIG. 21, in which (a) is a sectional view corresponding to FIG. 1, in which (b) is a front view corresponding to FIG. 2.

Subsequently, as illustrated in FIG. 22(*a*), FIG. 22(*b*), an insulating layer 34 is formed on the whole surface of the multilayer body using an insulating material such as alumina ($Al_2O_3$), and the insulating layer 34 is partially perforate. After that, a linking shield part forming step is performed. In this step, the linking shield part 63 is formed by frame plating method using a magnetic material made of a ferromagnetic body such as NiFe, CoNiFe or the like. The linking shield part 63 is formed so as to be connected to the pre-trim shield part 62A. The linking shield part 63 is formed so as to straddle the turn parts 51g, 51e, 51c of the upper thin-film coil 51 through the insulating layer 34.

Further, the linking shield part 63 is receded from the ABS 30 and formed at a position distanced from the ABS 30. In other words, the linking shield part 63 is formed at a position where a receding space 63h is ensured between the linking shield part 63 and the ABS 30. The receding space 63h becomes an elongated part having a width, for example, about 0.4 μm to 0.7 μm along the ABS 30 and the same height as that of the linking shield part 63.

Figure 23:
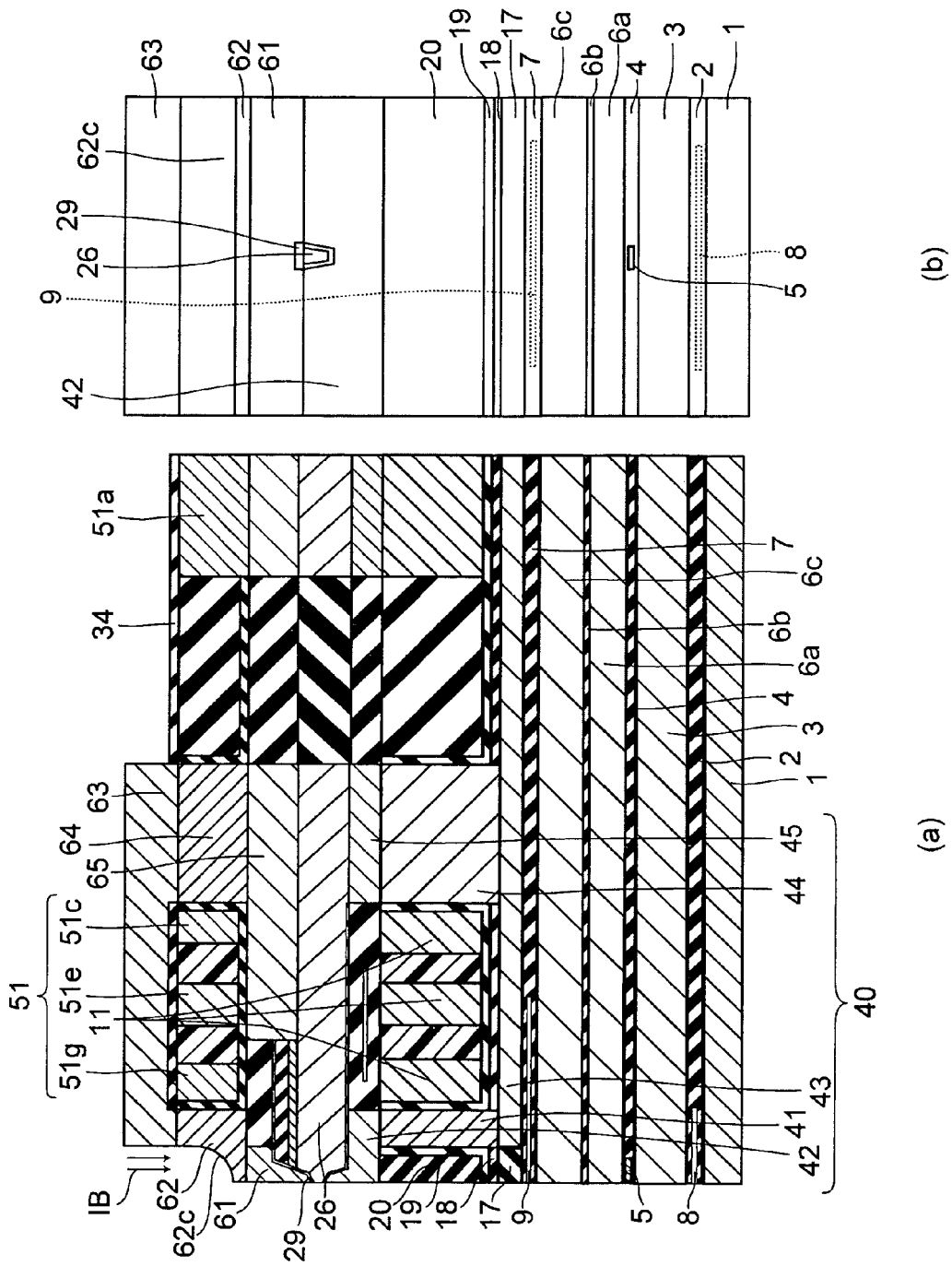
FIG. 23 illustrates a step subsequent to that of FIG. 22, in which (a) is a sectional view corresponding to FIG. 1, in which (b) is a front view corresponding to FIG. 2.

Next, a trimming step is performed. In this step, as illustrated in FIG. 23(*a*), FIG. 23(*b*), IBE is performed by applying ion beams IB from the upper direction using the linking shield part 63 as a mask to cut off the part of the pre-trim front shield part 62A which is not covered with the linking shield part 63. Since the part of the pre-trim front shield part 62A on the ABS side is not covered with the linking shield part 63, the part on the ABS side of the pre-trim front shield part 62A is cut off by performing IBE. In this event, IBE is performed in a manner to leave a part of the pre-trim front end face 62a of the pre-trim front shield part 62A disposed in the ABS 30. Thus, as shown in FIG. 7, the above-described shield connecting part 62c is formed of the part of the pre-trim front end face 62a which has not been cut off but left. Further, IBE is performed in a manner to cause the shield connecting part 62c having the above-described receding tilt structure to appear.

Though the linking shield part 63 itself is used as a mask in the above-described trimming step, a mask such as a photoresist or the like covering the upper face of the linking shield part 63 may be used instead of using the linking shield part 63. More specifically, a mask equal in size to the linking shield part 63 may be formed on the upper face of the linking shield part 63 using photoresist or the like, and the part of the pre-trim front shield part 62A which is not covered with the linking shield part 63 may be cut off using the mask.

Further, with chemical action of gas plasma used in etching, the etching can proceed not only in the vertical direction (the longitudinal direction in FIG. 23) but also in the horizontal direction (the lateral direction in FIG. 23) of the pre-trim front shield part 62A. Therefore, it is preferable to perform non-active IBE, namely, ion milling in the trimming step. Etching performed utilizing physical impact when inactive ions are applied is also called ion milling for distinction from reactive ion etching.

Subsequently, as illustrated in FIG. 1, the displacement suppression layer 85 is formed. After that, the protective insulating layer 90 is formed by an insulating material such as alumina ($Al_2O_3$) so as to cover the displacement suppression layer 85, whereby the thin-film magnetic head 300 is completed.

The protective insulating layer 90 is formed such as to come into contact with an entire the shield connecting part 62c and be embedded without gap between the shield connecting part 62c and the ABS 30.

(Operation and Effect of Thin-Film Magnetic Head 300)

As described above, the thin-film magnetic head 300 has the leading shield part 42 and the lower thin-film coil 11. Further, in the thin-film magnetic head 300, the leading shield part 42 and the lower thin-film coil 11 are formed as follows. Namely, the space to the substrate 1 about both of the lower end face 42b and the upper end face 11x are equal to each other, and both of them are formed so that the space with respect to the substrate 1 is the height h1 as illustrated in FIG. 10. Therefore, no gap is formed between the lower end face 42b and the upper end face 11x.

Figure 43:
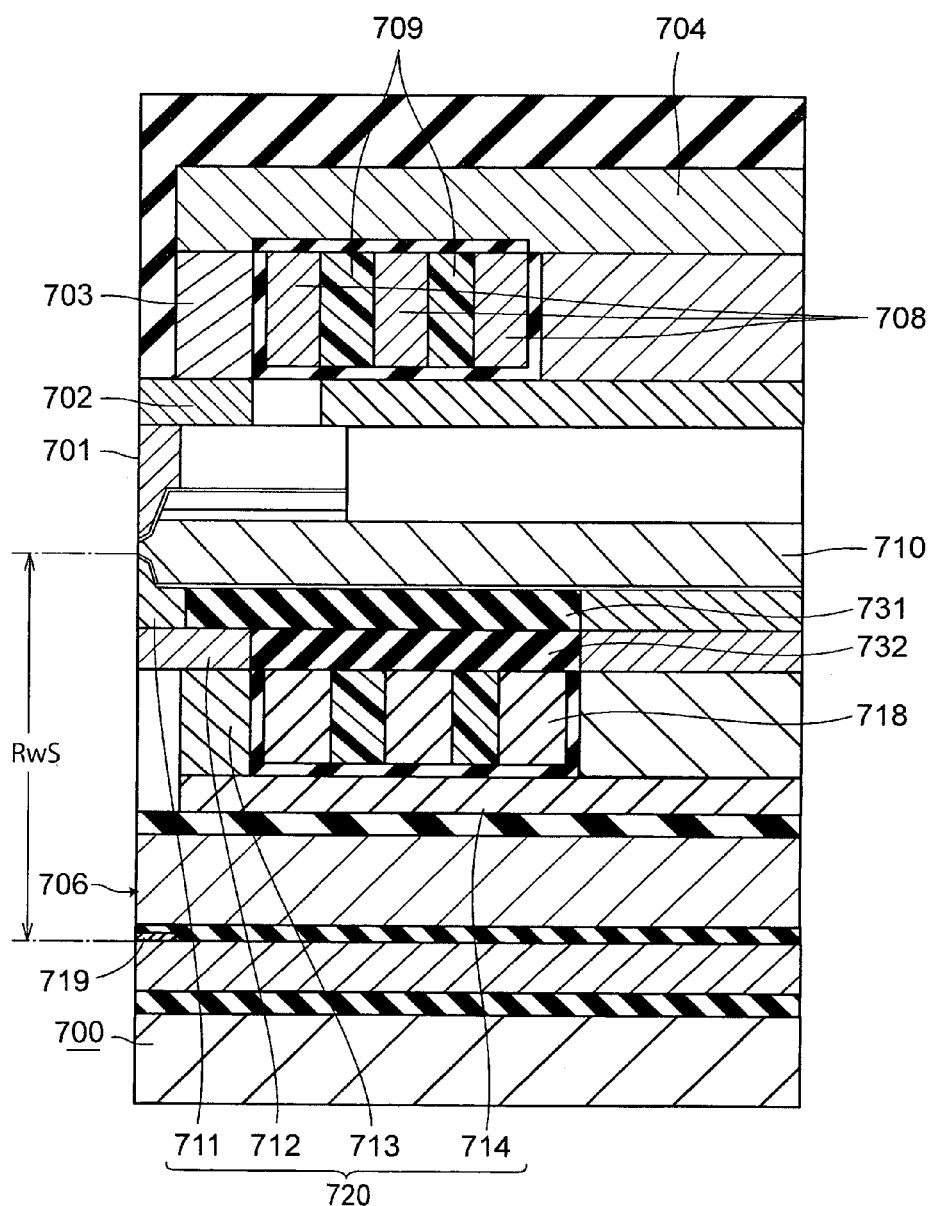
FIG. 43 is a sectional view illustrating an another conventional thin-film magnetic head.

On the other hand, in the conventional PMR 700 illustrated in FIG. 43, the lower shield part 720 has the leading shield part 711, the first front shield part 713 and the linking shield part 714 and additionally has the second front shield part 712. Therefore, it is necessary to form the second front shield part 712 in the manufacturing step. For this reason, the insulating layer 732 having a thickness corresponding to the second front shield part 712 in addition to the insulating layer 731 is formed between the main magnetic pole layer 710 and the lower thin-film coil 718. The insulating layer 732 is formed to cover the surface of the lower thin-film coil 718. Therefore, to increase the height of the lower thin-film coil 718, it is necessary to shift the position of the insulating layer 732 to the upper direction (the direction toward the main magnetic pole layer 710).

This, however, requires that the position of the main magnetic pole layer 710 is also shifted upward. This works to increase the read/write separation and would break the restriction that the read/write separation needs to keep within a predetermined dimension. So, it is a very difficult problem to increase the height of the lower thin-film coil 718 in the restriction range of the read/write separation in the conventional PMR 700.

In the thin-film magnetic head 300, however, there is no gap formed between the lower end face 42b and the upper end face 11x. In short, the thin-film magnetic head 300 has a shape without the second front shield part 712 and the insulating layer 732 existing in the conventional PMR 700.

In the conventional PMR 700, the insulating layer 732 is formed to cover the surface of the lower thin-film coil 718. The insulating layer 732 is merely an obstruction in terms of the increase in height of the lower thin-film coil 718.

However, by forming a configuring as in the thin-film magnetic head 300 according to the embodiment of the present invention in which the insulating layer 732 in the conventional PMR 700 does not exist, a space enabling the increase in height of the lower thin-film coil 11 can be newly secured. The thin-film magnetic head 300 is structured so that the space between both of the lower end face 42b of the leading shield part 42 and the upper end face 11x of the lower thin-film coil 11, and the substrate 1 are equal to each other, whereby the structure in which the insulating layer 732 in the conventional PMR 700 does not exist is implemented. Providing the structure achieves the effect of decreasing the RWS by about 0.5 µm as compared to the conventional PMR 700, in the thin-film magnetic head 300. Therefore, a height increasing space for increasing the height of the lower thin-film coil 11 can be secured in the thin-film magnetic head 300.

In the thin-film magnetic head 300, the height of the lower thin-film coil 11 can be increased by using the height increasing space. Accordingly, the cross-sectional area of the lower thin-film coil 11 is increased to enable a decrease in the electric resistance of the lower thin-film coil 11 within the restriction range of RWS in the thin-film magnetic head 300.

In addition, the coil-insulating layer 55 is not disposed outside the upper thin-film coil 51 as in the conventional PMR 700, and therefore the magnetic path length can be made shorter than that in the PMR 600. Accordingly, it is possible to decrease the electric resistance of the thin-film coil within the restriction range of RWS without increasing the magnetic path length in the thin-film magnetic head 300.

Further, in the thin-film magnetic head 300, the lower end face 42b of the leading shield part 42 is directly connected to the upper end face 41a of the lower front shield part 41. The structure in which the insulating layer 732 in the conventional PMR 700 does not exist can be a structure in which the second front shield part 712 does not exist. This could not achieve the connection state between the leading shield part and the lower front shield part. In the thin-film magnetic head 300, however, the leading shield part 42 with an increased depth is formed and its lower end face 42b is directly connected to the upper end face 41a of the lower front shield part 41. Accordingly, the height increasing space is secured while securing the connection state between the leading shield part 42 and the lower front shield part 41.

Further, the upper end face 11x of the lower thin-film coil 11 is in direct contact with the base insulating layer 24 in the thin-film magnetic head 300. This results in that the height increasing space is used for increasing the height of the lower thin-film coil 11 and not allocated to other components. Thus, the height of the lower thin-film coil 11 is surely increased.

Further, since the leading shield part 42 is connected to both the opposing insulating layer 20 and the lower front shield part 41, the leading shield part 42 serves both as the functions of the leading shield part 711 and the second front shield part 712 in the conventional PMR 700. Accordingly, the height increasing space is secured while securing the connection state between the leading shield part 42 and the lower front shield part 41.

In addition, the thin-film magnetic head 300 is structured such that only the upper front shield part 62 is formed as the magnetic layer which is to be disposed between the opposing shield part 61 and the linking shield part 63. Therefore, as compared to the case where the two magnetic layers such as the front shield part 703 and the connecting shield part 702 are formed between the opposing shield part 701 and the linking shield part 704 as in the above-described conventional PMR 700, the length of the magnetic path along the top-down direction is shorter so that the magnetic path length is able to be reduced in the thin-film magnetic head 300.

Hence, the thin-film magnetic head 300 is able to improve the flux rise time, non-linear transition shift (NLTS) characteristic, overwrite characteristic, and the like of the recording head, and follow rapid changes in recording signals having a high frequency and changing fast. This makes the thin-film magnetic head 300 suitable as a recording head for hard disk drives mounted to servers in particular.

In addition, the upper front shield part 62 has a lateral width capable of reaching, from the ABS 30, the upper thin-film coil 51 via the interlayer insulating layer 32. Therefore, even though the write shield layer 60 has a different-distance structure, the upper front shield part 62 is surely connected to both of the opposing shield part 61 and the linking shield part 63. Accordingly, the opposing shield part 61 opposing the main magnetic pole layer 26 and the linking shield part 63 straddling the turn parts 51*g*, 51*e*, 51*c* of the upper thin-film coil 51 are liked together as a continuous line and are able to form the magnetic circuit as a continuous line. Note that the different-distance structure means a structure that the respective distances of the opposing shield part 61 and the linking shield part 63 from the ABS 30 are different because the opposing shield part 61 is disposed in the ABS 30 and the linking shield part 63 is receded from the ABS 30.

A structure is discussed here which is intended to surely connect both of the opposing shield part 61 and the linking shield part 63 by the upper front shield part 62 in the different-distance structure of the write shield layer 60. Since the sizes of the upper end face and the lower end face are maximum when the whole front end face is disposed in the ABS 30 as in the pre-trim front shield part 62A, it is preferable that the whole front end face is disposed in the ABS 30 like the pre-trim front shield part 62A in order to realize the aforementioned structure.

However, this causes the pre-trim front end face 62*a* to be largely exposed in the ABS 30. The upper front shield part 62 and the pre-trim front shield part 62A are formed of a magnetic material made of a ferromagnetic body such as CoNiFe, CoFe, CoFeN, NiFe or the like. Therefore, if the whole pre-trim front end face 62*a* is exposed in the ABS 30 like the pre-trim front shield part 62A, the pre-trim front shield part 62A will be affected more strongly when the photoresist layer 55 expands due to the heat generation of the upper thin-film coil 51.

Since the frying height is very small, collision between the thin-film magnetic head 300 and the recording medium can occur even when only a limited and small part of the pre-trim front end face 62*a* projects. That the whole pre-trim front end face 62*a* is exposed in the ABS 30 means that many such small parts which will project exist in the ABS 30, which means that there are accordingly many projecting forms which can collide with the recording medium and collision between the thin-film magnetic head 300 and the recording medium is more likely to occur.

Hence, in the thin-film magnetic head 300, the upper front shield part 62 having the structure illustrated on the lower side in FIG. 7 is formed. Thus, the part exposed in the ABS 30 is the shield front end face 62*b*.

Further, in the upper front shield part 62, the shield upper end face 62*f* is disposed at a position distanced more from the substrate 1 than is the shield front end face 62*b*, and the upper front shield part 62 has the shield connecting part 62*c* connecting the shield front end face 62*b* to the shield upper end face 62*f*. In such a structure, the front end face disposed in the ABS 30 is smaller in size than that when the shield upper end face 62*f* reaches the ABS 30, namely, the pre-trim front shield part 62A as illustrated on the upper side in FIG. 7. Therefore, provision of the upper front shield part 62 makes it possible to suppress the situation that the thin-film magnetic head 300 collides with the recording medium.

Hence, the thin-film magnetic head 300 is able to restrain the write shield layer 60 from projecting as the upper thin-film coil 51 generate heat especially. Consequently, the thin-film magnetic head 300 is very unlikely to be damaged by the protrusion of the recording head and thus can approach recording media.

While the thin-film magnetic head 300 is incorporated in an undepicted slider, the flying height of the slider from the recording medium surface can be reduced. Therefore, the thin-film magnetic head 300 is able to enhance the resolution of recording and reproducing heads, thereby improving their signal-to-noise ratio. This can also increase the recording density of the thin-film magnetic head 300.

On the other hand, the upper front shield part 62 is formed, after the formation of the linking shield part 63, by cutting off a part thereof on the ABS 30 side where the linking shield part 63 is not in contact therewith. For this reason, though the part exposed in the ABS 30 is small, the shield upper end face 62*f* is surely ensured, resulting in a structure in which the upper front shield part 62 and the linking shield part 63 can be surely connected.

Further, when cutting off the part of the upper front shield part 62 on the ABS 30 side, the shield front end face 62*b* is ensured so that a part of the pre-trim front end face 62*a* is left as the shield front end face 62*b* without cutting off the whole pre-trim front end face 62*a*. If IBE proceeds to the degree that the shield front end face 62*b* is not ensured when cutting off the part of the pre-trim front shield part 62A on the ABS 30 side, the shield lower end face 62*r* can also be cut off. In this case, the part which is to be connected to the opposing shield part 61 becomes smaller, so that the connection between the opposing shield part 61 and the upper front shield part 62 can be insufficient. However, there is no such possibility in the thin-film magnetic head 300.

Further, the upper front shield part 62 has the shield connecting part 62*c*, and the shield connecting part 62*c* has the tilt structure. Therefore, the upper front shield part 62 has a structure which can be surely formed by the above-described IBE from the upper direction. Without the tilt structure, for example, when a surface part extending from the shield front end face 62*b* to the shield upper end face 62*f* is bent in an S-shape, it is difficult to form the upper front shield part 62 by IBE. However, in the thin-film magnetic head 300, there is no such possibility and the upper front shield part 62 is able to be surely formed by IBE from the upper direction.

Further, since the shield connecting part 62*c* has the receding tilt structure, the volume of the upper front shield part 62 is reduced as compared to the case without the receding tilt structure. This further suppresses the possibility of projection of the upper front shield part 62.

Further, the shield connecting part 62*c* has the lateral flat part 62*c*1. The lateral flat part 62*c*1 is generally formed along the direction intersecting the ABS 30. Accordingly, the shield connecting part 62*c* is able to surely receive the pressure received in the longitudinal direction from the embedded part 90*a* of the protective insulating layer 90 as compared to the case without the lateral flat part 62*c*1. Accordingly, in the thin-film magnetic head 300, the embedding state of the protective insulating layer 90 is stable.

Additionally, the shield connecting part 62*c* has the longitudinal flat part 62*c*2. The longitudinal flat part 62*c*2 is generally formed along the ABS 30. Accordingly, the upper front shield part 62 has a structure which can be surely formed by IBE from the upper direction or the like to the pre-trim front shield part 62A.

As has been described, in the thin-film magnetic head 300, the magnetic path length can be reduced and projection of a part of the ABS 30 can be suppressed, so that both of the suppression of projection of a part of the medium-opposing surface and the reduction in magnetic path length can be realized. Accordingly, the thin-film magnetic head 300 is configured such that the projection of a part of the ABS 30 can be suppressed without affecting the reduction in magnetic path length.

Since the lower thin-film coil 11 and upper thin-film coil 51 have the variable width structures as mentioned above, current flows are less likely to be obstructed, whereby the resistance value is able to be restrained from rising. Accordingly, generation of heat from the lower thin-film coil 11 and the upper thin-film coil 51 are able to be suppressed effectively in the thin-film magnetic head 300.

Modified Example 1

Figure 38:
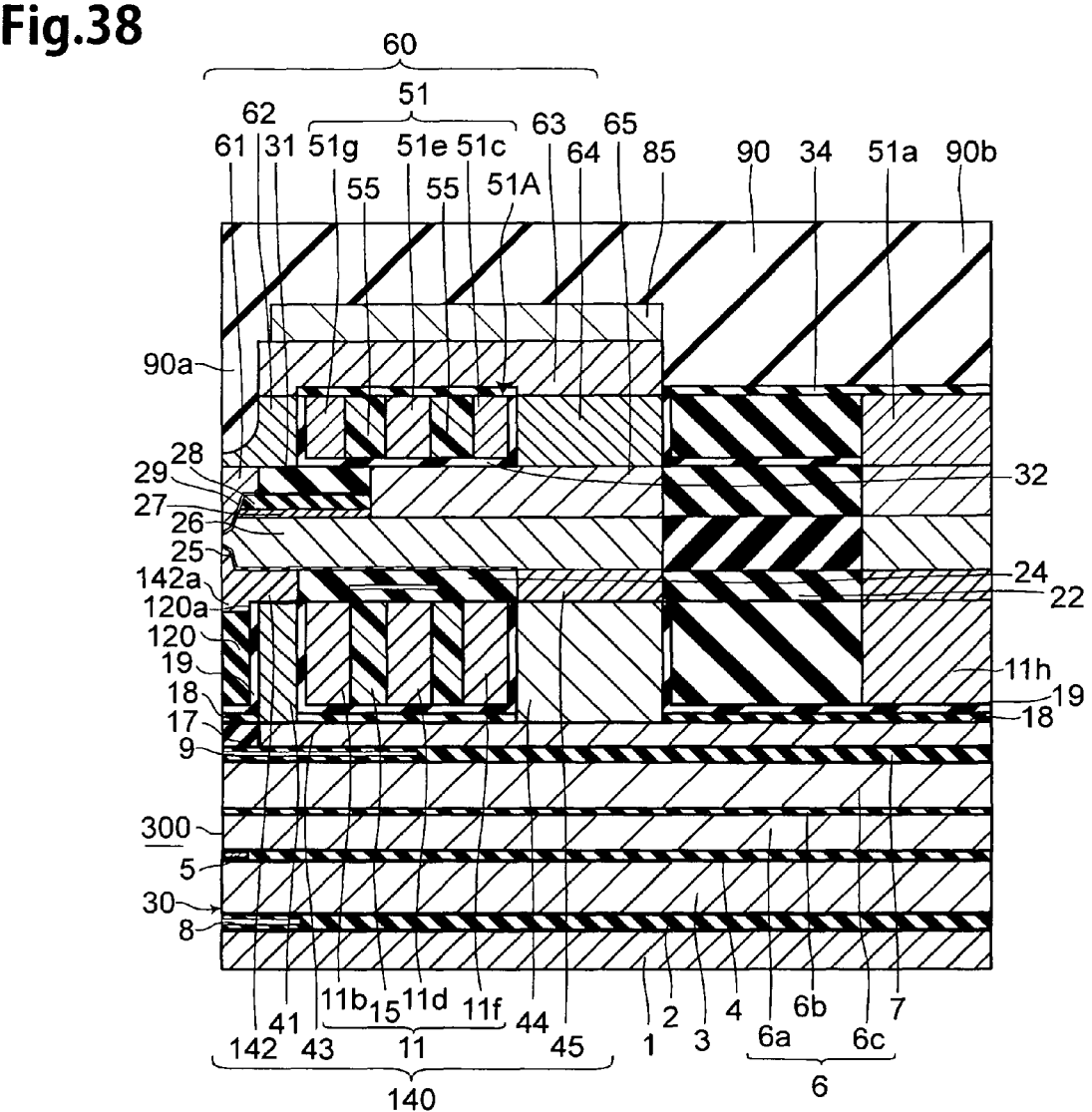
FIG. 38 is a sectional view of the thin-film magnetic head according to an another modified example corresponding to FIG. 1, along by a direction intersecting its air bearing surface.

The thin-film magnetic head 300 may have a shield magnetic layer 140 and an opposing insulating layer 120 as illustrated in FIG. 38 in place of the above-described shield magnetic layer 40 and opposing insulating layer 20. The shield magnetic layer 140 is different in that it has a leading shield part 142 in place of the leading shield part 42, as compared with the shield magnetic layer 40. The leading shield part 142 is different in the following point as compared with the leading shield part 42. Namely, in the leading shield part 142, its ABS 30 side part 142a wraps around to the inside of a later-described opposing depression 120a within the ABS 30. The leading shield part 142 has an expansion structure implemented by the wraparound of the ABS 30 side part 142a. The expansion structure means the structure in which the height of the ABS 30 side part 142a in the direction along the ABS 30 is expanded.

The opposing insulating layer 120 is different in that it has an opposing depression 120a, as compared with the opposing insulating layer 20. The opposing depression 120a is a depression formed by disposing the upper end face 20b at a position closer to the substrate 1 than is the upper end face 41a of the lower front shield part 41.

In the thin-film magnetic head 300, the area of the leading shield part 142 exposed to the ABS 30 is larger than that of the leading shield part 42 because the leading shield part 142 has the expansion structure. Therefore, it is possible to effectively take in the magnetic flux emitted from the main magnetic pole layer 26 and more effectively prevent the decreased in writing property.

Modified Example 2

The above-described thin-film magnetic head 300 may have the upper front shield part 62B as illustrated in FIG. 8 (a) in place of the above-described upper front shield part 62. The upper front shield part 62B is different in that it has a shield connecting part 62d in place of the shield connecting part 62c, as compared with the upper front shield part 62. The shield connecting part 62d is different in that it is not have the lateral flat part 62c1, as compared with the shield connecting part 62c.

The thin-film magnetic head 300 may have the upper front shield part 62D as illustrated in FIG. 8 (b) in place of the upper front shield part 62. The upper front shield part 62D is different in that it has a shield connecting part 62e in place of the shield connecting part 62c, as compared with the upper front shield part 62. The shield connecting part 62e is different in that it is not have the longitudinal flat part 62c2, as compared with the shield connecting part 62c.

In both of the case where the upper front shield part 62B is provided and the case where the upper front shield part 62D is provided, the shield front end face 62b is disposed in the ABS 30 and the size of the part thereof exposed in the ABS 30 is reduced as compared to that of the pre-trim front shield part 62A. Therefore, the possibility of projection of the upper front shield parts 62B, 62D is surely suppressed as compared to the pre-trim front shield part 62A. Accordingly, both of the suppression of projection of a part of the medium-opposing surface and the reduction in magnetic path length can be realized in both of the case where the upper front shield part 62B is provided and the case where the upper front shield part 62D is provided.

Second Embodiment

Figure 24:
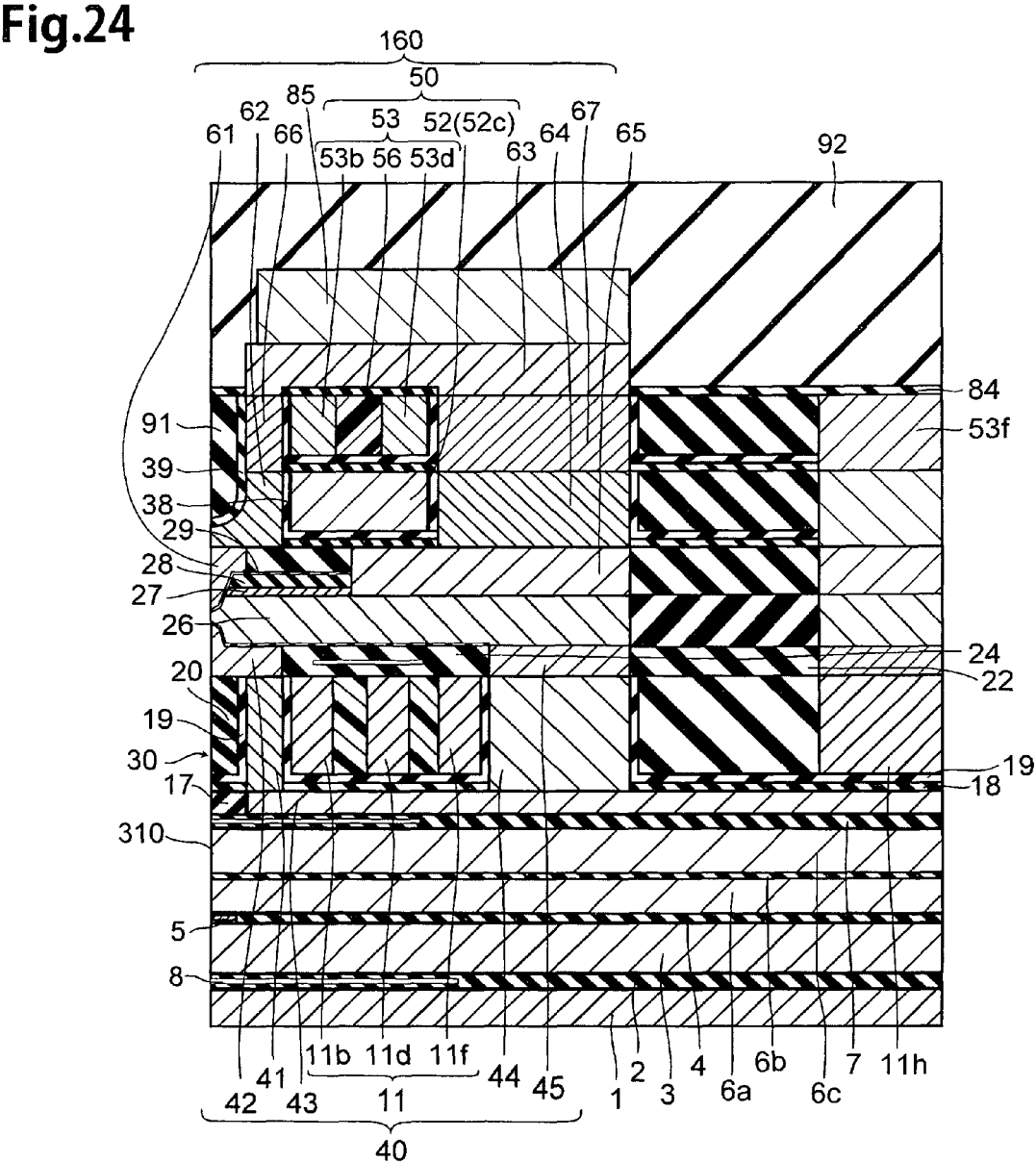
FIG. 24 is a sectional view of the thin-film magnetic head according to a second embodiment of the present invention corresponding to FIG. 1, along by a direction intersecting its ABS.
Figure 25:
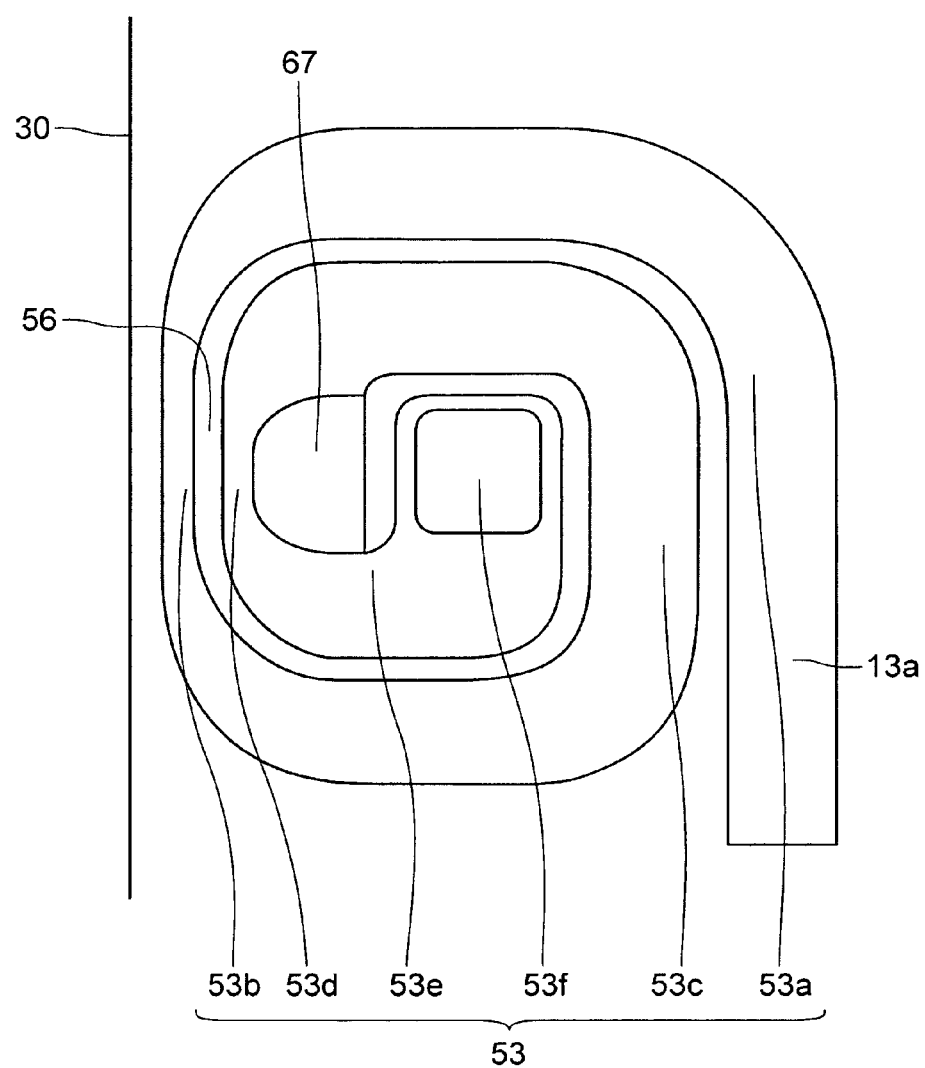
FIG. 25 is a plan view illustrating a second coil layer constituting the upper thin-film coil.
Figure 26:
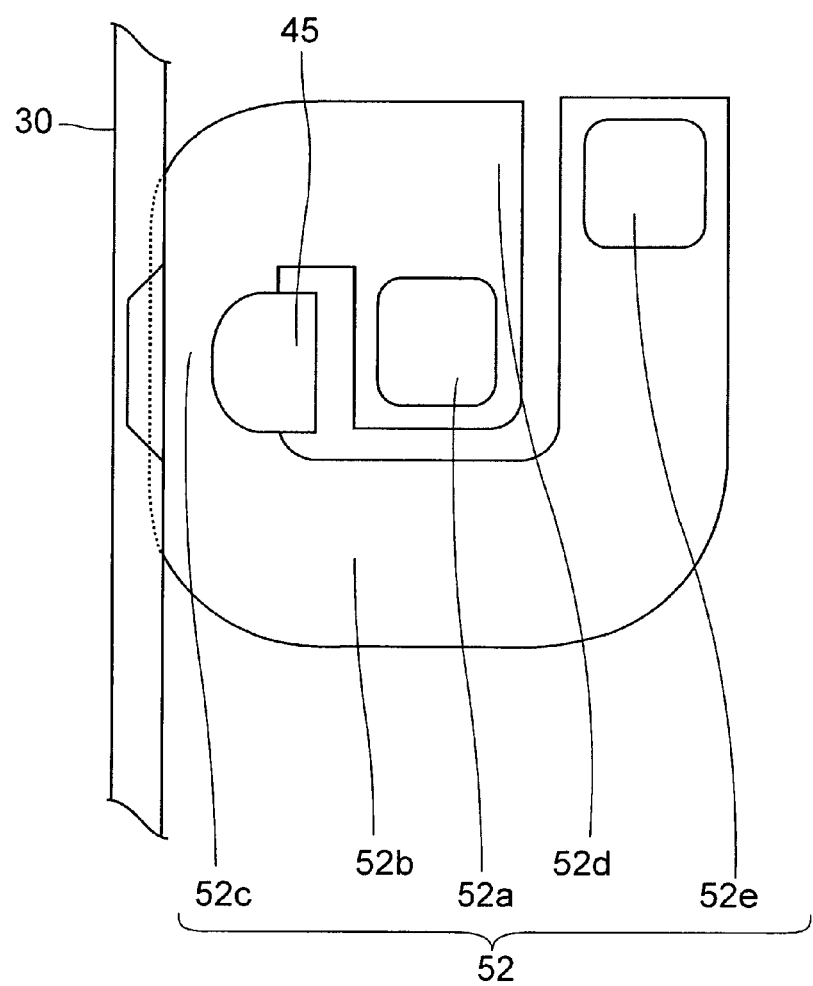
FIG. 26 is a plan view illustrating a first coil layer constituting the upper thin-film coil.

The thin-film magnetic head of perpendicular magnetic recording type according to the second embodiment of the present invention will now be explained with reference to FIG. 24 to FIG. 26. Here, FIG. 24 is a sectional view of the thin-film magnetic head 310 according to a second embodiment of the present invention corresponding to FIG. 1, along by a direction intersecting ABS 30. FIG. 25 is a plan view illustrating the second coil layer 53 constituting an upper thin-film coil 50. FIG. 26 is a plan view illustrating the first coil layer 52.

As in the thin-film magnetic head 300, the thin-film magnetic head 310 comprises the substrate 1 and reproducing and recording heads laminated on the substrate 1, while having the ABS 30. Since the thin-film magnetic head 310 includes configurations identical to those of the thin-film magnetic head 300, configurations of the thin-film magnetic head 310 different from those of the thin-film magnetic head 300 will mainly be explained in the following, while omitting or simplifying their common configurations.

As in the thin-film magnetic head 300, the reproducing head includes the insulating layer 2, the lower shield layer 3, the shield gap film 4, the MR device 5, the upper shield layer 6, the insulating layer 7, the heating part 8 and the heat sensing part 9 which are formed on the substrate 1.

The recording head of the thin-film magnetic head 310 is different in that it has the upper thin-film coil 50 in place of the upper thin-film coil 51, and that it has the write shield layer 160 in place of write shield layer 60, as compared with the recording head of the thin-film magnetic head 300. Besides, the recording head of the thin-film magnetic head 310 is different in that it has a continuous insulating film 39, and that it has the protective insulating layer 91 and the protective insulating layer 92 in place of the protective insulating layer 90, as compared with the recording head of the thin-film magnetic head 300.

In the above-described thin-film magnetic head 300, both of the lower thin-film coil 11 and the upper thin-film coil 51 have a single-layer structure. A structure that the turn parts are arranged in the direction intersecting the ABS 30 and not overlapped in the direction along the ABS 30 is the single-layer structure. However, in the thin-film magnetic head 301, the lower thin-film coil 11 has the single-layer structure, whereas the upper thin-film coil 50 has an overlapping structure by two layers.

The upper thin-film coil 50 has the first coil-layer 52 and second coil-layer 53 arranged at positions separated from the ABS 30, while an upper conductor group is constituted by the first coil-layer 52 and second coil-layer 53.

Further, the first coil-layer 52 and second coil-layer 53 arranged in the direction (up and down direction) along the ABS 30. The second coil-layer 53 overlies the first coil-layer 52 while interposing the coil interlayer insulating layer 84 therebetween. The upper thin-film coil 50 has the overlapping structure by two layers. The upper thin-film coil 50 has an equidistant two-stage structure in which the first and second coil-layers 52, 53 have the same front distance and the same rear distance.

The first coil-layer 52 have the turn parts 52c as illustrated in FIG. 26. The turn parts 52c is arranged between the first upper front shield part 62 and the first upper rear shield part 64. The first coil-layer 52 has a loop part 52d extending from a connecting part 52a connected to the second coil-layer 53 to the turn part 52c, and a half-loop part 52b extending from the turn part 52c to a connecting part 52e. The first coil-layer 52 is constructed as a continuous line from the connecting part 52a to the connecting part 52e, so as to be wound as a flat spiral about the write shield layer 160, thus forming a one-turn loop as a whole.

The second coil-layer 53 has two turn parts 53b, 53d. The turn parts 53b, 53d are arranged between a later-described second upper front shield part 66 and a second upper rear shield part 67. The second coil-layer 53 has a structure which the turn parts 53b, 53d align with each other while interposing a photoresist layer 56 therebetween.

As illustrated in FIG. 25, the second coil-layer 53 has a half-loop part 53e extending from a connecting part 53f connected to the first coil-layer 52 to the turn part 53d, a one-loop part 53c extending from the turn part 53d to the turn part 53b, and a half-loop part 53a extending from the turn part 53b to a lead part 13a.

The second coil-layer 53 is constructed as a continuous line from the connecting part 53f to the lead part 13a, so as to be wound as a flat spiral about the write shield layer 160, thus forming a two-turn loop as a whole. For convenience of illustration, FIG. 24 illustrates only the connecting part 53f and the turn parts 53b, 53d, in the second coil-layer 53. Each of the turn parts 53b, 53d has the vertically long structure similarly to the turn parts 11b, 11d, 11f. Besides, the second coil-layer 53 has the variable width structure similarly to the lower thin-film coil 11.

The first coil-layer 52 and the second coil-layer 53 connect with each other as follows, whereby the upper thin-film coil 50 forms a continuous 3-turn loop. Namely, the connecting part 52e is connected to the connecting part 52a through the half-loop part 52b, the turn part 52c and the loop part 52d, while the connecting part 52a is connected to the connecting part 53f. The connecting part 53f is further connected to the lead part 13a through the half-loop part 53e, turn part 53d, one-loop part 53c, turn part 53b and half-loop part 53a, whereby the 3-turn loop is formed.

Namely, the upper thin-film coil 50 has a (1+2) turn structure in which the first coil-layer 52 forms a 1-turn loop, and the second coil-layer 53 positioned directly thereabove forms a 2-turn loop, thereby yielding a 3-turn loop. The (A+B) turn structure in this embodiment refers to an overlapping structure in which a coil-layer having "B" turns overlies a coil-layer having "A" turns.

The write shield layer 160 is different in that it has the second upper front shield part 66 and the second upper rear shield part 67, as compared with the write shield layer 60.

The second upper front shield part 66 is connected to the first upper front shield part 62 and the linking shield part 63. The entire second upper front shield part 66 is arranged at positions separated from the ABS 30. The second upper front shield part 66 is connected to the first upper front shield part 62 without straddling the turn parts 53b, 53d of the second coil-layer 53. Besides, the second upper front shield part 66 is arranged closer to the ABS 30 than are the second coil-layer 53 constituting the upper thin-film coil 50.

Figure 31:
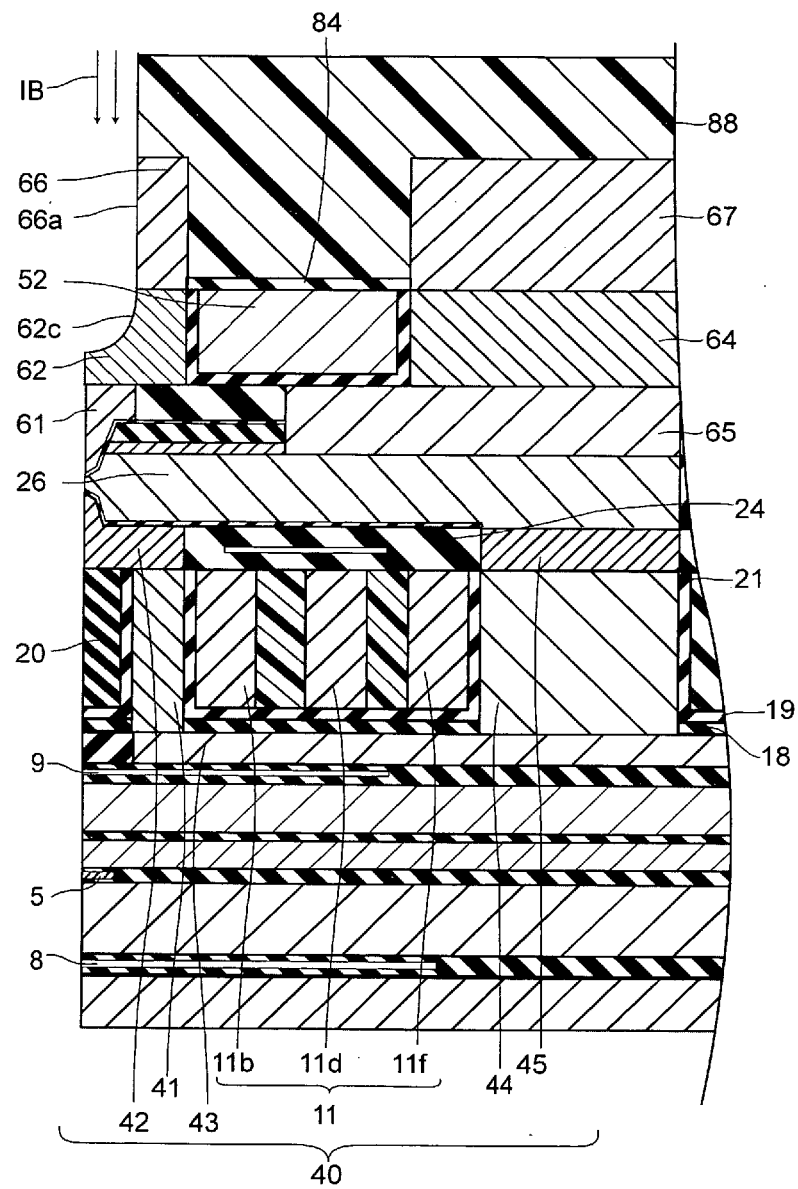
FIG. 31 is a sectional view illustrates a step subsequent to that of FIG. 30.

The second upper front shield part 66 has the lateral width corresponding to the shield upper end face 62f of the first upper front shield part 62. Further, the second upper front shield part 66 is formed such that the lateral width thereof along the intersecting direction is equal to the lateral width along the intersecting direction of the shield upper end face 62f. Further, a front end face 66a on the ABS 30 side is a flat front end face. The front end face 66a is formed flat along the ABS 30. Further, the front end face 66a is connected without level difference to the shield connecting part 62c. The front end face 66a is illustrated in FIG. 31.

The second upper rear shield part 67 is connected to the first upper rear shield part 64 and the linking shield part 63.

The second upper rear shield part 67 has the lateral width corresponding to the first upper rear shield part 64.

The continuous insulating film 39 is continuously formed extending from the front end face 66a to the shield connecting part 62c on the surface of the front end face 66a and the shield connecting part 62c.

(Method of Manufacturing Thin-Film Magnetic Head)

A method of manufacturing the thin-film magnetic head 310 having the structure mentioned above will now be explained with reference to FIG. 27 to FIG. 33 together with FIG. 24 mentioned above.

Figure 27:
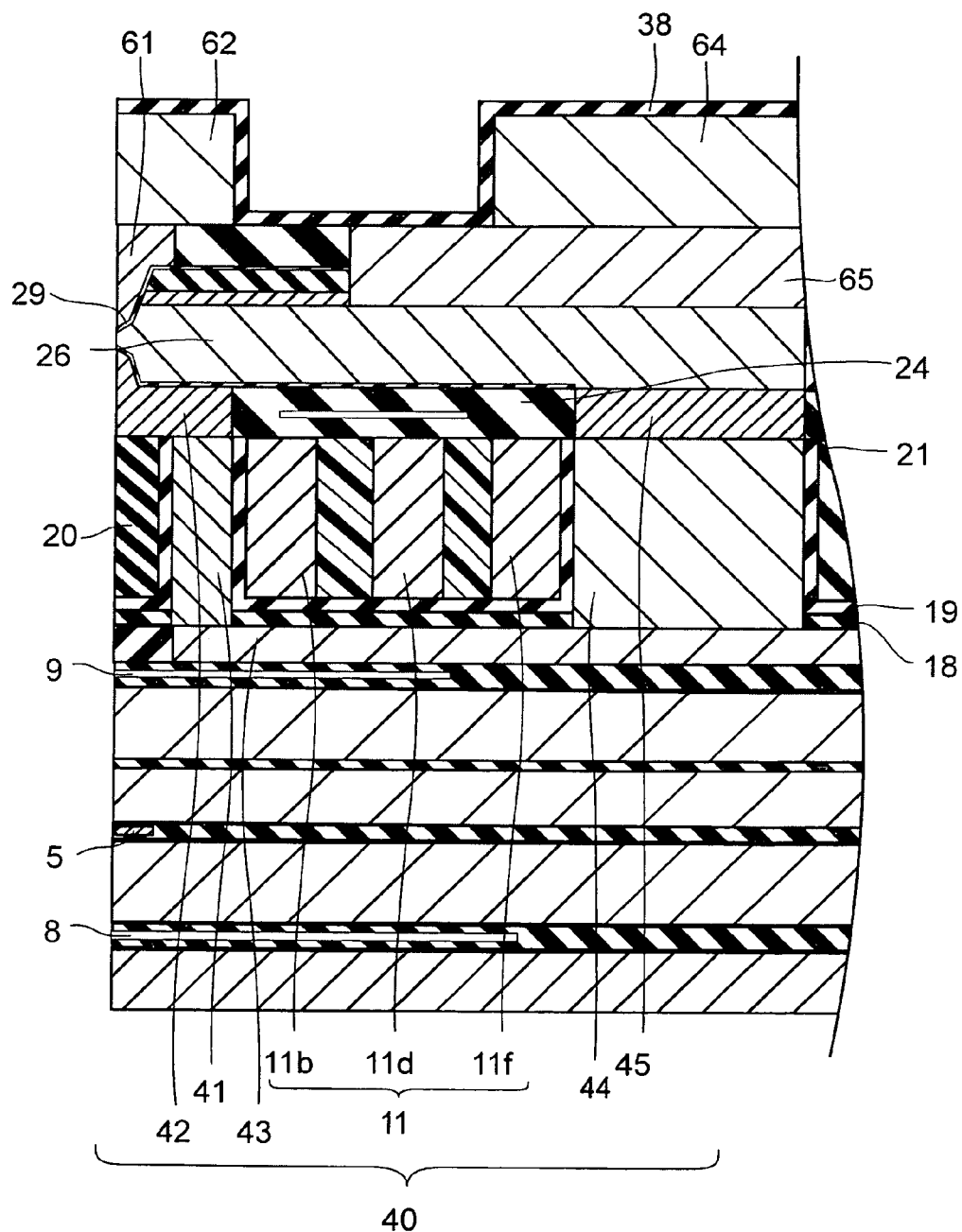
FIG. 27 is a sectional view, corresponding to FIG. 1, illustrates a step of manufacturing the thin-film magnetic head according to a second embodiment of the present invention with a part thereof omitted.

FIG. 27 to FIG. 33 is sectional view corresponding to FIG. 1 in respective step of manufacturing the thin-film magnetic head 310. In case of forming the thin-film magnetic head 310, as illustrated in FIG. 27, steps of manufacturing are performed until the first shield part forming step by a procedure similar to the procedure for manufacturing the thin-film magnetic head 300. However, the first upper front shield part 62 and the first upper rear shield part 64 is formed so as to be reduced slightly an interval of them by an interval of about 2.5 μm to 2.9 μm. After that, as illustrated in FIG. 27, an insulating layer 38 is formed on the whole surface of the multilayer body using an alumina ($Al_2O_3$).

Figure 28:
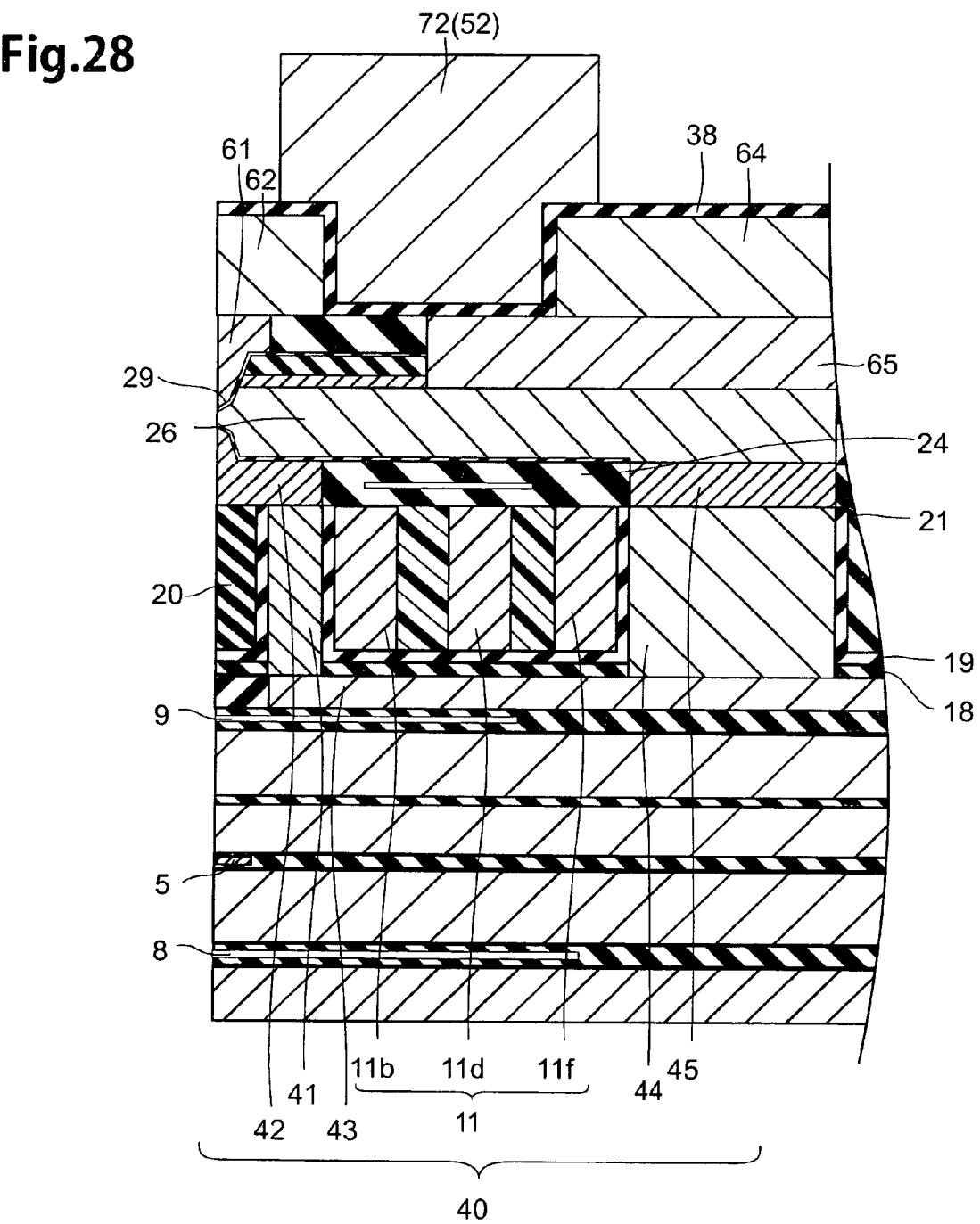
FIG. 28 is a sectional view illustrates a step subsequent to that of FIG. 27.
Figure 29:
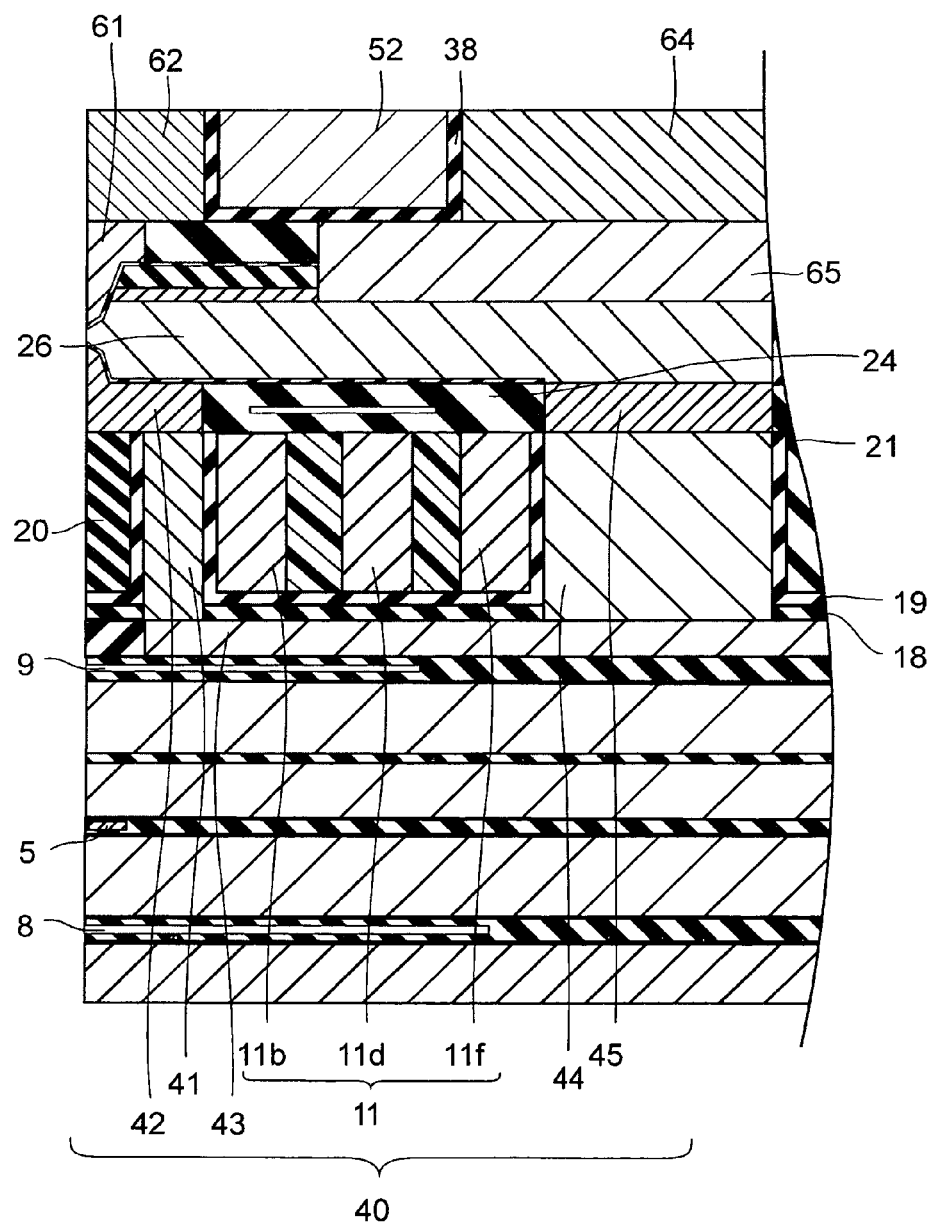
FIG. 29 is a sectional view illustrates a step subsequent to that of FIG. 28.

Subsequently, as illustrated in FIG. 28, a conductor layer 72 is formed between a first shield part (the first upper front shield part 62) and the first upper rear shield part 64, on the surface of the multilayer body. This conductor layer 72 will later become the first coil-layer 52. The conductor layer 72 is formed such as to come into contact with the first shield part (the first upper front shield part 62) and the first upper rear shield part 64 through the insulating layer 38 without gaps. Then, the surface of the multilayer body is polished by CMP until the first upper front shield part 62 and the first upper rear shield part 64 emerge, so as to become flat. This forms the first coil-layer 52, as illustrated in FIG. 29.

Figure 30:
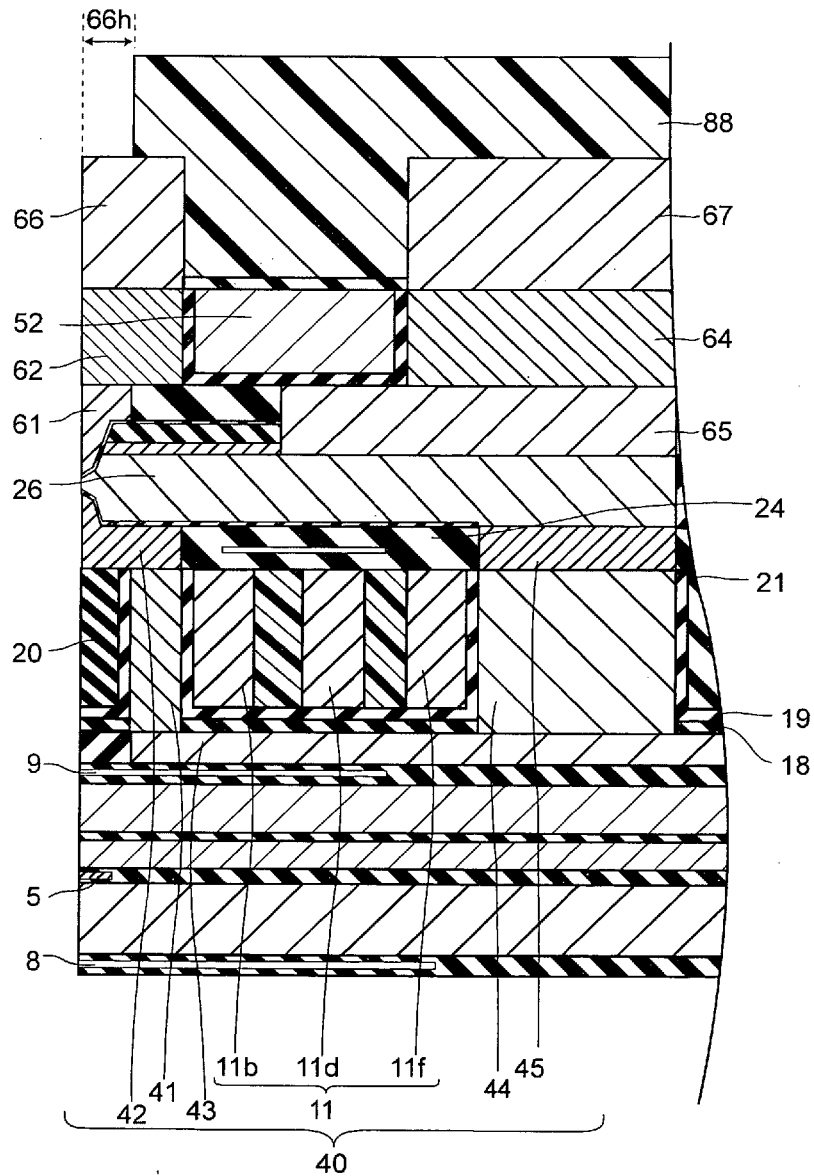
FIG. 30 is a sectional view illustrates a step subsequent to that of FIG. 29.

Next, a second shield layer forming step is performed. In this step, as illustrated in FIG. 30, an insulating layer (having a thickness of about 0.1 μm to 0.15 μm) made of alumina ($Al_2O_3$) is formed on the whole surface of the multilayer body. After that, the insulating layer is selectively perforated. This insulating layer will later become a coil-interlayer insulating layer 84. Then, the second shield layer (the second upper front shield part 66) and the second upper rear shield part 67 are formed to overlie in the opened part each in a thickness of 1.0 μm to 2.0 μm by the frame plating method using a magnetic material such as NiFe or CoNiFe.

Then, a mask 88 is formed using a photoresist. The mask 88 is formed, as illustrated in FIG. 30, in a manner to recede from the ABS 30 so as to expose a part of the second upper front shield part 66 on the ABS 30 side. In other words, the mask 88 is formed at a position to ensure a receding space 66h on the upper face of the second upper front shield part 66. The receding space 66h is an elongated part having a width, for example, about 0.4 μm to 0.7 μm like the receding space 63h.

Subsequently, a trimming step is performed. In this trimming step, as illustrated in FIG. 31, IBE is performed by applying ion beams IB from the upper direction to collectively cut off a part of the second upper front shield part 66 on the ABS 30 side and a part of the first upper front shield part 62 on the ABS 30 side. In this event, IBE is performed in a manner to cut off the whole front end face of the upper second front shield part 66 disposed on the upper side but to leave a part of the front end face of the first upper front shield part 62 on the lower side. This forms the above-described shield connecting part 62c in the first upper front shield part 62.

Further, IBE is performed such that the shield connecting part 62c having the above-described receding tilt structure appears.

Figure 32:
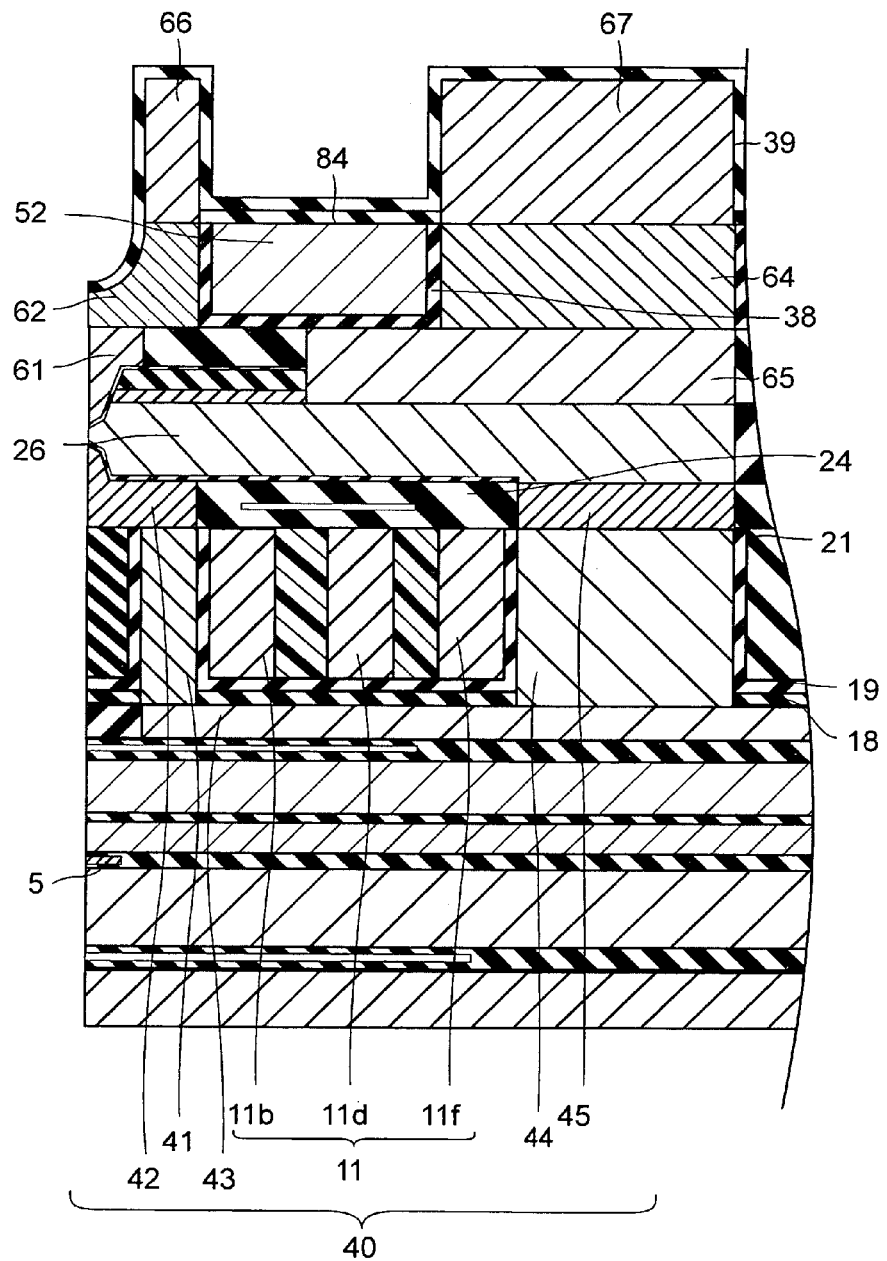
FIG. 32 is a sectional view illustrates a step subsequent to that of FIG. 31.

Next, as illustrated in FIG. 32, the insulating film 39 made of alumina (Al₂O₃) is formed on the entire surface of the multilayer body. A part of the insulating film 39 formed extending from the front end face of the first upper front shield part 62 to the front end face of the second upper front shield part 66 will become the continuous insulating film 39.

Figure 33:
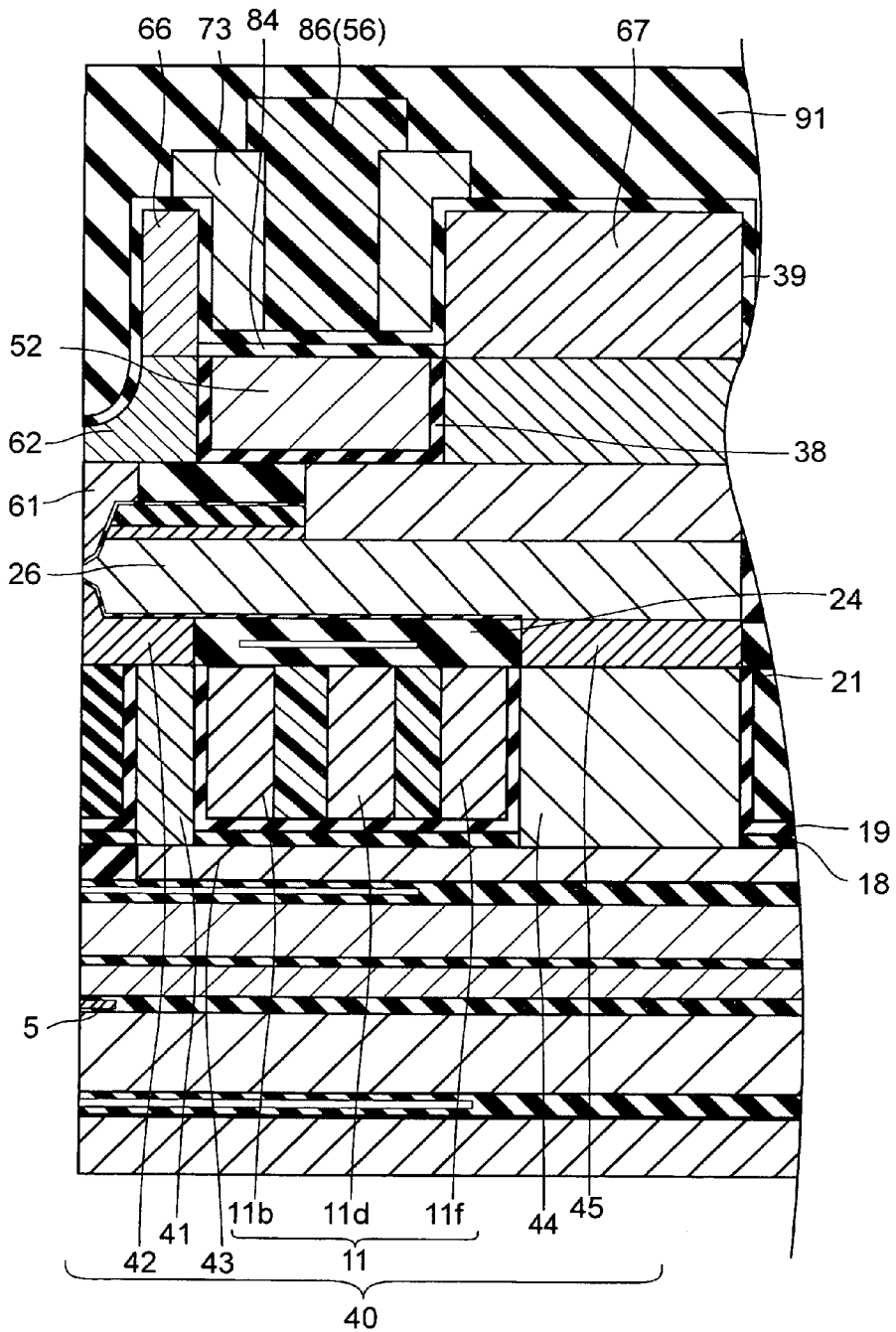
FIG. 33 is a sectional view illustrates a step subsequent to that of FIG. 32.

Subsequently, as illustrated in FIG. 33, a conductor layer 73 having one interstice is formed between the second shield layer (the second upper front shield part 66) and the second upper rear shield part 67, on the surface of the multilayer body. This conductor layer 73 will later become the second coil-layer 53. The conductor layer 73 is formed such as to come into contact with the second shield layer (the second upper front shield part 66) and the second upper rear shield part 67 through the insulating layer 39 without gaps.

After that, a photoresist layer 86 is formed at the interstice in the conductor layer 73, and an protective insulating film 91 adapted to cover the surface of the multilayer body is formed using alumina (Al₂O₃) by a thickness of about 3 μm to 4 μm. Then, the surface of the multilayer body is polished by CMP until the second upper front shield part 66 and the second upper rear shield part 67 emerge, so as to become flat. Then, the displacement suppression layer 85 and the protective insulating layer 92 are formed by performing steps similar with the thin-film magnetic head 300. By this, the thin-film magnetic head 310 is obtained.

(Operation and Effect of Thin-Film Magnetic Head 310)

The thin-film magnetic head 310 has the leading shield part 42 and the lower thin-film coil 11 as in the thin-film magnetic head 300 and therefore has the structure in which the insulating layer 732 in the conventional PMR 700 does not exist as in the thin-film magnetic head 300. Accordingly, it is possible to decrease the electric resistance of the lower thin-film coil 11 within the restriction range of RWS also in the thin-film magnetic head 310.

The thin-film magnetic head 310 has the lower thin-film coil 11 and the upper thin-film coil 50. Both of the lower thin-film coil 11 and the upper thin-film coil 50 have three turns respectively. However, the upper thin-film coil 50 has an overlapping structure by the first coil-layer 52 and the second coil-layer 53. Therefore, the upper thin-film coil 50 is able to secure 3 turns, while having only 1 or 2 turns per plane. Accordingly, the thin-film magnetic head 310 is able to reduce the depth from the ABS 30.

In addition, the thin-film magnetic head 310 has a first upper front shield part 62 similar to that of the thin-film magnetic head 300. This first upper front shield part 62 also has a shield front end face 62b, a shield upper end face 62f, and a shield connecting part 62c as in the thin-film magnetic head 300, and a part exposed in the ABS 30 is the shield front end face 62b. Therefore, in the thin-film magnetic head 310, the front end face disposed in the ABS 30 is smaller in size than the pre-trim front end face 62a as illustrated on the upper side in FIG. 7. Accordingly, the possibility of projection of the first upper front shield part 62 can be suppressed. Therefore, the thin-film magnetic head 310 is configured such that the projection of a part of the ABS 30 can be suppressed without affecting the reduction in magnetic path length as in the thin-film magnetic head 300.

Further, the front end face 66a of the second upper front shield part 66 is a flat front end face and connected without level difference to the shield connecting part 62c. Therefore, it is possible to surely form the continuous insulating film 39 on the second upper front shield part 66 and the first upper front shield part 62. Further, in the trimming step, since the parts of the second shield layer and the first shield part on the ABS 30 side are collectively cut off, a continuous flat face without level difference can be surely formed. In addition, it is unnecessary to align the second upper front shield part 66 with the shield upper end face 62f of the first upper front shield part 62, so that the manufacturing steps are able to be accordingly simplified.

Modified Example 1

Figure 34:
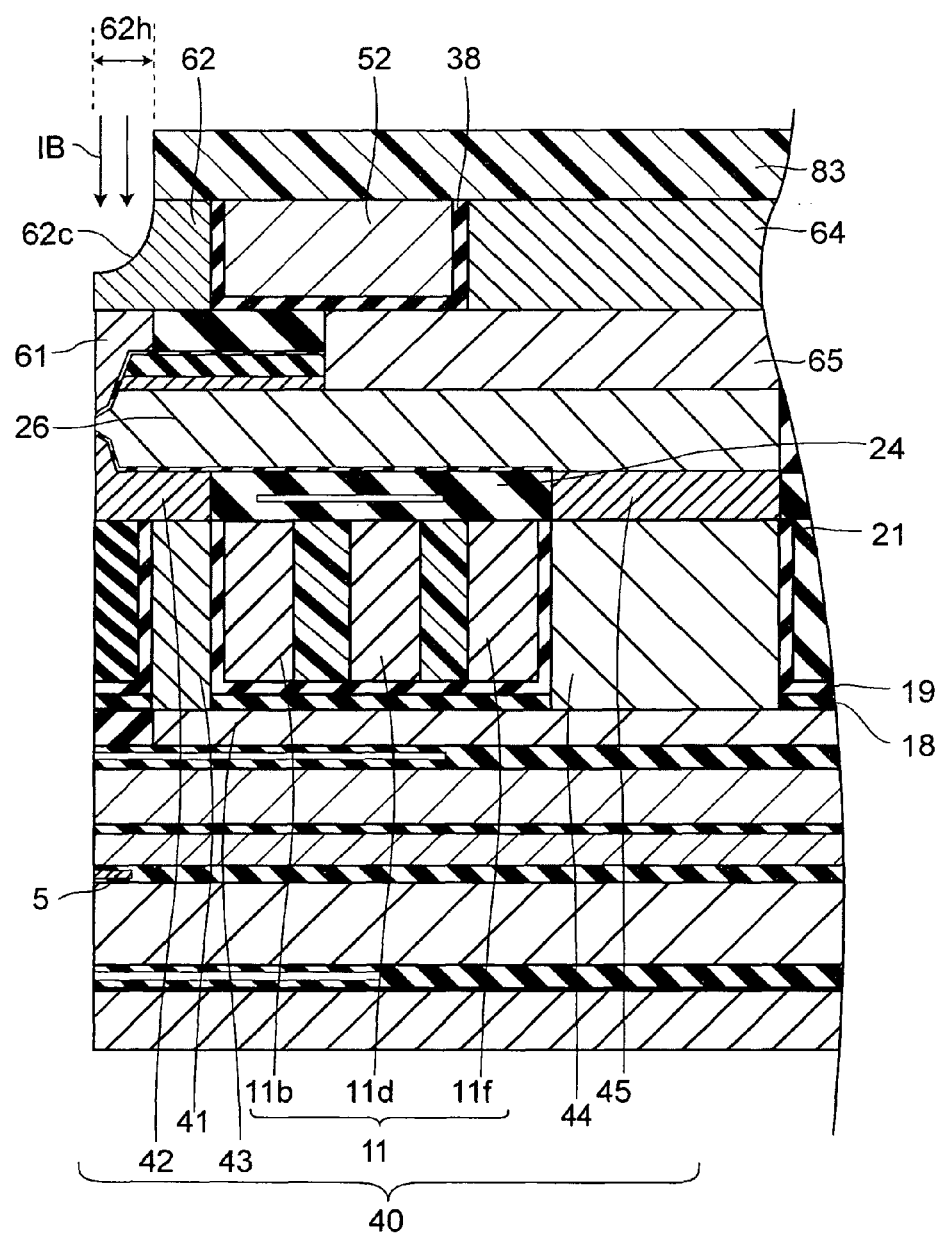
FIG. 34 is a sectional view illustrates a step of manufacturing according to a modified example.

The thin-film magnetic head 310 is able to form as follows. Steps until the first coil-layer 52 is formed are performed with the same procedure as the above case. After that, as illustrated in FIG. 34, a mask 83 is formed using a photoresist. The mask 83 is formed such that the first upper front shield part 62 on the ABS 30 side is partly exposed. In other words, the mask 83 is formed at a position where a receding space 62h is ensured on the upper face of the first upper front shield part 62.

Subsequently, a trimming step is performed. In this trimming step, as illustrated in FIG. 34, IBE is performed by applying ion beams IB from the upper direction to cut off a part of the first upper front shield part 62 on the ABS 30 side. In this event, IBE is performed in a manner to leave a part of the front end face of the first upper front shield part 62. This forms the above-described shield front end face 62b, by the front end face left in the first upper front shield part 62. Further, IBE is performed such that the shield connecting part 62c having the above-described receding tilt structure appears.

Figure 35:
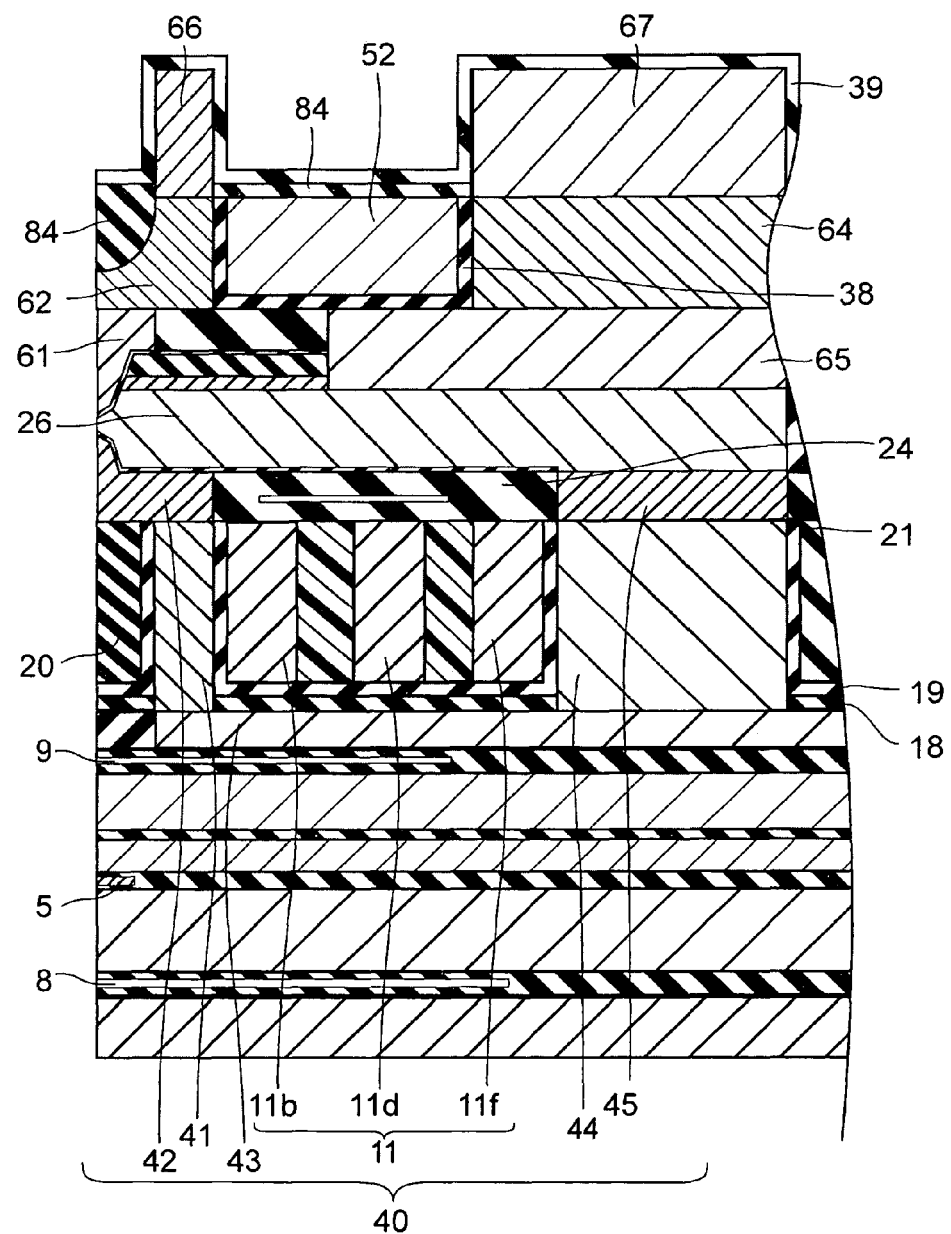
FIG. 35 is a sectional view illustrates a step subsequent to that of FIG. 34.

Next, after the mask 83 is removed, an insulating layer (having a film thickness of about 0.1 μm to about 0.15 μm) made of alumina (Al₂O₃) is formed on the entire surface of the multilayer body as illustrated in FIG. 35, and then the insulating layer is selectively perforated. This insulating layer will be a coil interlayer insulating layer 84 afterwards. In this case, since the part on the ABS 30 side of the first upper front shield part 62 has already been cut off by the trimming step, a part of the coil interlayer insulating layer 84 is formed also on the shield connecting part 62c.

Figure 36:
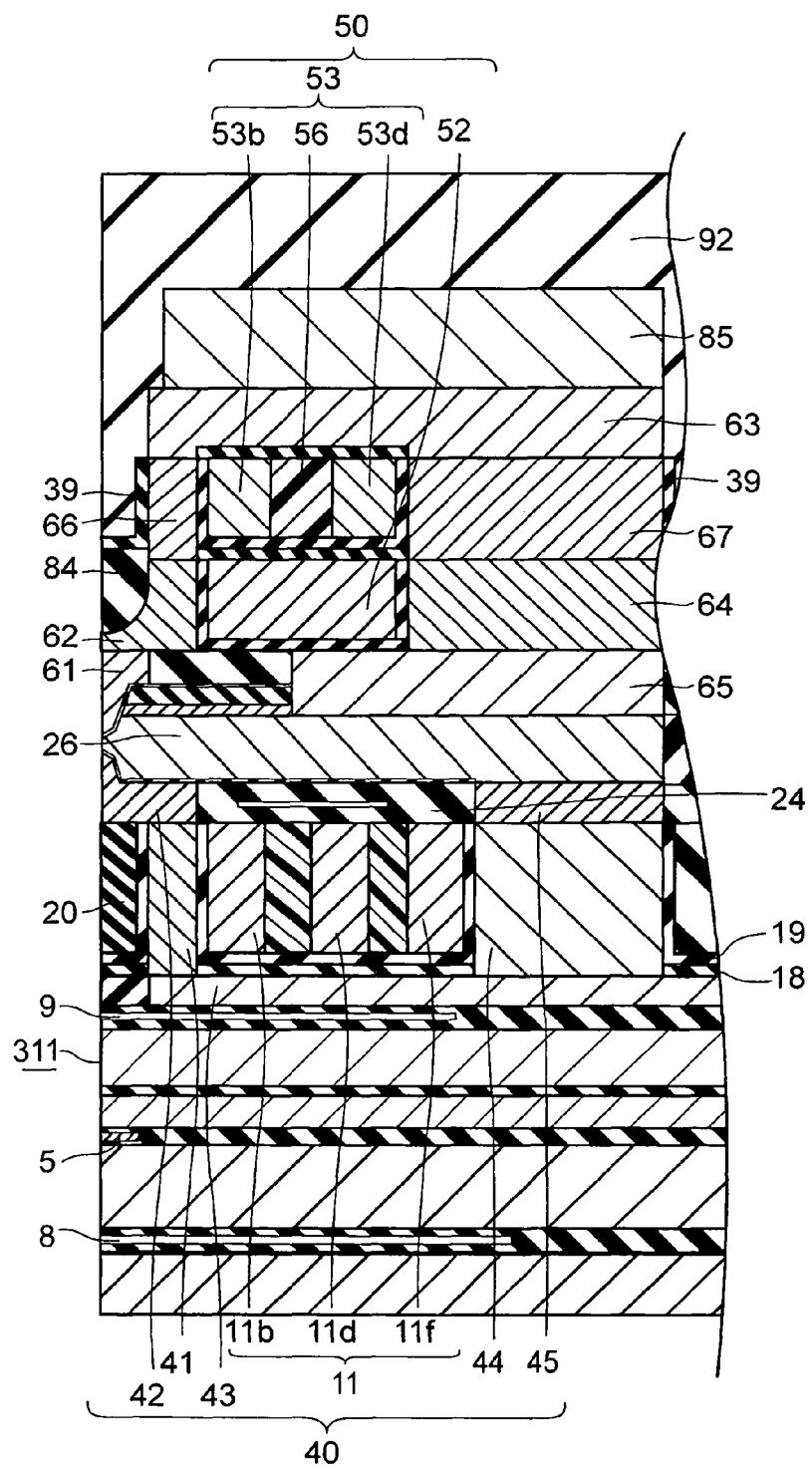
FIG. 36 is a sectional view illustrates a step subsequent to that of FIG. 35.

Then, the second shield layer (the second upper front shield part 66) and the second upper rear shield part 67 are formed to overlie in the opened part each in a thickness of 1.0 μm to 2 μm by the frame plating method using a magnetic material such as NiFe or CoNiFe. Further, the insulating layer 39 made of alumina (Al₂O₃) is formed on the whole surface of the multilayer body. When subsequent steps are performed with the same procedure as the above case, as illustrated in FIG. 36, the thin-film magnetic head 311 is obtained. In this thin-film magnetic head 311, a structure of an insulating layer arranged on ABS side of the upper thin-film coil 50 is different from the thin-film magnetic head 310, however, another structure are same with the thin-film magnetic head 310.

Modified Example 2

Figure 37:
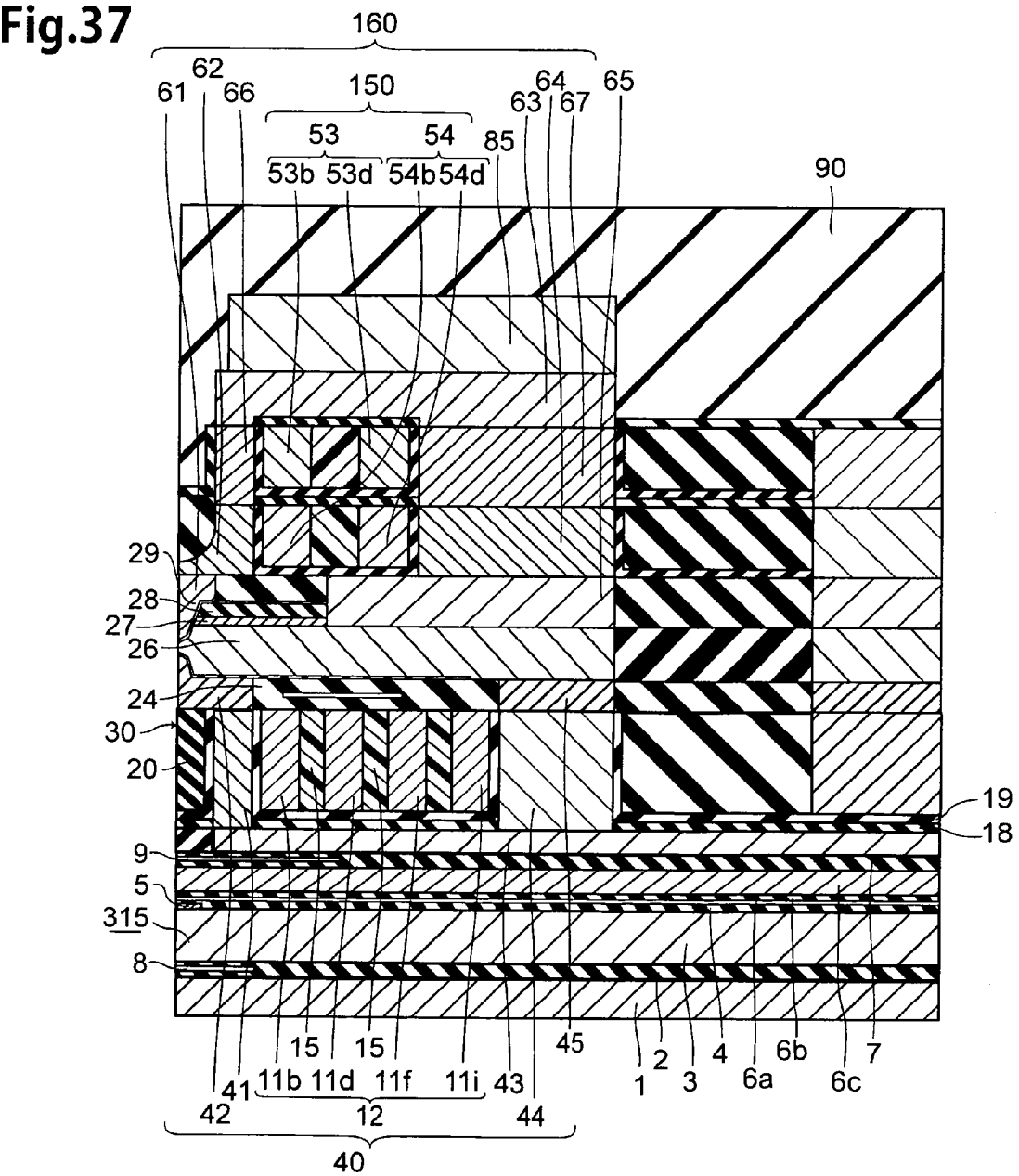
FIG. 37 is a sectional view of the thin-film magnetic head according to a modified example corresponding to FIG. 1, along by a direction intersecting its air bearing surface.

Next, the thin-film magnetic head 315 will now be explained with reference to FIG. 37. The thin-film magnetic head 315 is different in that it has a lower thin-film coil 12 in place of the lower thin-film coil 11, and that it has the upper thin-film coil 150 in place of the upper thin-film coil 50, as compared with the above-described thin-film magnetic head 311.

The lower thin-film coil 12 is different in that it has four turns, as compared with the lower thin-film coil 11. Namely, the lower thin-film coil 12 has a turn part 11i in addition to the turn part 11b, 11d, 11f. Besides, the upper thin-film coil 150 is different in that it has a first coil-layer 54 in place of the first coil-layer 52. The first coil-layer 54 has two turns as with the second coil-layer 53.

This thin-film magnetic head 315 has also the leading shield part 42 and the lower thin-film coil 11, therefore, it reduces the electric resistance of the lower thin-film coil 11 within the restriction range of the RWS, as in the thin-film magnetic head 300.

Further, the upper thin-film coil 150 has the overlapping structure, and therefore the depth from the ABS 30 can be reduced. Further, the thin-film magnetic head 315 has the first upper front shield part 62, so that the possibility of projection of the first upper front shield part 62 can be suppressed. Accordingly, the thin-film magnetic head 315 is configured such that the projection of a part of the ABS 30 can be suppressed without affecting the reduction in magnetic path length as in the thin-film magnetic head 310.

Third Embodiment

Figure 39:
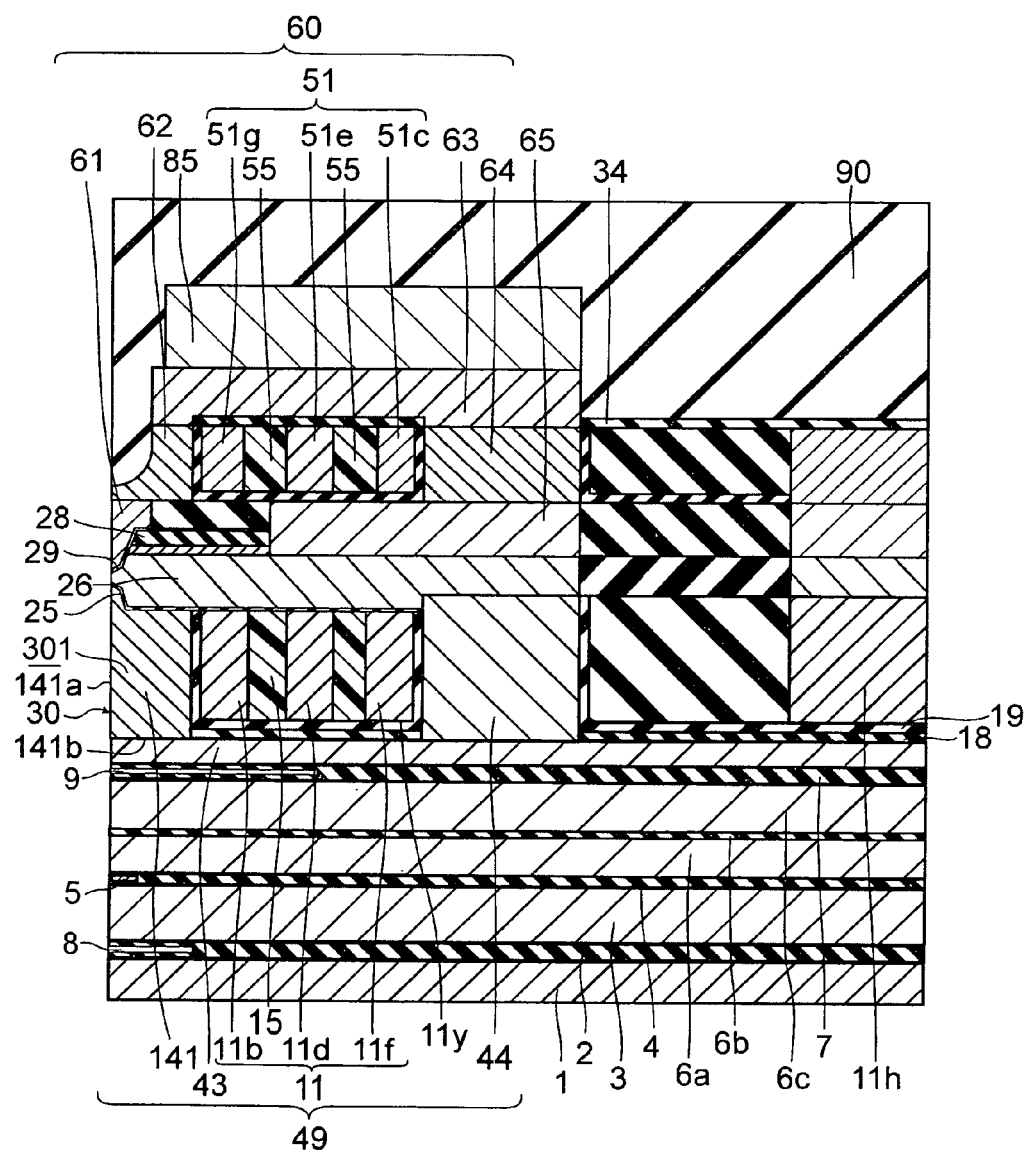
FIG. 39 is a sectional view of the thin-film magnetic head according to a third embodiment of the present invention corresponding to FIG. 1, along by a direction intersecting its ABS.
Figure 40:
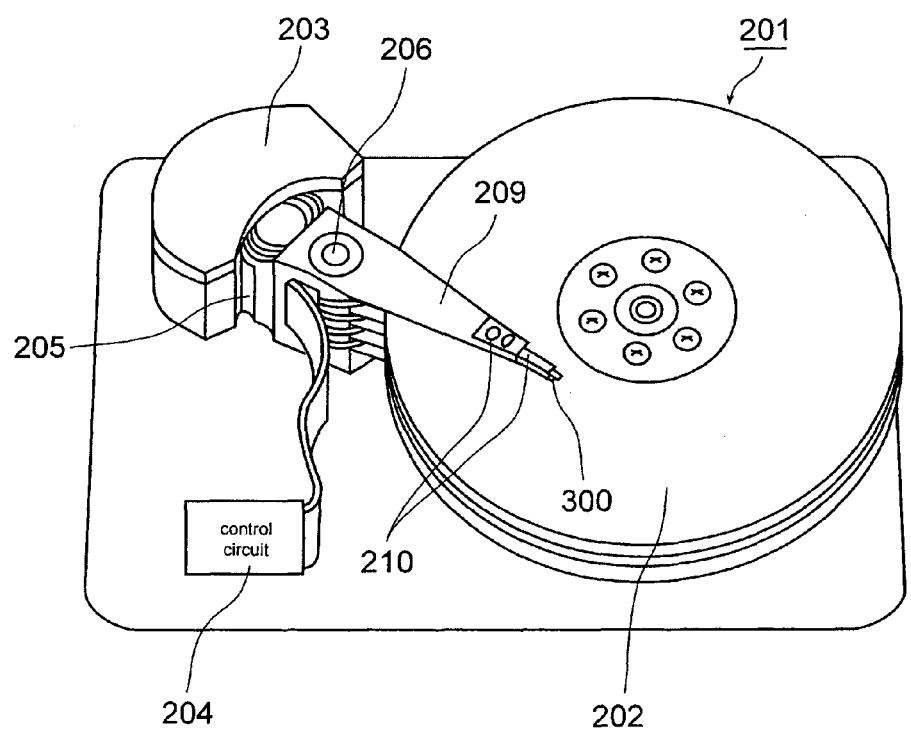
FIG. 40 is a perspective view illustrating a hard disk drive equipped with a thin-film magnetic head according to an embodiment of the present invention.

The thin-film magnetic head of perpendicular magnetic recording type according to the third embodiment of the present invention will now be explained with reference to FIG. 39. FIG. 39 is a sectional view of the thin-film magnetic head 301 according to a third embodiment of the present invention corresponding to FIG. 1, along by a direction intersecting ABS 30. The thin-film magnetic head 301 is different in that it has a shield magnetic layer 49 in place of the shield magnetic layer 40, and that it does not have the base insulating layer 24, as compared with the thin-film magnetic head 300. In the thin-film magnetic head 300, the lower front shield part 41 of the shield magnetic layer 40 recedes from the ABS 30. However, in the thin-film magnetic head 301, the leading shield part 141 closer to the ABS 30 than is the thin-film coil 11 is exposed in ABS 30 without receding from the ABS 30.

The shield magnetic layer 49 is different in that it has the leading shield part 141 in place of the leading shield part 42 and the lower front shield part 41, and that it does not have the second rear shield part 45.

The leading shield part 141 has a shield end face 141a. The shield end face 141a is disposed in the ABS 30. Further, the leading shield part 141 opposes the main magnetic pole layer 26 through the nonmagnetic thin-film 25, at the first lower tilted surface 26h. Further, the leading shield part 141 has a height reaching, from the nonmagnetic thin-film 25, the linking shield part 43 and a lateral width reaching, from the ABS 30, the turn part 11b through the insulating layer 19. The leading shield part 141 is formed to have a height in the direction along the ABS 30 larger than the height in the direction along the ABS 30 of the lower thin-film coil 11.

Further, in the thin-film magnetic head 301, the upper end face 11x is in contact with the lower end face 26f of the main magnetic pole layer 26 through the nonmagnetic thin-film 25. Further, the lower end face 141b of the leading shield part 141 is disposed at a position closer to the substrate 1 than is a lower end face 11y of the lower thin-film coil 11. The lower end face 11y is disposed at a position closest to the substrate 1 in the lower thin-film coil 11.

In such a thin-film magnetic head 301, the upper end face 11x is in contact with the lower end face 26f of the main magnetic pole layer 26 through the nonmagnetic thin-film 25 and therefore only the nonmagnetic thin-film 25 exists between the main magnetic pole layer 26 and the lower thin-film coil 11. If an insulating layer exists between the main magnetic pole layer 26 and the lower thin-film coil 11, the insulating layer would be an obstruction in terms of the increase in height of the lower thin-film coil 11. However, since the thin-film magnetic head 301 has a structure in which such an insulating layer does not exist, the height of the lower thin-film coil 11 can be made as large as possible within the restriction range of the read/write separation.

Further, since the lower end face 141b is disposed at a position closer to the substrate 1 than is the lower end face 11y, the size of the magnetic layer exposed in the ABS 30 (the size of the shield end face 141a) is made larger than that in the thin-film magnetic head 300. Therefore, the thin-film magnetic head 301 can more effectively absorb the magnetic flux emitted from the main magnetic pole layer 26.

Also in such a thin-film magnetic head 301, both of the suppression of projection of a part of the medium-opposing surface and the reduction in magnetic path length can be realized, as in the thin-film magnetic head 300, because the write shield layer 60 has the above-described upper front shield part 62.

In particular, since the thin-film magnetic head 301 has a structure in which the opposing shield part 61 and the linking shield part 63 can be connected by the upper front shield part 62, the magnetic path length can be made shorter than that of the conventional thin-film magnetic head 700. Therefore, the inductance of the thin-film magnetic head 301 can be reduced. Accordingly, it is possible to pass recording signals having a high frequency through the thin-film coil and increase the recording density on the recording medium.

(Method of Manufacturing Thin-Film Magnetic Head)

A method of manufacturing the thin-film magnetic head 301 having the structure mentioned above will now be explained with reference to FIG. 39 mentioned above.

The steps until the common flat surface 58 is formed are performed substantially similarly to the case of the thin-film magnetic head 300. However, the steps for manufacturing the thin-film magnetic head 301 are different in the following point from those when manufacturing the thin-film magnetic head 300. The conductor layer forming step is performed as in the case of the thin-film magnetic head 300.

A magnetic layer forming step is performed instead of the lower front magnetic layer forming step in the case of the thin-film magnetic head 300, and a planarization step is performed instead of the common flat surface forming step. By performing the magnetic layer forming step, a leading magnetic layer for forming the leading shield part 141 is formed instead of the lower front magnetic layer 41A. The leading magnetic layer is different in that it is disposed in the ABS 30, as compared with the lower front magnetic layer 41A. Further, by performing the planarization step, planarization processing is performed on the surfaces of the conductor layer and the leading magnetic layer.

Next, the leading shield part forming step is performed as follows. Namely, the leading shield part 141 is formed by etching the surfaces of the leading magnetic layer and the conductor layer according to the shape of the main magnetic pole layer 26. The etching in this case only needs to be performed as in the case of the thin-film magnetic head 300 except that the upper end face 11x of the lower thin-film coil 11 is included in the etching target. Thereafter, the main magnetic pole layer forming step is performed as in the case of the thin-film magnetic head 300, whereby the thin-film magnetic head 301 can be manufactured.

For manufacturing the thin-film magnetic head 301, the upper end face 11x of the lower thin-film coil 11 is included in the etching target, so that the height of the lower thin-film coil 11 can be reduced by the amount thereof etched. However, only the nonmagnetic thin-film 25 exists between the upper end face 11x of the lower thin-film coil 11 and the main magnetic pole layer 26 and other insulating layers do not exist between them. Thus, the height of the completed lower thin-film coil 11 can be made large, and therefore it is sufficient to form the lower thin-film coil 11 before etching large in height.

(Embodiments of Head Gimbal Assembly and Hard Disk Drive)

Next, embodiments of the head gimbal assembly and hard disk drive will now be explained with reference to FIG. 41 to FIG. 42.

Figure 41:
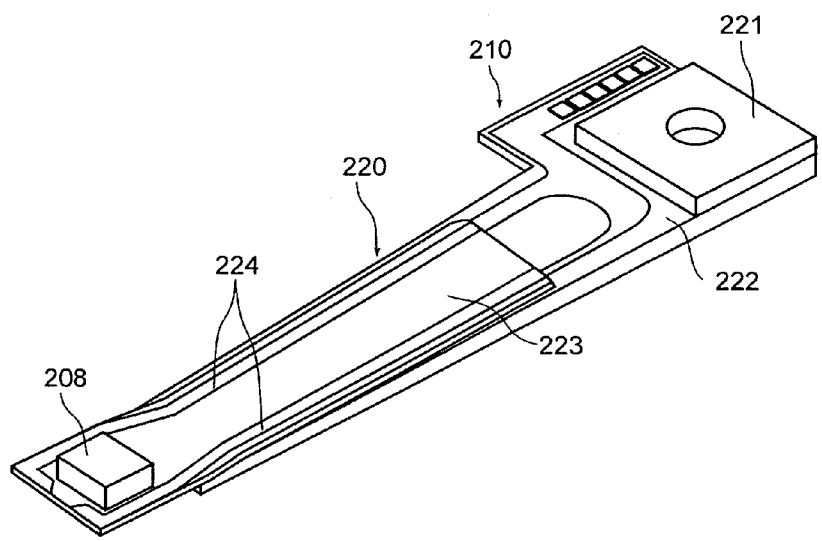
FIG. 41 is a perspective view illustrating a rear side of HGA.

FIG. 41 is a perspective view illustrating a hard disk drive 201 equipped with the above-mentioned thin-film magnetic head 300. FIG. 42 is a perspective view illustrating a rear side of HGA 210. As illustrated in FIG. 41, the hard disk drive 201 includes a hard disk (magnetic recording medium) 202 rotating at a high speed and a head gimbal assembly (HGA) 210. The hard disk drive 201 is an apparatus which actuates the HGA 210, so as to record/reproduce data onto/from recording surfaces of the hard disk 202. The hard disk 202 has a plurality of (4 in the drawing) platters. Each platter has a recording surface opposing its corresponding thin-film magnetic head 300.

Figure 42:
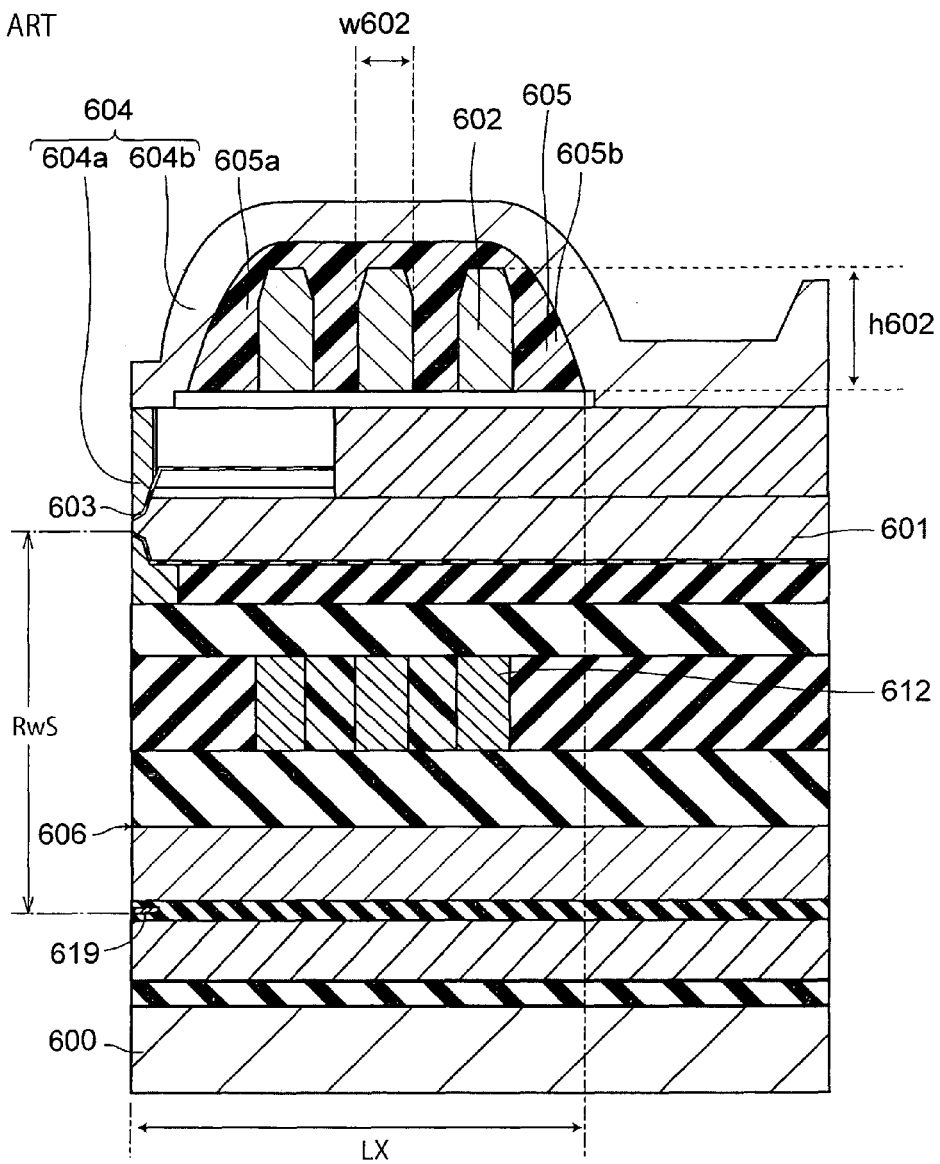
FIG. 42 is a sectional view illustrating an example of a conventional thin-film magnetic head.

The hard disk drive 201 positions a slider 208 illustrated in FIG. 42 on a track by an assembly carriage device 203. The thin-film magnetic head 300 is formed on this slider 208. Further, the hard disk drive 201 has a plurality of drive arms 209. The drive arms pivot about a pivot bearing shaft 206 by means of a voice coil motor (VCM) 205, and are stacked in a direction along the pivot bearing shaft 206. Further, an HGA 210 is attached to the tip of each drive arm.

Further, the hard disk drive 201 has a control circuit 204 controlling recording/reproducing.

The HGA 210 will now be described with reference to FIG. 42. In the HGA 210, the slider 208 is fixed to a tip portion of a suspension 220. Further, in the HGA 210, one end portion of a wiring member 224 is electrically connected to a terminal electrode of the slider 208.

The suspension 220 has a load beam 222, a base plate 221 provided at a base portion of the load beam 222, a flexure 223 fixed to and supported on the load beam 222 from the tip end side to the front side of the base plate 221 and having elasticity, and the wiring member 224. The wiring member 224 has a lead conductor and connection pads electrically connected to both ends of the lead conductor.

In the hard disk drive 201, when the HGA 210 is rotated, the slider 208 moves in a radial direction of the hard disk 202, i.e., a direction traversing track lines.

Such HGA 210 and hard disk drive 201 have the thin-film magnetic head 300, so that the projection of a part of the medium-opposing surface can be suppressed without affecting the reduction in magnetic path length. Therefore, it is possible to reduce the frying height from the surface of the hard disk 202 and to put the slider 208 closer to the hard disk 202.

Especially, in the hard disk drive 201 having the thin-film magnetic head 300, the sectional area of the lower thin-film coil 11 can be made large than the hard disk drive 201 having the conventional thin-film magnetic head 700. Accordingly, it is possible to reduce the electric resistance of a thin-film coil within the restriction range of the read/write separation without increasing the magnetic path length and suppress protrusion of a part of the ABS.

In the each above-described embodiments, the thin-film magnetic head having the displacement suppression layer is explained by way of example. The present invention is also applicable to thin-film magnetic head not having the displacement suppression layer. Besides, the thin-film coil is wound as a flat spiral about the shield magnetic layer 40, the write shield layer 60, but the thin-film coil may be wound about the main magnetic pole layer 26.

This invention is not limited to the foregoing embodiments but various changes and modifications of its components may be made without departing from the scope of the present invention. Besides, it is clear that various embodiments and modified examples of the present invention can be carried out on the basis of the foregoing explanation. Therefore, the present invention can be carried out in modes other than the above-mentioned best modes within the scope equivalent to the following claims.

What is claimed is:

1. A thin-film magnetic head constructed such that a main magnetic pole layer having a magnetic pole end face on a side of a medium-opposing surface opposing a recording medium, a write shield layer having a write shield end face disposed in the medium-opposing surface, a gap layer formed between the main magnetic pole layer and write shield layer, and a thin-film coil wound around any of the main magnetic pole layer, the write shield layer or a shield magnetic layer connected the main magnetic pole layer are laminated on a substrate, the thin-film magnetic head comprising:
a leading shield part having a shield end face disposed in the medium-opposing surface, and opposing the main magnetic pole layer through a nonmagnetic thin-film on the substrate side of the main magnetic pole layer,
wherein the thin-film coil has a substrate side coil layer disposed between the main magnetic pole layer and the substrate, and
wherein a space between a lower end face disposed at a position closest to the substrate in the leading shield part and the substrate and a space between an upper end face disposed at a position most distanced from the substrate in the substrate side coil layer and the substrate are formed equal to each other.

2. The thin-film magnetic head according to claim 1, further comprising:
a lower front shield part disposed at a position closer to the medium-opposing surface than is the substrate side coil layer, and having an upper end face, disposed at a position most distanced from the substrate, formed without level difference with respect to the upper end face of the substrate side coil layer, wherein the upper end face of the lower front shield part and the lower end face of the leading shield part are directly connected.

3. The thin-film magnetic head according to claim 2, further comprising:
an opposing insulating layer having a front end face disposed in the medium-opposing surface, and disposed on the medium-opposing surface side of the lower front shield part,
wherein the leading shield part is in direct contact with both the opposing insulating layer and the lower front shield part.

4. The thin-film magnetic head according to claim 3,
wherein an upper end face disposed at a position most distanced from the substrate in the opposing insulating layer is formed without level difference with respect to the upper end face of the substrate side coil layer and the upper end face of the lower front shield part.

5. The thin-film magnetic head according to claim 1, further comprising:
a base insulating layer in contact with a lower end face disposed at a position closest to the substrate in the main magnetic pole layer, through the nonmagnetic thin-film, wherein the upper end face of the substrate side coil layer is in direct contact with the base insulating layer.

6. The thin-film magnetic head according to claim 1, wherein the opposing insulating layer has an opposing depression formed by disposing an upper end face thereof disposed at a position most distanced from the substrate at a position closer to the substrate than is the upper end face of the lower front shield part, and wherein the leading shield part wraps around to an inside of the opposing depression and thereby has an expansion structure in which a height of a part thereof on the medium-opposing surface side in a direction along the medium-opposing surface is expanded.

7. The thin-film magnetic head according to claim 1, wherein the write shield layer comprises an opposing shield part opposing the main magnetic pole layer in the medium-opposing surface, and an upper front shield part connected to the opposing shield part without straddling the thin-film coil and disposed on the medium-opposing surface side of the thin-film coil, and wherein the upper front shield part comprises a shield front end face disposed in the medium-opposing surface, a shield upper end face disposed at a position distanced more from the substrate than is the shield front end face and formed along an intersecting direction intersecting the medium-opposing surface and distanced from the medium-opposing surface, and a shield connecting part directly connecting the shield front end face to the shield upper end face.

8. The thin-film magnetic head according to claim 7, wherein the upper front shield part is formed having a part on the medium-opposing surface cut off such that the shield connecting part has a receding tilt structure tilted to be distanced more from the medium-opposing surface than is a flat surface connecting the shield front end face and the shield upper end face at a shortest distance.

9. A thin-film magnetic head constructed such that a main magnetic pole layer having a magnetic pole end face on a side of a medium-opposing surface opposing a recording medium, a write shield layer having a write shield end face disposed in the medium-opposing surface, a gap layer formed between the main magnetic pole layer and write shield layer, and a thin-film coil wound around any of the main magnetic pole layer, the write shield layer or a shield magnetic layer connected the main magnetic pole layer are laminated on a substrate, the thin-film magnetic head comprising:

a leading shield part having a shield end face disposed in the medium-opposing surface, and opposing the main magnetic pole layer through a nonmagnetic thin-film on the substrate side of the main magnetic pole layer, wherein the thin-film coil has a substrate side coil layer disposed between the main magnetic pole layer and the substrate, and an upper end face disposed at a position most distanced from the substrate in the substrate side coil layer is in contact with a lower end face disposed at a position closest to the substrate in the main magnetic pole layer, through the nonmagnetic thin-film.

10. The thin-film magnetic head according to claim 9, wherein a lower end face disposed at a position closest to the substrate in the leading shield part is disposed at a position closer to the substrate than is a lower end face disposed at a position closest to the substrate in the substrate side coil layer.

11. The thin-film magnetic head according to claim 9, wherein the leading shield part has a lateral width reaching, from the medium-opposing surface, the substrate side coil layer, and is formed larger in height along the medium-opposing surface than the substrate side coil layer.

12. A method of manufacturing a thin-film magnetic head constructed such that a main magnetic pole layer having a magnetic pole end face on a side of a medium-opposing surface opposing a recording medium, a write shield layer having a write shield end face disposed in the medium-opposing surface, a gap layer formed between the main magnetic pole layer and write shield layer, and a thin-film coil wound around any of the main magnetic pole layer, the write shield layer or a shield magnetic layer connected the main magnetic pole layer are laminated on a substrate; the method comprising:

a conductor layer forming step of forming a conductor layer for forming a substrate side coil layer disposed between the main magnetic pole layer and the substrate among coil layers constituting the thin-film coil;

a common flat surface forming step of performing planarization processing on a surface of the conductor layer to form a common flat surface including an upper end face disposed at a position most distanced from the substrate in the conductor layer;

a magnetic layer forming step of forming, directly on the common flat surface, a leading magnetic layer for forming a leading shield part having a shield end face disposed in the medium-opposing surface, and opposing the main magnetic pole layer through a nonmagnetic thin-film on the substrate side of the main magnetic pole layer;

a leading shield part forming step of forming the leading shield part by etching a surface of the leading magnetic layer formed by the magnetic layer forming step according to a shape of the main magnetic pole layer; and a main magnetic pole layer forming step of forming the main magnetic pole layer after formation of the nonmagnetic thin-film on a surface of the leading shield part.

13. The method of manufacturing a thin-film magnetic head according to claim 12, further comprising:

a lower front magnetic layer forming step of forming a lower front magnetic layer for forming a lower front shield part disposed on a side of the medium-opposing surface than the substrate side coil layer, wherein planarization processing is performed on the lower front magnetic layer together with the conductor layer by the planarization processing in the common flat surface forming step such that a surface of the lower front magnetic layer is included in the common flat surface.

14. The method of manufacturing a thin-film magnetic head according to claim 13, wherein the magnetic layer forming step is performed such that the leading magnetic layer is formed on the surface of the lower front magnetic layer.

15. The method of manufacturing a thin-film magnetic head according to claim 13, further comprising:

an opposing insulating layer forming step of forming an opposing insulating layer having a front end face disposed in the medium-opposing surface, and disposed on the medium-opposing surface side of the lower front shield part; and an opposing depression forming step of performing etching process on an upper end face disposed at a position most distanced from the substrate in the opposing insulating layer to form an opposing depression in the upper end face, wherein the magnetic layer forming step is performed such that the leading magnetic layer wraps around to an inside of the opposing depression.

16. The method of manufacturing a thin-film magnetic head according to claim 12, further comprising:
an opposing shield part forming step of forming, after the main magnetic pole layer is formed, an opposing shield part constructing the write shield layer such that the opposing shield part opposes the main magnetic pole layer in the medium-opposing surface;
a first shield part forming step of forming, on the medium-opposing surface side of the conductor layer, a first shield part for forming the write shield layer such that the first shield part is connected to the opposing shield part formed by the opposing shield part forming step and disposed in the medium-opposing surface;
a linking shield part forming step of forming a linking shield part constructing the write shield layer such that the linking shield part is connected to the first shield part formed by the first shield part forming step, straddles the thin-film coil, and is receded from the medium-opposing surface to be distanced from the medium-opposing surface; and
a trimming step of cutting off a part on the medium-opposing surface side which is not covered with the linking shield part of the first shield part.

17. The method of manufacturing a thin-film magnetic head according to claim 16,
wherein in the trimming step, the part on the medium-opposing surface side which is not covered with the linking shield part of the first shield part is cut off using the linking shield part formed by the linking shield part forming step as a mask.

18. The method of manufacturing a thin-film magnetic head according to claim 16,
wherein the trimming step is performed in a manner to leave a part of a front end face of the first shield part disposed in the medium-opposing surface as a shield front end face.

19. A method of manufacturing a thin-film magnetic head constructed such that a main magnetic pole layer having a magnetic pole end face on a side of a medium-opposing surface opposing a recording medium, a write shield layer having a write shield end face disposed in the medium-opposing surface, a gap layer formed between the main magnetic pole layer and write shield layer, and a thin-film coil wound around any of the main magnetic pole layer, the write shield layer or a shield magnetic layer connected the main magnetic pole layer are laminated on a substrate; the method comprising:
a magnetic layer forming step of forming a leading magnetic layer for forming a leading shield part having a shield end face disposed in the medium-opposing surface, and opposing the main magnetic pole layer through a nonmagnetic thin-film on the substrate side of the main magnetic pole layer;
a conductor layer forming step of forming a conductor layer for forming a substrate side coil layer disposed between the main magnetic pole layer and the substrate among coil layers constituting the thin-film coil;
a planarization step of performing planarization processing on surfaces of the conductor layer and the leading magnetic layer;
a leading shield part forming step of forming the leading shield part by etching surfaces of the leading magnetic layer formed by the magnetic layer forming step and the conductor layer formed by the conductor layer forming step, according to a shape of the main magnetic pole layer; and
a main magnetic pole layer forming step of forming the main magnetic pole layer after formation of the nonmagnetic thin-film on surfaces of the leading shield part and the conductor layer.

20. A head gimbal assembly comprising a thin-film magnetic head formed on a support and a gimbal for securing the support;
wherein the thin-film magnetic head is constructed such that a main magnetic pole layer having a magnetic pole end face on a side of a medium-opposing surface opposing a recording medium, a write shield layer having a write shield end face disposed in the medium-opposing surface, a gap layer formed between the main magnetic pole layer and write shield layer, and a thin-film coil wound around any of the main magnetic pole layer, the write shield layer or a shield magnetic layer connected the main magnetic pole layer are laminated on a substrate, the thin-film magnetic head comprising:
a leading shield part having a shield end face disposed in the medium-opposing surface, and opposing the main magnetic pole layer through a nonmagnetic thin-film on the substrate side of the main magnetic pole layer,
wherein the thin-film coil has a substrate side coil layer disposed between the main magnetic pole layer and the substrate, and
wherein a space between a lower end face disposed at a position closest to the substrate in the leading shield part and the substrate and a space between an upper end face disposed at a position most distanced from the substrate in the substrate side coil layer and the substrate are formed equal to each other.

21. A hard disk drive comprising a head gimbal assembly having a thin-film magnetic head and a recording medium opposing the thin-film magnetic head;
wherein the thin-film magnetic head is constructed such that a main magnetic pole layer having a magnetic pole end face on a side of a medium-opposing surface opposing a recording medium, a write shield layer having a write shield end face disposed in the medium-opposing surface, a gap layer formed between the main magnetic pole layer and write shield layer, and a thin-film coil wound around any of the main magnetic pole layer, the write shield layer or a shield magnetic layer connected the main magnetic pole layer are laminated on a substrate, the thin-film magnetic head comprising:
a leading shield part having a shield end face disposed in the medium-opposing surface, and opposing the main magnetic pole layer through a nonmagnetic thin-film on the substrate side of the main magnetic pole layer,
wherein the thin-film coil has a substrate side coil layer disposed between the main magnetic pole layer and the substrate, and
wherein a space between a lower end face disposed at a position closest to the substrate in the leading shield part and the substrate and a space between an upper end face disposed at a position most distanced from the substrate in the substrate side coil layer and the substrate are formed equal to each other.

* * * * *